(12) United States Patent
Hall et al.

(10) Patent No.: US 11,603,324 B2
(45) Date of Patent: Mar. 14, 2023

(54) CHANNELED ELECTRODES AND METHOD OF MAKING

(71) Applicant: Utility Global, Inc., Houston, TX (US)

(72) Inventors: David R. Hall, Provo, UT (US); Matthew Dawson, Katy, TX (US); Nicholas Farandos, Bray (IE); Jin Dawson, Katy, TX (US)

(73) Assignee: Utility Global, Inc., Houston, TX (US)

(*) Notice: Subject to any disclaimer, the term of this patent is extended or adjusted under 35 U.S.C. 154(b) by 220 days.

(21) Appl. No.: 16/693,270

(22) Filed: Nov. 23, 2019

(65) Prior Publication Data

US 2020/0140297 A1    May 7, 2020

Related U.S. Application Data

(63) Continuation-in-part of application No. 16/684,838, filed on Nov. 15, 2019, and a continuation-in-part of application No. 16/684,864, filed on Nov. 15, 2019, and a continuation-in-part of application No. 16/680,770, filed on Nov. 12, 2019, and a continuation-in-part of application No. 16/674,629,
(Continued)

(51) Int. Cl.
*H01M 4/26* (2006.01)
*C02F 1/461* (2023.01)
*H01M 4/86* (2006.01)
*C02F 1/467* (2023.01)

(52) U.S. Cl.
CPC ........ *C02F 1/46114* (2013.01); *C02F 1/4672* (2013.01); *C02F 1/4676* (2013.01); *H01M 4/8621* (2013.01)

(58) Field of Classification Search
None
See application file for complete search history.

(56) References Cited

U.S. PATENT DOCUMENTS

| 4,374,906 A | 2/1983 | Breault et al. |
| 4,749,632 A | 6/1988 | Flandermeyer et al. |

(Continued)

FOREIGN PATENT DOCUMENTS

| KR | 20120129247 A | * 11/2012 |
| KR | 20130047175 | 5/2013 |

(Continued)

OTHER PUBLICATIONS

Abstract of Mitchell and Wood, Rapid and Low Temperature Densification of Gadolinia Doped Ceria Barrier Layers by Photonic Curing, Technical Report No. DOE-nanohmics-SC0017134, Publication Date Dec. 4, 2017 (Year: 2017).*

(Continued)

*Primary Examiner* — Lucas J. O'Donnell
(74) *Attorney, Agent, or Firm* — Foley & Lardner LLP

(57) ABSTRACT

There is disclosed a method of making an electrode for an electrochemical reactor including the steps of providing a template and depositing electrode material such that the electrode material is in contact with the template. This template is provided in a form that produces channels in the electrode material. There is also disclosed an electrode for an electrochemical reactor which includes electrode material and a template, with the template occupying channels in the electrode material.

10 Claims, 23 Drawing Sheets

Related U.S. Application Data filed on Nov. 5, 2019, now Pat. No. 11,557,784, and a continuation-in-part of application No. 16/674,695, filed on Nov. 5, 2019, and a continuation-in-part of application No. 16/674,580, filed on Nov. 5, 2019, now abandoned, and a continuation-in-part of application No. 16/674,657, filed on Nov. 5, 2019, now Pat. No. 11,575,142.

(60) Provisional application No. 62/939,531, filed on Nov. 22, 2019, provisional application No. 62/934,808, filed on Nov. 13, 2019, provisional application No. 62/928,326, filed on Oct. 30, 2019, provisional application No. 62/927,627, filed on Oct. 29, 2019, provisional application No. 62/925,210, filed on Oct. 23, 2019, provisional application No. 62/912,626, filed on Oct. 8, 2019, provisional application No. 62/904,683, filed on Sep. 24, 2019, provisional application No. 62/899,087, filed on Sep. 11, 2019, provisional application No. 62/896,466, filed on Sep. 5, 2019, provisional application No. 62/895,416, filed on Sep. 3, 2019, provisional application No. 62/888,319, filed on Aug. 16, 2019, provisional application No. 62/877,699, filed on Jul. 23, 2019, provisional application No. 62/875,437, filed on Jul. 17, 2019, provisional application No. 62/869,322, filed on Jul. 1, 2019, provisional application No. 62/866,758, filed on Jun. 26, 2019, provisional application No. 62/864,492, filed on Jun. 20, 2019, provisional application No. 62/863,390, filed on Jun. 19, 2019, provisional application No. 62/856,736, filed on Jun. 3, 2019, provisional application No. 62/852,045, filed on May 23, 2019, provisional application No. 62/849,269, filed on May 17, 2019, provisional application No. 62/847,472, filed on May 14, 2019, provisional application No. 62/844,126, filed on May 7, 2019, provisional application No. 62/844,127, filed on May 7, 2019, provisional application No. 62/840,381, filed on Apr. 29, 2019, provisional application No. 62/839,587, filed on Apr. 26, 2019, provisional application No. 62/837,089, filed on Apr. 22, 2019, provisional application No. 62/834,531, filed on Apr. 16, 2019, provisional application No. 62/827,800, filed on Apr. 1, 2019, provisional application No. 62/825,576, filed on Mar. 28, 2019, provisional application No. 62/824,229, filed on Mar. 26, 2019, provisional application No. 62/819,374, filed on Mar. 15, 2019, provisional application No. 62/819,289, filed on Mar. 15, 2019, provisional application No. 62/814,695, filed on Mar. 6, 2019, provisional application No. 62/809,602, filed on Feb. 23, 2019, provisional application No. 62/808,644, filed on Feb. 21, 2019, provisional application No. 62/805,250, filed on Feb. 13, 2019, provisional application No. 62/804,115, filed on Feb. 11, 2019, provisional application No. 62/798,344, filed on Jan. 29, 2019, provisional application No. 62/797,572, filed on Jan. 28, 2019, provisional application No. 62/791,629, filed on Jan. 11, 2019, provisional application No. 62/786,341, filed on Dec. 29, 2018, provisional application No. 62/784,472, filed on Dec. 23, 2018, provisional application No. 62/783,192, filed on Dec. 20, 2018, provisional application No. 62/780,211, filed on Dec. 15, 2018, provisional application No. 62/779,005, filed on Dec. 13, 2018, provisional application No. 62/777,338, filed on Dec. 10, 2018, provisional application No. 62/777,273, filed on Dec. 10, 2018, provisional application No. 62/773,912, filed on Nov. 30, 2018, provisional application No. 62/773,071, filed on Nov. 29, 2018, provisional application No. 62/771,045, filed on Nov. 24, 2018, provisional application No. 62/768,864, filed on Nov. 17, 2018, provisional application No. 62/767,413, filed on Nov. 14, 2018, provisional application No. 62/758,778, filed on Nov. 12, 2018, provisional application No. 62/757,751, filed on Nov. 8, 2018, provisional application No. 62/756,257, filed on Nov. 6, 2018, provisional application No. 62/756,264, filed on Nov. 26, 2018.

(56) References Cited

U.S. PATENT DOCUMENTS

| | | |
|---|---|---|
| 4,992,341 A | 2/1991 | Smith et al. |
| 5,364,712 A | 11/1994 | Townsend |
| 5,431,967 A | 7/1995 | Manthiram et al. |
| 5,554,454 A | 9/1996 | Gardner et al. |
| 5,908,713 A | 5/1999 | Reiter et al. |
| 6,399,233 B1 | 6/2002 | Milliken et al. |
| 6,645,660 B2 | 11/2003 | Datz et al. |
| 6,890,679 B2 | 5/2005 | Johnsen et al. |
| 7,141,271 B2 | 11/2006 | Barbezat et al. |
| 7,682,725 B2 | 3/2010 | Datz et al. |
| 7,909,971 B2 | 3/2011 | Nuzzo et al. |
| 8,163,353 B2 | 4/2012 | Lu |
| 8,211,587 B2 | 7/2012 | Ruka et al. |
| 9,327,448 B2 | 5/2016 | Shah et al. |
| 10,236,528 B2 | 3/2019 | Jakus et al. |
| 10,350,329 B2 | 7/2019 | Shah et al. |
| 2002/0028367 A1 | 3/2002 | Sammes et al. |
| 2002/0081481 A1 | 6/2002 | Keegan |
| 2002/0102450 A1 | 8/2002 | Badding et al. |
| 2003/0134171 A1 | 7/2003 | Sarkar et al. |
| 2003/0190503 A1 | 10/2003 | Kumar et al. |
| 2003/0235738 A1 | 12/2003 | Zheng |
| 2004/0000489 A1 | 1/2004 | Zhang et al. |
| 2004/0151957 A1 | 8/2004 | Brooks et al. |
| 2004/0166380 A1 | 8/2004 | Gorte et al. |
| 2005/0016839 A1 | 1/2005 | Horne et al. |
| 2005/0053819 A1 | 3/2005 | Paz |
| 2005/0118493 A1 | 6/2005 | Datz et al. |
| 2006/0228613 A1 | 10/2006 | Bourgeois et al. |
| 2007/0202378 A1 | 8/2007 | D'Urso et al. |
| 2008/0008826 A1 | 1/2008 | Coulon et al. |
| 2008/0085369 A1 | 4/2008 | Cai et al. |
| 2008/0160376 A1 | 7/2008 | Badding et al. |
| 2008/0178461 A1 | 7/2008 | Koripella et al. |
| 2008/0220307 A1 | 9/2008 | Fukushima et al. |
| 2010/0099000 A1 | 4/2010 | Kanba et al. |
| 2010/0136376 A1 | 5/2010 | Leah et al. |
| 2011/0070493 A1 | 3/2011 | Gadkaree et al. |
| 2011/0111292 A1 | 5/2011 | Kwon et al. |
| 2011/0120537 A1 | 5/2011 | Liu et al. |
| 2011/0171555 A1 | 7/2011 | Oloman |
| 2012/0032120 A1 | 2/2012 | Tan et al. |
| 2012/0070746 A1 | 3/2012 | Mikhaylik et al. |
| 2012/0183858 A1 | 7/2012 | Ellenwood et al. |
| 2013/0026032 A1 | 1/2013 | Pal et al. |
| 2013/0228547 A1 | 9/2013 | Scorsone et al. |
| 2013/0344383 A1 | 12/2013 | Loveness et al. |
| 2014/0051014 A1 | 2/2014 | Steinwandel et al. |
| 2014/0059846 A1 | 3/2014 | Schaefer |
| 2014/0072702 A1 | 3/2014 | Sullivan |
| 2014/0072720 A1* | 3/2014 | Watkins ............... H01M 6/40 252/521.1 |
| 2014/0315095 A1 | 10/2014 | Honkawa et al. |
| 2014/0352573 A1 | 12/2014 | Kasperchik et al. |
| 2014/0367894 A1 | 12/2014 | Kramer et al. |
| 2015/0035200 A1 | 2/2015 | Karpas et al. |
| 2015/0158728 A1 | 6/2015 | Liang et al. |

(56) References Cited

U.S. PATENT DOCUMENTS

| | | |
|---|---|---|
| 2015/0290860 A1 | 10/2015 | Shaw |
| 2016/0067827 A1 | 3/2016 | Zediker |
| 2016/0104882 A1 | 4/2016 | Yushin et al. |
| 2016/0167132 A1 | 6/2016 | Panat |
| 2016/0197356 A1 | 7/2016 | Montinaro et al. |
| 2016/0368056 A1 | 12/2016 | Swaminathan et al. |
| 2017/0009329 A1* | 1/2017 | Hunt ............... C23C 24/103 |
| 2017/0012319 A1 | 1/2017 | Ananden et al. |
| 2017/0081534 A1 | 3/2017 | Shah et al. |
| 2017/0098857 A1* | 4/2017 | Carlson ........... H01M 10/4235 |
| 2017/0222236 A1 | 8/2017 | Armstrong et al. |
| 2017/0346084 A1 | 11/2017 | Sakshaug et al. |
| 2018/0006301 A1 | 1/2018 | Im et al. |
| 2018/0019493 A1* | 1/2018 | Jakus ................. B33Y 80/00 |
| 2018/0056292 A1 | 3/2018 | Kwon et al. |
| 2018/0212083 A1 | 7/2018 | Kim et al. |
| 2018/0250746 A1 | 9/2018 | Symeonidis et al. |
| 2018/0301420 A1 | 10/2018 | Kim et al. |
| 2019/0207227 A1 | 7/2019 | Farandos et al. |
| 2019/0348669 A1* | 11/2019 | Carney ............... H01M 4/139 |

FOREIGN PATENT DOCUMENTS

| | | |
|---|---|---|
| KR | 20170114259 A * | 10/2017 |
| WO | WO2004019434 | 3/2004 |
| WO | WO2015076005 | 5/2015 |
| WO | WO2017207514 | 12/2017 |
| WO | WO2017221010 | 12/2017 |
| WO | WO2018038954 | 3/2018 |
| WO | WO2018068662 | 4/2018 |
| WO | WO2018068663 | 5/2018 |
| WO | WO2018080537 | 5/2018 |

OTHER PUBLICATIONS

English translation of KR20120129247A (Year: 2012).*
English translation of KR20170114259A (Year: 2017).*
Nicholas M. Farandos, Inkjet Printing for Solid Oxide Electrochemical Reactors, Imperial College London, UK, Department of Chemical Engineering Dissertation, May 2018.
N.M. Farandos et al., Three-dimensiona Inkjet Printed Solid Oxide Electrochemical Reactors, Electrochemica Acta 213 (2016), 324-331.
N. Geisendorfer, Efficient and Scalable Fabrication of Solid Oxide Fuel Cells via 3D-Printing, NASA, Sep. 15, 2017.
N. Farandos, Additive Manufacturing—The Printing Press Meets Energy Storage?, Energy Futures Lab Blog, Feb. 14, 2017.
X.Y. Tai et al, Accelerating Fuel Cell Development With Additive Manufacturing Technologies, Fuel Cells, vol. 19 (2016), 636-650.
Akanksha Umrani Fabrication of Micro Pillar Arrays via Aerosol Jet Printing, Rochester Institute of Technology, Rochester, NY, USA, Dissertation, Jan. 2015.
Wang et al. Electrical and Ionic Conductivity of Gd-Doped Ceria, J Electrochemical Society, vol. 147, pp. 3606-3609, 2000.
Kharton et al., Mixed Electronic and Ionic Conductivity of LaCo(M)O3 (M=Ga,Cr,Fe or Ni) Solid State Ionics, 1997, v104, p. 68, 76, Elsevier.

* cited by examiner

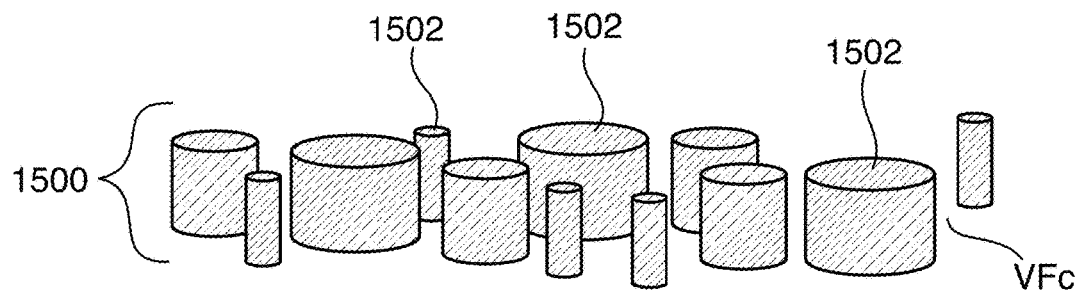
FIG. 15A
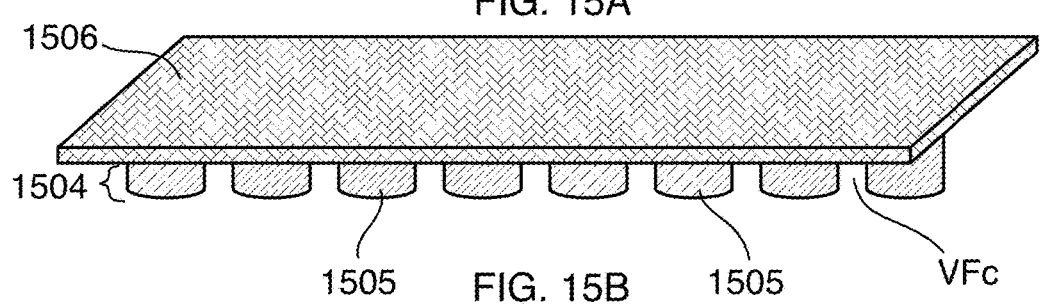
FIG. 15B
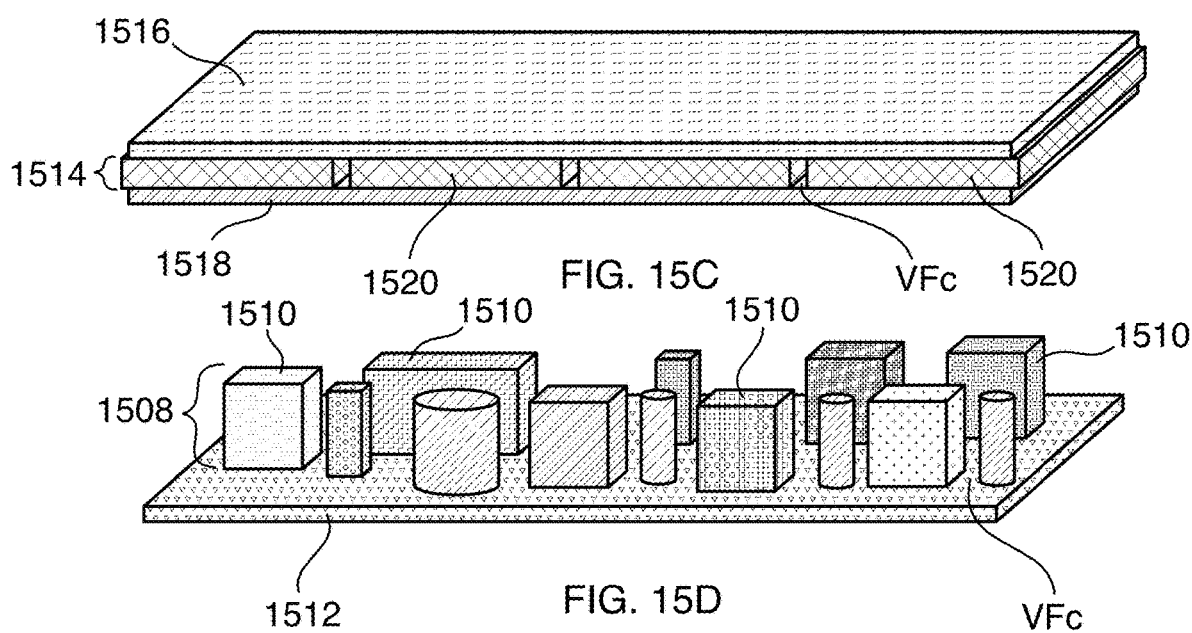
FIG. 15C
FIG. 15D

CHANNELED ELECTRODES AND METHOD OF MAKING

CROSS-REFERENCE TO RELATED APPLICATIONS

This application is a continuation-in-part application of U.S. patent application Ser. Nos. 16/684,838 and 16/684,864 filed Nov. 15, 2019, which are continuation-in-part applications of U.S. patent application Ser. No. 16/680,770 filed Nov. 12, 2019, which is a continuation-in-part application of U.S. patent application Ser. Nos. 16/674,580, 16/674,629, 16/674,657, 16/674,695 all filed Nov. 5, 2019, each of which claims the benefit under 35 U.S.C. 119(e) of U.S. Provisional Patent Application No. 62/756,257 filed Nov. 6, 2018, U.S. Provisional Patent Application No. 62/756,264 filed Nov. 6, 2018, U.S. Provisional Patent Application No. 62/757,751 filed Nov. 8, 2018, U.S. Provisional Patent Application No. 62/758,778 filed Nov. 12, 2018, U.S. Provisional Patent Application No. 62/767,413 filed Nov. 14, 2018, U.S. Provisional Patent Application No. 62/768,864 filed Nov. 17, 2018, U.S. Provisional Patent Application No. 62/771,045 filed Nov. 24, 2018, U.S. Provisional Patent Application No. 62/773,071 filed Nov. 29, 2018, U.S. Provisional Patent Application No. 62/773,912 filed Nov. 30, 2018, U.S. Provisional Patent Application No. 62/777,273 filed Dec. 10, 2018, U.S. Provisional Patent Application No. 62/777,338 filed Dec. 10, 2018, U.S. Provisional Patent Application No. 62/779,005 filed Dec. 13, 2018, U.S. Provisional Patent Application No. 62/780,211 filed Dec. 15, 2018, U.S. Provisional Patent Application No. 62/783,192 filed Dec. 20, 2018, U.S. Provisional Patent Application No. 62/784,472 filed Dec. 23, 2018, U.S. Provisional Patent Application No. 62/786,341 filed Dec. 29, 2018, U.S. Provisional Patent Application No. 62/791,629 filed Jan. 11, 2019, U.S. Provisional Patent Application No. 62/797,572 filed Jan. 28, 2019, U.S. Provisional Patent Application No. 62/798,344 filed Jan. 29, 2019, U.S. Provisional Patent Application No. 62/804,115 filed Feb. 11, 2019, U.S. Provisional Patent Application No. 62/805,250 filed Feb. 13, 2019, U.S. Provisional Patent Application No. 62/808,644 filed Feb. 21, 2019, U.S. Provisional Patent Application No. 62/809,602 filed Feb. 23, 2019, U.S. Provisional Patent Application No. 62/814,695 filed Mar. 6, 2019, U.S. Provisional Patent Application No. 62/819,374 filed Mar. 15, 2019, U.S. Provisional Patent Application No. 62/819,289 filed Mar. 15, 2019, U.S. Provisional Patent Application No. 62/824,229 filed Mar. 26, 2019, U.S. Provisional Patent Application No. 62/825,576 filed Mar. 28, 2019, U.S. Provisional Patent Application No. 62/827,800 filed Apr. 1, 2019, U.S. Provisional Patent Application No. 62/834,531 filed Apr. 16, 2019, U.S. Provisional Patent Application No. 62/837,089 filed Apr. 22, 2019, U.S. Provisional Patent Application No. 62/840,381 filed Apr. 29, 2019, U.S. Provisional Patent Application No. 62/844,125 filed May 7, 2019, U.S. Provisional Patent Application No. 62/844,127 filed May 7, 2019, U.S. Provisional Patent Application No. 62/847,472 filed May 14, 2019, U.S. Provisional Patent Application No. 62/849,269 filed May 17, 2019, U.S. Provisional Patent Application No. 62/852,045 filed May 23, 2019, U.S. Provisional Patent Application No. 62/856,736 filed Jun. 3, 2019, U.S. Provisional Patent Application No. 62/863,390 filed Jun. 19, 2019, U.S. Provisional Patent Application No. 62/864,492 filed Jun. 20, 2019, U.S. Provisional Patent Application No. 62/866,758 filed Jun. 26, 2019, U.S. Provisional Patent Application No. 62/869,322 filed Jul. 1, 2019, U.S. Provisional Patent Application No. 62/875,437 filed Jul. 17, 2019, U.S. Provisional Patent Application No. 62/877,699 filed Jul. 23, 2019, U.S. Provisional Patent Application No. 62/888,319 filed Aug. 16, 2019, U.S. Provisional Patent Application No. 62/895,416 filed Sep. 3, 2019, U.S. Provisional Patent Application No. 62/896,466 filed Sep. 5, 2019, U.S. Provisional Patent Application No. 62/899,087 filed on Sep. 11, 2019, U.S. Provisional Patent Application No. 62/904,683 filed on Sep. 24, 2019, U.S. Provisional Patent Application No. 62/912,626 filed on Oct. 8, 2019, U.S. Provisional Patent Application No. 62/925,210 filed on Oct. 23, 2019, U.S. Provisional Patent Application No. 62/927,627 filed on Oct. 29, 2019, U.S. Provisional Patent Application No. 62/928,326 filed on Oct. 30, 2019, U.S. Provisional Patent Application No. 62/934,808 filed on Nov. 13, 2019, and U.S. Provisional Patent Application No. 62/939,531 filed Nov. 22, 2019. The entire disclosures of each of these listed applications are hereby incorporated herein by reference.

TECHNICAL FIELD

This invention generally relates to electrochemical reactors. More specifically, this invention relates to electrochemical reactors with fluid dispersing components.

BACKGROUND

A fuel cell is an electrochemical apparatus or reactor that converts the chemical energy from a fuel into electricity through an electrochemical reaction. Sometimes, the heat generated by a fuel cell is also usable. There are many types of fuel cells. For example, proton-exchange membrane fuel cells (PEMFCs) are built out of membrane electrode assemblies (MEA) which include the electrodes, electrolyte, catalyst, and gas diffusion layers. An ink of catalyst, carbon, and electrode are sprayed or painted onto the solid electrolyte and carbon paper is hot pressed on either side to protect the inside of the cell and also act as electrodes. The most important part of the cell is the triple phase boundary where the electrolyte, catalyst, and reactants mix and thus where the cell reactions actually occur. The membrane must not be electrically conductive so that the half reactions do not mix.

PEMFCs are good candidates for vehicle and other mobile applications of all sizes (e.g., mobile phones) because they are compact. However, water management is crucial to performance. Too much water will flood the membrane and too little will dry it. In both cases, power output will drop. Water management is a difficult problem in PEM fuel cell systems, mainly because water in the membrane is attracted toward the cathode of the cell through polarization. Furthermore, the platinum catalyst on the membrane is easily poisoned by carbon monoxide (CO level needs to be no more than one part per million). The membrane is also sensitive to things like metal ions which can be introduced by corrosion of metallic bipolar plates, metallic components in the fuel cell system or from contaminants in the fuel and/or oxidant.

Solid oxide fuel cells (SOFCs) are a different class of fuel cells that use a solid oxide material as the electrolyte. SOFCs use a solid oxide electrolyte to conduct negative oxygen ions from the cathode to the anode. The electrochemical oxidation of the oxygen ions with fuel (e.g., hydrogen, carbon monoxide) occurs on the anode side. Some SOFCs use proton-conducting electrolytes (PC-SOFCs) which transport protons instead of oxygen ions through the electrolyte. Typically, SOFCs using oxygen ion conducting electrolytes have higher operating temperatures than PC-SOFCs. In addition, SOFCs do not typically require expensive platinum catalyst materials which are typically necessary for lower temperature fuel cells (i.e., PEMFCs), and are not vulnerable to carbon monoxide catalyst poisoning. Solid oxide fuel cells have a wide variety of applications, such as auxiliary power units for homes and vehicles as well as stationary power generation units for data centers. SOFCs comprise interconnects, which are placed between each individual cell so that the cells are connected in series and that the electricity generated by each cell is combined. One category of SOFCs are segmented-in-series (SIS) type SOFCs. The electrical current flow in SIS type SOFCs is parallel to the electrolyte in the lateral direction. Contrary to the SIS type SOFC, a different category of SOFC has electrical current flow perpendicular to the electrolyte in the lateral direction. These two categories of SOFCs are connected differently and assembled differently.

For the fuel cell to function properly and continuously, components for balance of plant (BOP) are needed. For example, the mechanical balance of plant includes air preheater, reformer and/or pre-reformer, afterburner, water heat exchanger and anode tail gas oxidizer. Other components are also needed, such as, power electronics, hydrogen sulfide sensors and fans for electrical balance of plant. These BOP components are often complex and expensive. Fuel cells and fuel cell systems are simply examples of the necessity and interest to develop advanced manufacturing systems and methods such that these efficient systems may be economically produced and widely deployed.

The manufacturing of devices and catalysts is often a complex and expensive process. For example, to manufacture a conventional fuel cell could require more than 100 steps utilizing dozens of machines. Furthermore, the deposition step and the heating/curing/sintering steps are often dissociated with one another. Herein is disclosed an integrated deposition and heating process that may significantly reduce manufacturing complexity and cost.

SUMMARY

In one aspect, the invention is a method of making an electrode for an electrochemical reactor including the steps of providing a template and depositing electrode material such that the electrode material is in contact with the template. This template is provided in a form that produces channels in the electrode material when at least a portion of the template is removed. Preferably, the electrode material comprises Ni, NiO, YSZ, CGO or GDC, LSM, LSCF, Cu, CuO, $Cu_2O$, SDC, SSZ, LSGM, or combinations thereof. Also, preferably, the template comprises carbon, graphite, graphene, cellulose, metal oxides, polymethyl methacrylate, nano diamonds, or combinations thereof. The template may also include dispersed metal oxide particles.

In another aspect, the template is provided by printing it or printing precursors that are combined to form the template.

In yet another aspect, the electrode material is deposited slice by slice, preferably by inkjet printing. Preferably, the deposited electrode material is sintered slice by slice using electromagnetic radiation.

In still yet another aspect, the method also includes the step of removing at least a portion of the template to produce the channels in the electrode material. This removing can be accomplished by heating, combustion, solvent treatment, oxidation, reduction, gasification, dissolution, vaporization, melting, or combinations thereof. Preferably, the removing takes place after the electrochemical reactor is formed or when the electrochemical reactor is first operated.

In another aspect, the invention is an electrode for an electrochemical reactor which includes electrode material and a template, with the template occupying channels in the electrode material. Preferably, the electrode material comprises Ni, NiO, YSZ, CGO or GDC, LSM, LSCF, Cu, CuO, $Cu_2O$, SDC, SSZ, LSGM, or combinations thereof. Also, preferably, the template comprises carbon, graphite, graphene, cellulose, metal oxides, polymethyl methacrylate, nano diamonds, or combinations thereof.

In yet another aspect, these channels extend across the length of the electrode in the direction of fluid flow when the electrode is in use. Preferably, the channels have a height that is less than the thickness of the electrode.

In another aspect, the invention is an electrode for an electrochemical reactor comprising electrode material and channels. Preferably, the electrode material comprises Ni, NiO, YSZ, CGO or GDC, LSM, LSCF, Cu, CuO, $Cu_2O$, SDC, SSZ, LSGM, or combinations thereof.

Preferably, these channels extend across the length of the electrode in the direction of fluid flow when the electrode is in use and have a height that is less than the thickness of the electrode. More preferably, the electrode has multiple tiers of channels.

Further aspects and embodiments are provided in the following drawings, detailed description and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 15A schematically illustrates segments of fluid dispersing components in a first layer;

FIG. 15B schematically illustrates fluid dispersing components in a first layer along with a second layer;

FIG. 15C schematically illustrates fluid dispersing components in a first layer along with a second and third layer;

FIG. 15D schematically illustrates fluid dispersing components in a first layer along with a second layer;

DETAILED DESCRIPTION

Overview

Figure 1:
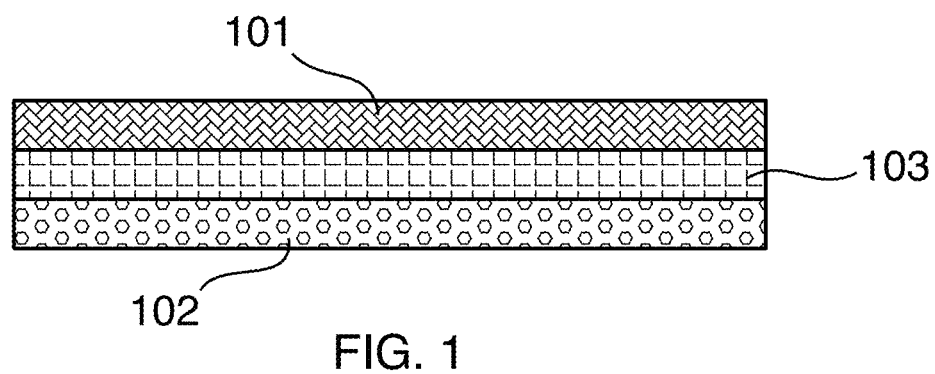
FIG. 1 illustrates a fuel cell component comprising an anode, an electrolyte and a cathode.

Embodiments of methods, materials and processes described herein are directed towards making electrodes for use in electrochemical reactors. Electrochemical reactors include solid oxide fuel cells, solid oxide fuel cell stacks, electrochemical gas producers, electrochemical compressors, solid state batteries, or solid oxide flow batteries. The preferred methods utilize a template to form electrodes with channels. The channels may have various sizes.

Some methods described to form electrodes with channels include depositing electrode materials, such as printing, onto templates. The templates may also be formed by the same or different deposition methods used for the electrode materials. Channels may be formed by removing at least a portion of template by the methods of heating, combustion, solvent treatment, oxidation, reduction, gasification, dissolution, vaporization, melting, or combinations thereof. Preferably, the removing takes place after the electrochemical reactor is formed or when the electrochemical reactor is first operated. Various materials for the template material and for the electrode material are disclosed.

Definitions

The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

The term "in situ" in this disclosure refers to the treatment (e.g., heating) process being performed either at the same location or in the same device of the forming process of the compositions or materials. For example, the deposition process and the heating process are performed in the same device and at the same location, in other words, without changing the device and without changing the location within the device. For example, the deposition process and the heating process are performed in the same device at different locations, which is also considered in situ.

In this disclosure, a major face of an object is the face of the object that has a surface area larger than the average surface area of the object, wherein the average surface area of the object is the total surface area of the object divided by the number of faces of the object. In some cases, a major face refers to a face of an item or object that has a larger surface area than a minor face. In the case of planar fuel cells or non-SIS type fuel cells, a major face is the face or surface in the lateral direction.

As used herein, the phrase "strain rate tensor" or "SRT" is meant to refer to the rate of change of the strain of a material in the vicinity of a certain point and at a certain time. It can be defined as the derivative of the strain tensor with respect to time. When SRTs or difference of SRTs are compared in this disclosure, it is the magnitude that is being used.

As used herein, lateral refers to the direction that is perpendicular to the stacking direction of the layers in a non-SIS type fuel cell. Thus, lateral direction refers to the direction that is perpendicular to the stacking direction of the layers in a fuel cell or the stacking direction of the slices to form an object during deposition. Lateral also refers to the direction that is the spread of deposition process.

Syngas (i.e., synthesis gas) in this disclosure refers to a mixture consisting primarily of hydrogen, carbon monoxide and carbon dioxide.

In this disclosure, absorbance is a measure of the capacity of a substance to absorb electromagnetic radiation (EMR) of a wavelength.

Absorption of radiation refers to the energy absorbed by a substance when exposed to the radiation.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow. For example, an impermeable layer has a permeability of less than 1 micro darcy, or less than 1 nano darcy.

In this disclosure, an interconnect having no fluid dispersing element refers to an interconnect having no elements (e.g., channels) to disperse a fluid. A fluid may comprise a gas or a liquid or a mixture of a gas and a liquid. Such fluids may include one or more of hydrogen, methane, ethane, propane, butane, oxygen, ambient air or light hydrocarbons (i.e., pentane, hexane, octane). Such an interconnect may have inlets and outlets (i.e., openings) for materials or fluids to pass through.

In this disclosure, the term "microchannels" is used interchangeably with microfluidic channels or microfluidic flow channels.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece. In this disclosure and the appended claims, $T_{sinter}$ refers to the temperature at which this phenomenon begins to take place.

As used herein, the term "pore former" is intended to have a relatively broad meaning. "Pore former" may be referring to any particulate material that is included in a composition during formation, which may partially or completely vacate a space by a process, such as heating, combustion or vaporizing. As used herein, the term "electrically conductive component" is intended to refer to components in a fuel cell, such as electrodes and interconnects, that are electrically conductive.

For illustrative purposes, the production of solid oxide fuel cells (SOFCs) will be used as an example system herein to describe the various embodiments. As one in the art recognizes though, the methodologies and the manufacturing processes described herein are applicable to any electrochemical device, reactor, vessel, catalyst, etc. Examples of electrochemical devices or reactors includes electrochemical (EC) gas producer electrochemical (EC) compressor, solid oxide fuel cells, solid oxide fuel cell stack, solid state battery, or solid oxide flow battery. In an embodiment, an electrochemical reactor comprises solid oxide fuel cell, solid oxide fuel cell stack, electrochemical gas producer, electrochemical compressor, solid state battery, or solid oxide flow battery. Catalysts include Fischer Tropsch (FT) catalysts or reformer catalysts. Reactor/vessel includes FT reactor or heat exchanger.

Integrated Deposition and Heating

Disclosed herein is a method comprising depositing a composition on a substrate slice by slice (this may also be described as line-by-line deposition) to form an object; heating in situ the object using electromagnetic radiation (EMR); wherein said composition comprises a first material and a second material, wherein the second material has a higher absorbance of EMR than the first material. In various embodiments, heating may cause an effect comprising drying, curing, sintering, annealing, sealing, alloying, evaporating, restructuring, foaming or combinations thereof. In some embodiments, the EMR has a peak wavelength ranging from 10 to 1500 nm and a minimum energy density of 0.1 Joule/$cm^2$ wherein the peak wavelength is on the basis of irradiance with respect to wavelength. In some embodiments, the EMR comprises one or more of UV light, near ultraviolet light, near infrared light, infrared light, visible light, laser or electron beam.

Figure 6:
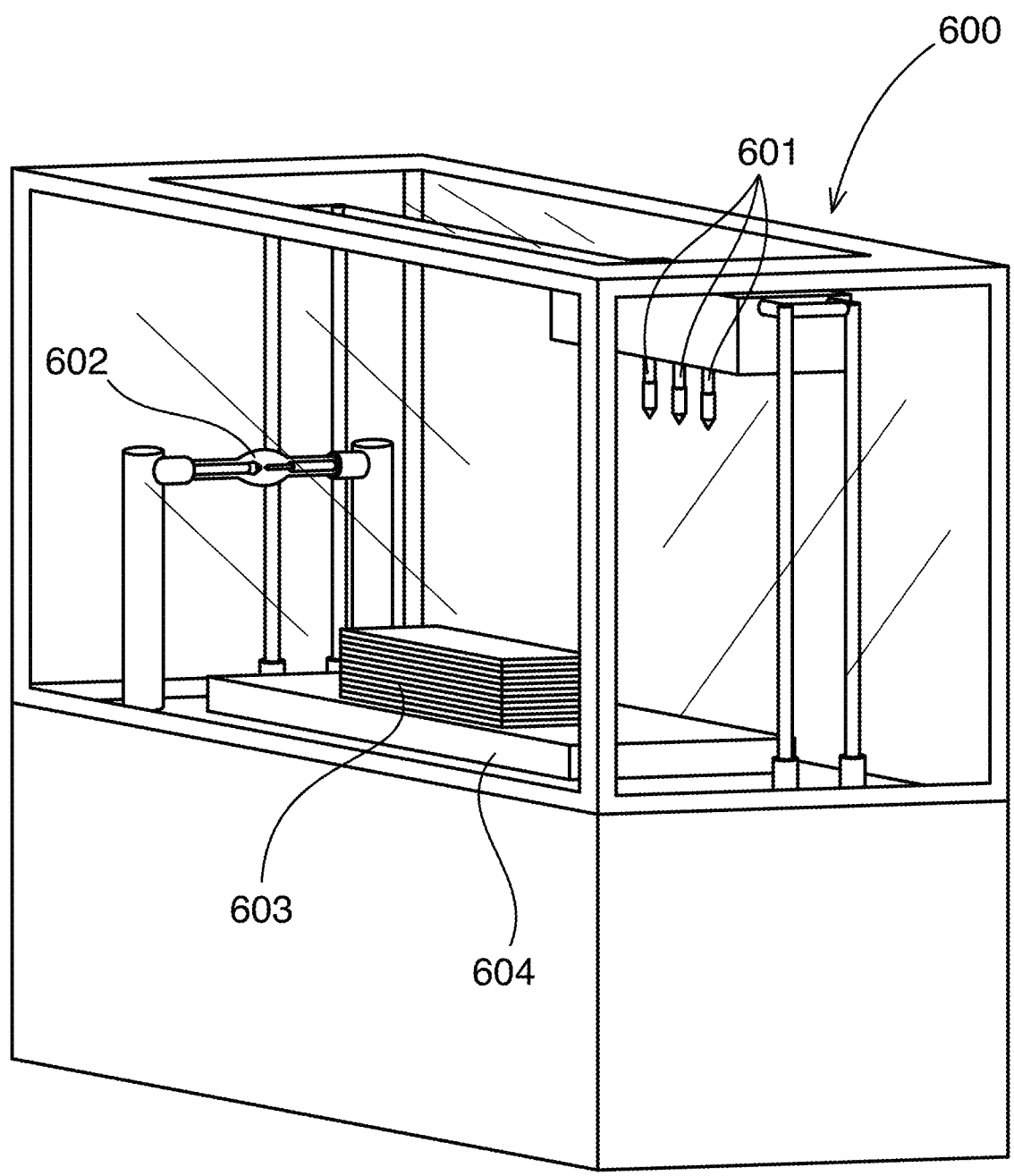
FIG. 6 illustrates a system for integrated deposition and heating using electromagnetic radiation (EMR)

FIG. 6 illustrates a system for integrated deposition and heating using electromagnetic radiation (EMR). FIG. 6 further illustrates system 600 an object 603 on a receiver 604 formed by deposition nozzles 601 and EMR 602 for heating in situ, according to an embodiment of this disclosure. Receiver 604 may be a platform that moves and may further receive deposition, heat, irradiation, or combinations thereof. Receiver 604 may also be referred to as a chamber wherein the chamber may be completely enclosed, partially enclosed or completely open to the atmosphere.

In some embodiments, the first material comprises yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel or combinations thereof. In other embodiments, the first material comprises YSZ, SSZ, CGO, SDC, NiO-YSZ, LSM-YSZ, CGO-LSCF, doped lanthanum chromite, stainless steel or combinations thereof. In some embodiments, the second material comprises carbon, nickel oxide, nickel, silver, copper, CGO, SDC, NiO-YSZ, NiO-SSZ, LSCF, LSM, doped lanthanum chromite ferritic steels or combinations thereof.

In some embodiments, object 603 comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel or combinations thereof.

In some embodiments, the second material may be deposited in the same slice as the first material. In other embodiments, the second material may be deposited in a slice adjacent another slice that contains the first material. In some embodiments, said heating may remove at least a portion of the second material. In preferred embodiments, said heating leaves minimal residue of the second material such that there is no significant residue that would interfere with the subsequent steps in the process or the operation of the device being constructed. More preferably, this leaves no measurable reside of the portion of the second material.

In some embodiments, the second material may add thermal energy to the first material during heating. In other embodiments, the second material has a radiation absorbance that is at least 5 times that of the first material; the second material has a radiation absorbance that is at least 10 times that of the first material; the second material has a radiation absorbance that is at least 50 times that of the first material or the second material has a radiation absorbance that is at least 100 times that of the first material.

In some embodiments, the second material may have a peak absorbance wavelength no less than 200 nm, or 250 nm, or 300 nm, or 400 nm, or 500 nm. In other embodiments, the first material has a peak absorbance wavelength no greater than 700 nm, or 600 nm, or 500 nm, or 400 nm, or 300 nm. In other embodiments, the EMR has a peak wavelength no less than 200 nm, or 250 nm, or 300 nm, or 400 nm, or 500 nm.

In some embodiments, the second material may comprise carbon, nickel oxide, nickel, silver, copper, CGO, NiO-YSZ, LSCF, LSM, ferritic steels, other metal oxides or combinations thereof. In some cases, the ferritic steel is Crofer 22 APU. In some embodiments, the first material comprises YSZ, CGO, NiO-YSZ, LSM-YSZ, other metal oxides or combinations thereof. In an embodiment, the second material comprises LSCF, LSM, carbon, nickel oxide, nickel, silver, copper, or steel. In some embodiments, carbon comprises graphite, graphene, carbon nanoparticles, nano diamonds or combinations thereof.

In some embodiments, the deposition method comprises material jetting, binder jetting, inkjet printing, aerosol jetting, aerosol jet printing, vat photopolymerization, powder bed fusion, material extrusion, directed energy deposition, sheet lamination, ultrasonic inkjet printing or combinations thereof.

In some embodiments, the deposition method further comprises one or more of the steps of controlling distance from the EMR to the receiver, EMR energy density, EMR spectrum, EMR voltage, EMR exposure duration, EMR exposure area, EMR exposure volume, EMR burst frequency, EMR exposure repetition number. In an embodiment, the object does not change location between the deposition and heating steps. In an embodiment, the EMR has a power output of no less than 1 W, or 10 W, or 100 W, or 1000 W.

Also disclosed herein is a system comprising at least one deposition nozzle, an electromagnetic radiation (EMR) source and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

The following detailed description describes the production of solid oxide fuel cells (SOFCs) for illustrative purposes. As one in the art recognizes, the methodology and the manufacturing processes are applicable to all fuel cell types. As such, the production of all fuel cell types is within the scope of this disclosure.

Additive Manufacturing

Additive manufacturing (AM) refers to a group of techniques that join materials to make objects, usually slice by slice or layer upon layer. AM is contrasted to subtractive manufacturing methodologies, which involve removing sections of a material by machining, cutting, grinding or etching away. AM may also be referred to as additive fabrication, additive processes, additive techniques, additive layer manufacturing, layer manufacturing or freeform fabrication. Some examples of AM are extrusion, photopolymerization, powder bed fusion, material jetting, binder jetting, directed energy deposition, lamination, direct metal laser sintering (DMLS), selective laser sintering (SLS), selective laser melting (SLM), directed energy deposition (DED), laser metal deposition (LMD), electron beam (EBAM) and metal binder jetting. A 3D printer is a type of AM machine (AMM). An inkjet printer or ultrasonic inkjet printer are additional examples of AMMs.

In a first aspect, the invention is a method of making a fuel cell comprising: (a) producing an anode using an AMM; (b) creating an electrolyte using the AMM; and (c) making a cathode using the AMM. In preferred embodiments, the anode, the electrolyte and the cathode are assembled into a fuel cell utilizing an AMM in addition to other steps that are not completed using an AMM. In a preferred embodiment, the fuel cell is formed using only the AMM. In other embodiments, steps (a), (b), and (c) exclude tape casting and screen printing. In an embodiment, the method of assembling a fuel cell with an AMM excludes compression in assembling. In other embodiments, the layers are deposited one on top of another in a step-wise manner such that assembling is accomplished at the same time as deposition. The methods described herein are useful in making planar fuel cells. The methods described herein are also useful in making fuel cell, wherein electrical current flow is perpendicular to the electrolyte in the lateral direction when the fuel cell is in use.

In an embodiment, the interconnect, the anode, the electrolyte, and the cathode are formed layer on layer, for example, printed layer on layer. It is important to note that, within the scope of the invention, the order of forming these layers can be varied. In other words, either the anode or the cathode can be formed before the other. Naturally, the electrolyte is formed so that it is between the anode and the cathode. Barrier layer(s), catalyst layer(s) and interconnect(s) are formed so as to lie in the appropriate position within the fuel cell to perform their functions.

In some embodiments, each of the interconnect, the anode, the electrolyte and the cathode has six faces. In preferred embodiments, the anode is printed on the interconnect and is in contact with the interconnect; the electrolyte is printed on the anode and is in contact with the anode; the cathode is printed on the electrolyte and is in contact with the electrolyte. Each print may be sintered, for example, using EMR. As such, the assembly process and the forming process are simultaneous, which is not possible with conventional methods. Moreover, with the preferred embodiment, the needed electrical contact and gas tightness are also achieved at the same time. In contrast, conventional fuel cell assembly processes accomplish this via pressing or compression of the fuel cell components or layers. The pressing and compression processes can cause cracks in the fuel cell layers that are undesirable.

In some embodiments, the AM method comprises making at least one barrier layer using the AMM. In preferred embodiments, the at least one barrier layer may be located between the electrolyte and the cathode or between the electrolyte and the anode or both. In other embodiments, the at least one barrier layer may be assembled with the anode, the electrolyte and the cathode using the AMM. In some embodiments, no barrier layer is needed or utilized in the fuel cell.

In some embodiments, the AM method comprises making an interconnect using the AMM. In other embodiments, the interconnect may be assembled with the anode, the electrolyte and the cathode using the AMM. In some embodiments, the AMM forms a catalyst and incorporates said catalyst into the fuel cell.

In some embodiments, the anode, the electrolyte, the cathode and the interconnect are made at a temperature above 100° C. In some embodiment, the AM method comprises heating the fuel cell, wherein said fuel cell comprises the anode, the electrolyte, the cathode, the interconnect and optionally at least one barrier layer. In some embodiments, the fuel cell comprises a catalyst. In some embodiments, the method comprises heating the fuel cell to a temperature above 500° C. In some embodiments, the fuel cell is heated using one or both of EMR or oven curing.

In a preferred embodiment, the AMM utilizes a multi-nozzle additive manufacturing method. In a preferred embodiment, the multi-nozzle additive manufacturing method comprises nanoparticle jetting. In some embodiments, a first nozzle delivers a first material, a second nozzle delivers a second material, a third nozzle delivers a third material. In some embodiments, particles of a fourth material are placed in contact with a partially constructed fuel cell and bonded to the partially constructed fuel cell using a laser, photoelectric effect, light, heat, polymerization or binding. In an embodiment, the anode, the cathode or the electrolyte comprises a first, second, third or fourth material. In preferred embodiments, the AMM performs multiple AM techniques. In various embodiments, the AM techniques comprise one or more of extrusion, photopolymerization, powder bed fusion, material jetting, binder jetting, directed energy deposition or lamination. In various embodiments, AM is a deposition technique comprising material jetting, binder jetting, inkjet printing, aerosol jetting, or aerosol jet printing, vat photopolymerization, powder bed fusion, material extrusion, directed energy deposition, sheet lamination, ultrasonic inkjet printing or combinations thereof.

Further described herein is an AM method of making a fuel cell stack comprising: (a) producing an anode using an additive manufacturing machine (AMM); (b) creating an electrolyte using the AMM; (c) making a cathode using the AMM; (d) making an interconnect using the AMM; wherein the anode, the electrolyte, the cathode, and the interconnect form a first fuel cell; (e) repeating steps (a)-(d) to make a second fuel cell; and (f) assembling the first fuel cell and the second fuel cell into a fuel cell stack.

In some embodiments, the first fuel cell and the second fuel cell are formed from the anode, the electrolyte, the cathode and the interconnect utilizing the AMM. In an embodiment, the fuel cell stack is formed using only the AMM. In other embodiments, steps (a)-(f) exclude one or both of tape casting and screen printing.

In some embodiments, the AM method comprises making at least one barrier layer using the AMM. In some embodiments, the at least one barrier layer is located between the electrolyte and the cathode or between the electrolyte and the anode or both for the first fuel cell and the second fuel cell.

In some embodiments, steps (a)-(d) are performed at a temperature above 100° C. In other embodiments, steps (a)-(d) are performed at a temperature in the range of 100° C. to 500° C. In some embodiments, the AMM makes a catalyst and incorporates said catalyst into the fuel cell stack.

In some embodiments, the AM method comprises heating the fuel cell stack. In an embodiment, the AM method comprises heating the fuel cell stack to a temperature above 500° C. In some embodiments, the fuel cell stack is heated using EMR and/or oven curing. In some embodiments, the laser has a laser beam, wherein the laser beam is expanded to create a heating zone with uniform power density. In some embodiments, the laser beam is expanded by utilizing one or more mirrors. In some embodiments, each layer of the fuel cell may be cured separately by EMR. In some embodiments, a combination of one or more fuel cell layers may be cured together by EMR. In some embodiments, the first fuel cell is EMR cured, assembled with the second fuel cell, and then the second fuel cell is EMR cured. In other embodiments, the first fuel cell is assembled with the second fuel cell, and then the first fuel cell and the second fuel cell are cured separately by EMR. In some embodiments, the first fuel cell and the second fuel cell may be cured separately by EMR, and then the first fuel cell is assembled with the second fuel cell to form a fuel cell stack. In some embodiments, the first fuel cell is assembled with the second fuel cell to form a fuel cell stack, and then the fuel cell stack may be cured by EMR.

Also discussed herein is an AM method of making a multiplicity of fuel cells comprising (a) producing a multiplicity of anodes simultaneously using an additive manufacturing machine (AMM); (b) creating a multiplicity of electrolytes using the AMM simultaneously; and (c) making a multiplicity of cathodes using the AMM simultaneously. In preferred embodiments, the anodes, the electrolytes and cathodes are assembled into fuel cells utilizing the AMM simultaneously. In other preferred embodiments, the fuel cells are formed using only the AMM.

In some embodiments, the method comprises making at least one barrier layer using the AMM for each of the multiplicity of fuel cells simultaneously. The at least one barrier layer may be located between the electrolyte and the cathode or located between the electrolyte and the anode, or both. In preferred embodiments, the at least one barrier layer may be assembled with the anode, the electrolyte and the cathode using the AMM for each fuel cell.

In some embodiments, the method comprises making an interconnect using the AMM for each of the multiplicity of fuel cells simultaneously. The interconnect may be assembled with the anode, the electrolyte and the cathode using the AMM for each fuel cell. In other embodiments, the AMM forms a catalyst for each of the multiplicity of fuel cells simultaneously and incorporates said catalyst into each of the fuel cells. In other embodiments, heating each layer or heating a combination of layers of the multiplicity of fuel cells takes place simultaneously. The multiplicity of fuel cells may include two or more fuel cells.

In preferred embodiments, the AMM uses two or more different nozzles to jet or print different materials at the same time. For a first example, in an AMM, a first nozzle deposits an anode layer for fuel cell 1, a second nozzle deposits a cathode layer for fuel cell 2 and a third nozzle deposits an electrolyte for fuel cell 3, at the same time. For a second example, in an AMM, a first nozzle deposits an anode for fuel cell 1, a second nozzle deposits a cathode for fuel cell 2, a third nozzle deposits an electrolyte for fuel cell 3 and a fourth nozzle deposits an interconnect for fuel cell 4, at the same time.

Disclosed herein is an additive manufacturing machine (AMM) comprising a chamber wherein manufacturing of fuel cells takes place. Said chamber is able to withstand temperatures of at least 100° C. In an embodiment, said chamber enables production of the fuel cells. The chamber enables heating of the fuel cells in situ as the components of the fuel cell are being deposited.

In some embodiments, the chamber may be heated by laser, electromagnetic waves/electromagnetic radiation (EMR), hot fluid or a heating element associated with the chamber, or combinations thereof. The heating element may comprise a heated surface, heating coil or a heating rod. In other embodiments, said chamber may be configured to apply pressure to the fuel cells inside. The pressure may be applied via a moving element associated with the chamber. The moving element may be a moving stamp or plunger. In some embodiments, said chamber may be configured to withstand pressure. The chamber may be configured to be pressurized or depressurized by a fluid. The fluid in the chamber may be changed or replaced when needed.

In some cases, the chamber may be enclosed. In some cases, the chamber may be sealed. In some cases, the chamber may be open to ambient atmosphere or to a controlled atmosphere. In some cases, the chamber may be a platform without top and side walls.

Referring to FIG. 6, system 600 comprises deposition nozzles or material jetting nozzles 601, EMR source 602 (e.g., xenon lamp); object being formed 603, and chamber or receiver 604 as a part of an AMM. As illustrated in FIG. 6, the chamber or receiver 604 is configured to receive both deposition from nozzles and radiation from EMR source 602. In various embodiments, deposition nozzles 601 may be movable. In various embodiments, the chamber or receiver 604 may be movable. In various embodiments, EMR source 602 is movable. In various embodiments, the object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel or combinations thereof.

AM techniques suitable for this disclosure comprise extrusion, photopolymerization, powder bed fusion, material jetting, binder jetting, directed energy deposition and lamination. In some embodiments, extrusion may be used for AM. Extrusion AM involves the spatially controlled deposition of material (e.g., thermoplastics). Extrusion AM may also referred to as fused filament fabrication (FFF) or fused deposition modeling (FDM) in this disclosure.

In some embodiments, AM comprises photopolymerization (i.e., stereolithography (SLA)) for the process of this disclosure. SLA involves spatially-defined curing of a photoactive liquid (a "photoresin"), using a scanning laser or a high-resolution projected image, and transforming the photoactive liquid into a crosslinked solid. Photopolymerization can produces parts with details and dimensions ranging from the micrometer- to meter-scales.

In some embodiments, AM comprises powder bed fusion (PBF). PBF AM processes build objects by melting powdered feedstock, such as a polymer or metal. PBF processes begin by spreading a thin layer of powder across a build area. Cross-sections are then melted a layer at a time, most often using a laser, electron beam or intense infrared lamps. In some embodiments, PBF of metals may use selective laser melting (SLM) or electron beam melting (EBM). In other embodiments, PBF of polymers may use selective laser sintering (SLS). In various embodiments, SLS systems may print thermoplastic polymer materials, polymer composites or ceramics. In various embodiments, SLM systems may be suitable for a variety of pure metals and alloys, wherein the alloys are compatible with rapid solidification that occurs in SLM.

In some embodiments, AM may comprise material jetting. AM by material jetting may be accomplished by depositing small drops (or droplets) of material with spatial control. In various embodiments, material jetting is performed three dimensionally (3D), two dimensionally (2D) or both. In preferred embodiments, 3D jetting is accomplished layer by layer. In preferred embodiments, print preparation converts the computer-aided design (CAD), along with specifications of material composition, color, and other variables to the printing instructions for each layer. Binder jetting AM involves inkjet deposition of a liquid binder onto a powder bed. In some cases, binder jetting is combined with other AM processes, such as for example, spreading of powder to make the powder bed (analogous to SLS/SLM) and inkjet printing.

In some embodiments, AM comprises directed energy deposition (DED). Instead of using a powder bed as discussed above, the DED process uses a directed flow of powder or a wire feed, along with an energy intensive source such as laser, electric arc or electron beam. In preferred embodiments, DED is a direct-write process, wherein the location of material deposition is determined by movement of the deposition head which allows large metal structures to be built without the constraints of a powder bed.

In some embodiments, AM comprises lamination AM or laminated object manufacturing (LOM). In preferred embodiments, consecutive layers of sheet material are consecutively bonded and cut in order to form a 3D structure.

Traditional methods of manufacturing a fuel cell stack can comprise over 100 steps. These steps may include, but not limited to, milling, grinding, filtering, analyzing, mixing, binding, evaporating, aging, drying, extruding, spreading, tape casting, screen printing, stacking, heating, pressing, sintering and compressing. The methods disclosed herein describe manufacturing of a fuel cell or fuel cell stack using one AMM.

The AMM of this disclosure preferably performs both extrusion and ink jetting to manufacture a fuel cell or fuel cell stack. Extrusion may be used to manufacture thicker layers of a fuel cell, such as, the anode and/or the cathode. Ink jetting may be used to manufacture thin layers of a fuel cell. Ink jetting may be used to manufacture the electrolyte. The AMM may operate at temperature ranges sufficient to enable curing in the AMM itself. Such temperature ranges are 100° C. or above, 100-300° C. or 100-500° C.

As a preferred example, all layers of a fuel cell are formed and assembled via printing. The material for making the anode, cathode, electrolyte and the interconnect, respectively, may be made into an ink form comprising a solvent and particles (e.g., nanoparticles). There are two categories of ink formulations—aqueous inks and non-aqueous inks. In some cases, the aqueous ink comprises an aqueous solvent (e.g., water, deionized water), particles, dispersant and a surfactant. In some cases, the aqueous ink comprises an aqueous solvent, particles, dispersant, surfactant but no polymeric binder. The aqueous ink may optionally comprise a co-solvent, such as an organic miscible solvent (methanol, ethanol, isopropyl alcohol). Such co-solvents preferably have a lower boiling point than water. The dispersant may be an electrostatic dispersant, steric dispersant, ionic dispersant, or a non-ionic dispersant, or a combination thereof. The surfactant may preferably be non-ionic, such as an alcohol alkoxylate or an alcohol ethoxylate. The non-aqueous ink may comprise an organic solvent (e.g., methanol, ethanol, isopropyl alcohol, butanol) and particles.

For example, CGO powder is mixed with water to form an aqueous ink further comprising a dispersant and a surfactant but with no polymeric binder added. The CGO fraction based on mass (herein expressed as weight % (wt %)) is in the range of 10 wt % to 25 wt %. For example, CGO powder is mixed with ethanol to form a non-aqueous ink further comprising polyvinyl butaryl added with the CGO fraction in the range of 3 wt % to 30 wt %. For example, LSCF is mixed with n-butanol or ethanol to form a non-aqueous ink further comprising polyvinyl butaryl with the LSCF fraction in the range of 10 wt % to 40 wt %. For example, YSZ particles are mixed with water to form an aqueous ink further comprising a dispersant and surfactant but with no polymeric binder added. The YSZ fraction is in the range of 3 wt % to 40 wt %. For example, NiO particles are mixed with water to form an aqueous ink further comprising a dispersant and surfactant but with no polymeric binder added with the NiO fraction in the range of 5 wt % to 25 wt %.

As an example, for the cathode of a fuel cell, LSCF or LSM particles are dissolved in a solvent, wherein the solvent is water or an alcohol (e.g., butanol) or a mixture of alcohols. Organic solvents other than alcohols may also be used in other examples. As an example, LSCF is deposited (e.g., printed) into a layer. A xenon lamp may be used to irradiate the LSCF layer with EMR to sinter the LSCF particles. The xenon flash lamp may be a 10 kW unit applied at a voltage of 400V and a frequency of 10 Hz for a total exposure duration of 1000 ms.

For example, for the electrolyte, YSZ particles are mixed with a solvent, wherein the solvent is water (e.g., de-ionized water) or an alcohol (e.g., butanol) or a mixture of alcohols. Organic solvents other than alcohols may also be used in other examples. For the interconnect, metallic particles (e.g., silver nanoparticles) are dissolved in a solvent, wherein the solvent may comprise water (e.g., de-ionized water) and an organic solvent. The organic solvent may comprise mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone or propylene carbonate, or combinations thereof. For a barrier layer in a fuel cell, CGO particles are dissolved in a solvent, wherein the solvent may be water (e.g., de-ionized water) or an alcohol. The alcohol may comprise methanol, ethanol, butanol or a mixture of alcohols. Organic solvents other than alcohols may also be used. CGO may be used as barrier layer for LSCF. YSZ may also be used as a barrier layer for LSM. In some cases, for the aqueous inks where water is the solvent, no polymeric binder may be added to the aqueous inks.

The manufacturing process of a conventional fuel cell sometimes comprises more than 100 steps and utilizing dozens of machines. According to an embodiment of this disclosure, a method of making a fuel cell comprises using only one AMM to manufacture a fuel cell, wherein the fuel cell comprises an anode, electrolyte and a cathode. In preferred embodiments, the fuel cell comprises at least one barrier layer, for example, between the electrolyte and the cathode, or between the electrolyte and the cathode, or both. The at least one barrier layer is preferably also made by the same AMM. In preferred embodiments, the AMM may also produce an interconnect and assembles the interconnect with the anode, cathode, at least one barrier layer and the electrolyte. Such manufacturing methods and systems are applicable not only to making fuel cells but also for making other types of electrochemical devices. The following discussion uses fuel cells as an example, but any reactor or catalyst is within the scope of this disclosure.

In various embodiments, a single AMM makes a first fuel cell, wherein the fuel cell comprises an anode, electrolyte, cathode, at least one barrier layer and an interconnect. In various embodiments, a single AMM makes a second fuel cell. In various embodiments, a single AMM is used to assemble a first fuel cell with a second fuel cell to form a fuel cell stack. In various embodiments, the production of fuel cells using an AMM is repeated as many times as desired. A fuel cell stack comprising two or more fuel cells is thus assembled using an AMM. In some embodiments, the various layers of the fuel cell are produced by an AMM above ambient temperature. For example, the temperatures may be above 100° C., in the range of 100° C. to 500° C. or in the range of 100° C. to 300° C. In various embodiments, a fuel cell or fuel cell stack is heated after it is assembled. In some embodiments, the fuel cell or fuel cell stack is heated at a temperature above 500° C. In preferred embodiments, the fuel cell or fuel cell stack is heated at a temperature in the range of 500° C. to 1500° C.

In various embodiments, an AMM comprises a chamber where the manufacturing of fuel cells takes place. This chamber may be able to withstand high temperature to enable the production of the fuel cells wherein the high temperature is at least 300° C., at least 500° C., at least 1000° C. or at least 1500° C. In some cases, this chamber may also enable the heating of the fuel cells to take place in the chamber. Various heating methods may be applied, such as laser heating/curing, electromagnetic wave heating, hot fluid heating or one or more heating elements associated with the chamber. The heating element may be a heating surface, heating coil or a heating rod and is associated with the chamber such that the content in the chamber is heated to the desired temperature range. In various embodiments, the chamber of the AMM may also be able to apply pressure to the fuel cell(s) inside. For example, a pressure may be applied via a moving element, such as a moving stamp or plunger. In various embodiments, the chamber of the AMM is able to withstand pressure. The chamber can be pressurized or depressurized as desired by a fluid. The fluid in the chamber can also be changed or replaced as needed.

In preferred embodiments, a fuel cell or fuel cell stack is heated using EMR. In other embodiments, the fuel cell or fuel cell stack may be heated using oven curing. In other embodiments, the laser beam may be expanded (for example, by the use of one or more mirrors) to create a heating zone with uniform power density. In a preferred embodiment, each layer of the fuel cell may be cured by EMR separately. In preferred embodiments, a combination of fuel cell layers may be EMR cured separately, for example, a combination of the anode, the electrolyte, and the cathode layers. In some embodiments, a first fuel cell is EMR cured, assembled with a second fuel cell, and then the second fuel cell is EMR cured. In an embodiment, a first fuel cell is assembled with a second fuel cell, and then the first fuel cell and the second fuel cell are EMR cured separately. In an embodiment, a first fuel cell is assembled with a second fuel cell to form a fuel cell stack, and then the fuel cell stack is EMR cured. A fuel cell stack comprising two or more fuel cells may be EMR cured. The sequence of laser heating/curing and assembling is applicable to all other heating methods.

In preferred embodiments, an AMM produces each layer of a multiplicity of fuel cells simultaneously. In preferred embodiments, the AMM assembles each layer of a multiplicity of fuel cells simultaneously. In preferred embodiments, heating each layer or heating a combination of layers of a multiplicity of fuel cells takes place simultaneously. All the discussion and all the features described herein for a fuel cell or a fuel cell stack are applicable to the production, assembling and heating of the multiplicity of fuel cells. In preferred embodiments, a multiplicity of fuel cells may be 2 or more 20 or more, 50 or more, 80 or more, 100 or more, 500 or more, 800 or more, 1000 or more, 5000 or more or 10,000 or more.

Treatment Process

Herein disclosed is a treatment process that comprises one or more of the following effects: heating, drying, curing, sintering, annealing, sealing, alloying, evaporating, restructuring, foaming or sintering. A preferred treatment process is sintering. The treatment process comprises exposing a substrate to a source of electromagnetic radiation (EMR). In some embodiments, EMR is exposed to a substrate having a first material. In various embodiments, the EMR has a peak wavelength ranging from 10 to 1500 nm. In various embodiments, the EMR has a minimum energy density of 0.1 Joule/cm$^2$. In an embodiment, the EMR has a burst frequency of $10^{-4}$–1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V. For example, a single pulse of EMR is applied with an exposure distance of about 10 mm and an exposure duration of 5-20 ms. For example, multiple pulses of EMR are applied at a burst frequency of 100 Hz with an exposure distance of about 10 mm and an exposure duration of 5-20 ms. In some embodiments, the EMR consists of one exposure. In other embodiment, the EMR comprises no greater than 10 exposures, or no greater than 100 exposures, or no greater than 1000 exposures, or no greater than 10,000 exposures.

In various embodiments, metals and ceramics are sintered almost instantaneously (milliseconds for <<10 microns) using pulsed light. The sintering temperature may be controlled to be in the range of 100° C. to 2000° C. The sintering temperature may be tailored as a function of depth. In one example, the surface temperature is 1000° C. and the sub-surface is kept at 100° C., wherein the sub-surface is 100 microns below the surface. In some embodiments, the material suitable for this treatment process includes yttria-stabilized zirconia (YSZ), 8YSZ (8 mol % YSZ powder), yttirum, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel, or combinations thereof.

This treatment process is applicable in the manufacturing process of a fuel cell. In preferred embodiments, a layer in a fuel cell (i.e., anode, cathode, electrolyte, seal, catalyst, etc) is treated using processes described herein to be heated, cured, sintered, sealed, alloyed, foamed, evaporated, restructured, dried or annealed or combinations thereof. In preferred embodiments, a portion of a layer in a fuel cell is treated using processes described herein to be heated, cured, sintered, sealed, alloyed, foamed, evaporated, restructured, dried, annealed, or combinations thereof. In preferred embodiments, a combination of layers of a fuel cell are treated using processes described herein to be heated, cured, sintered, sealed, alloyed, foamed, evaporated, restructured, dried, annealed or combinations thereof, wherein the layers may be a complete layer or a partial layer.

The treatment process of this disclosure is preferably rapid, with the treatment duration varied from microseconds to milliseconds. The treatment duration may be accurately controlled. The treatment process of this disclosure may produce fuel cell layers that have no cracks or have minimal cracking. The treatment process of this disclosure controls the power density or energy density in the treatment volume (the volume of an object being treated) of the material being treated. The treatment volume may be accurately controlled. In an embodiment, the treatment process of this disclosure provides the same energy density or different energy densities in a treatment volume. In an embodiment, the treatment process of this disclosure provides the same treatment duration or different treatment durations in a treatment volume. In an embodiment, the treatment process of this disclosure provides simultaneous treatment for one or more treatment volumes. In an embodiment, the treatment process of this disclosure provides simultaneous treatment for one or more fuel cell layers or partial layers or combination of layers. In an embodiment, the treatment volume is varied by changing the treatment depth.

In an embodiment, a first portion of a treatment volume is treated by electromagnetic radiation of a first wavelength; a second portion of the treatment volume is treated by electromagnetic radiation of a second wavelength. In some cases, the first wavelength is the same as the second wavelength. In some cases, the first wavelength is different from the second wavelength. In an embodiment, the first portion of a treatment volume has a different energy density from the second portion of the treatment volume. In an embodiment, the first portion of a treatment volume has a different treatment duration from the second portion of the treatment volume.

In an embodiment, the EMR has a broad emission spectrum so that the desired effects are achieved for a wide range of materials having different absorption characteristics. In this disclosure, absorption of electromagnetic radiation (EMR) refers to the process, wherein the energy of a photon is taken up by matter, such as the electrons of an atom. Thus, the electromagnetic energy is transformed into internal energy of the absorber, for example, thermal energy. For example, the EMR spectrum extends from the deep ultraviolet (UV) range to the near infrared (IR) range, with peak pulse powers at 220 nm wavelength. The power of such EMR is on the order of Megawatts. Such EMR sources perform tasks such as breaking chemical bonds, sintering, ablating or sterilizing.

In an embodiment, the EMR has an energy density of no less than 0.1, 1, or 10 Joule/cm$^2$. In an embodiment, the EMR has a power output of no less than 1 watt (W), 10 W, 100 W, 1000 W. The EMR delivers power to the substrate of no less than 1 W, 10 W, 100 W, 1000 W. In an embodiment, such EMR exposure heats the material in the substrate. In an embodiment, the EMR has a range or a spectrum of different wavelengths. In various embodiments, the treated substrate is at least a portion of an anode, cathode, electrolyte, catalyst, barrier layer, or interconnect of a fuel cell.

In an embodiment, the peak wavelength of the EMR is between 50 and 550 nm or between 100 and 300 nm. In an embodiment, the absorption of at least a portion of the substrate for at least one frequency of the EMR between 10 and 1500 nm is no less than 30% or no less than 50%. In an embodiment, the absorption of at least a portion of the substrate for at least one frequency between 50 and 550 nm is no less than 30% or no less than 50%. In an embodiment, the absorption of at least a portion of the substrate for at least one frequency between 100 and 300 nm is no less than 30% or no less than 50%.

Sintering is the process of compacting and forming a solid mass of material by heat or pressure without melting it to the point of liquefaction. In this disclosure, the substrate under EMR exposure is sintered but not melted. In preferred embodiments, the EMR comprises one or more of UV light, near ultraviolet light, near infrared light, infrared light, visible light, laser, electron beam, microwave. In an embodiment, the substrate is exposed to the EMR for no less than 1 microsecond, no less than 1 millisecond. In an embodiment, the substrate is exposed to the EMR for less than 1 second at a time or less than 10 seconds at a time. In an embodiment, the substrate is exposed to the EMR for less than 1 second or less than 10 seconds. In an embodiment, the substrate is exposed to the EMR repeatedly, for example, more than 1 time, more than 3 times, more than 10 times. In an embodiment, the substrate is distanced from the source of the EMR for less than 50 cm, less than 10 cm, less than 1 cm, or less than 1 mm.

In some embodiments, after EMR exposure a second material is added to or placed on to the first material. In various cases, the second material is the same as the first material. The second material may be exposed to EMR. In some cases, a third material may be added. The third material is exposed to EMR.

In comes embodiments, the first material comprises YSZ, 8YSZ, yttirum, zirconium, GDC, SDC, LSM, LSCF, LSC, nickel, NiO or cerium or a combination thereof. The second material may comprise graphite. In some embodiments, the electrolyte, anode, or cathode comprises a second material. In some cases, the volume fraction of the second material in the electrolyte, anode, or cathode is less than 20%, 10%, 3%, or 1%. The absorption rate of the second material for at least one frequency (e.g., between 10 and 1500 nm or between 100 and 300 nm or between 50 and 550 nm) is greater than 30% or greater than 50%.

In various embodiments, one or a combination of parameters may be controlled, wherein such parameters include distance between the EMR source and the substrate, the energy density of the EMR, the spectrum of the EMR, the voltage of the EMR, the duration of exposure, the burst frequency and the number of EMR exposures. Preferably, these parameters are controlled to minimize the formation of cracks in the substrate.

In an embodiment, the EMR energy is delivered to a surface area of no less than 1 mm$^2$, or no less than 1 cm$^2$, or no less than 10 cm$^2$, or no less than 100 cm$^2$. In some cases, during EMR exposure of the first material, at least a portion of an adjacent material is heated at least in part by conduction of heat from the first material. In various embodiments, the layers of the fuel cell (e.g., anode, cathode, electrolyte) are thin. Preferably they are no greater than 30 microns, no greater than 10 microns, or no greater than 1 micron.

In some embodiments, the first material of the substrate is in the form of a powder, sol gel, colloidal suspension, hybrid solution or sintered material. In various embodiments, the second material may be added by vapor deposition. In preferred embodiments, the second material coats the first material. In preferred embodiments, the second material reacts with light, (e.g. focused light), as by a laser, and sintered or annealed with the first material.

Advantages

The preferred treatment process of this disclosure enables rapid manufacturing of fuel cells by eliminating traditional, costly, time consuming, expensive sintering processes and replacing them with rapid, in situ methods that allow continuous manufacturing of the layers of a fuel cell in a single machine if desired. This process also shortens sintering time from hours and days to seconds or milliseconds or even microseconds.

In various embodiments, this treatment method is used in combination with manufacturing techniques like screen printing, tape casting, spraying, sputtering, physical vapor deposition and additive manufacturing.

This preferred treatment method enables tailored and controlled heating by tuning EMR characteristics (such as, wavelengths, energy density, burst frequency, and exposure duration) combined with controlling thicknesses of the layers of the substrate and heat conduction into adjacent layers to allow each layer to sinter, anneal, or cure at each desired target temperature. This process enables more uniform energy applications, decreases or eliminates cracking, which improves electrolyte performance. The substrate treated with this preferred process also has less thermal stress due to more uniform heating.

Particle Size Control

Without wishing to be limited by any theory, we have unexpectedly discovered that the sintering process may require much less energy expenditure and much less time than what is traditionally needed if the particle size distribution of the particles in a material is controlled to meet certain criteria. In some cases, such particle size distribution comprises D10 and D90, wherein 10% of the particles have a diameter no greater than D10 and 90% of the particles have a diameter no greater than D90, wherein D90/D10 is in the range of from 1.5 to 100. In some cases, such particle size distribution is bimodal such that the average particle size in the first mode is at least 5 times the average particle size in the second mode. In some cases, such particle size distribution comprises D50, wherein 50% of the particles have a diameter no greater than D50, wherein D50 is no greater than 100 nm. The sintering processes utilize electromagnetic radiation (EMR), or plasma, or a furnace, or hot fluid, or a heating element, or combinations thereof. Preferably, the sintering processes utilize electromagnetic radiation (EMR). For example, without the processes as disclosed herein, an EMR source just sufficient enough to sinter a material has power capacity P. With the processes as disclosed herein, the material is sintered with EMR sources having much less power capacity, e.g., 50% P or less, 40% P or less, 30% P or less, 20% P or less, 10% P or less, 5% P or less.

Herein disclosed is a method of sintering a material comprising mixing particles with a liquid to form a dispersion, wherein the particles have a particle size distribution comprising D10 and D90, wherein 10% of the particles have a diameter no greater than D10 and 90% of the particles have a diameter no greater than D90, wherein D90/D10 is in the range of from 1.5 to 100; depositing the dispersion on a substrate to form a layer; and treating the layer to cause at least a portion of the particles to sinter.

In some embodiments, the particle size distribution is a number distribution determined by dynamic light scattering. Dynamic light scattering (DLS) is a technique that can be used to determine the size distribution profile of small particles in a dispersion or suspension. In the scope of DLS, temporal fluctuations are typically analyzed by means of the intensity or photon auto-correlation function (also known as photon correlation spectroscopy or quasi-elastic light scattering). In the time domain analysis, the autocorrelation function (ACF) usually decays starting from zero delay time, and faster dynamics due to smaller particles lead to faster decorrelation of scattered intensity trace. It has been shown that the intensity ACF is the Fourier transformation of the power spectrum, and therefore the DLS measurements can be equally well performed in the spectral domain.

In an embodiment, the particle size distribution is determined by transmission electron microscopy (TEM). TEM is a microscopy technique in which a beam of electrons is transmitted through a specimen to form an image. In this case, the specimen is most often a suspension on a grid. An image is formed from the interaction of the electrons with the sample as the beam is transmitted through the specimen. The image is then magnified and focused onto an imaging device, such as a fluorescent screen or a sensor such as a scintillator attached to a charge-coupled device.

Herein disclosed is a method of sintering a material comprising mixing particles with a liquid to form a dispersion, wherein the particles have a particle size distribution comprising D50, wherein 50% of the particles have a diameter no greater than D50, wherein D50 is no greater than 100 nm; depositing the dispersion on a substrate to form a layer; and treating the layer to cause at least a portion of the particles to sinter. In various embodiments, D50 is no greater than 50 nm, or no greater than 30 nm, or no greater than 20 nm, or no greater than 10 nm, or no greater than 5 nm. In an embodiment, the layer has a thickness of no greater than 1 mm or no greater than 500 microns or no greater than 300 microns or no greater than 100 microns or no greater than 50 microns.

In some embodiments, depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In some embodiments, said liquid comprises water and at least one organic solvent having a lower boiling point than water and miscible with water. In some embodiments, said liquid comprises water, a surfactant, a dispersant and no polymeric binder. In some embodiments, said liquid comprises one or more organic solvents and no water. In some embodiments, the particles comprise Cu, CuO, $Cu_2O$, Ag, $Ag_2O$, Au, $Au_2O$, $Au_2O_3$, titanium, yttria-stabilized zirconia (YSZ), 8YSZ (8 mol % YSZ powder), yttirum, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel (Ni), NiO, NiO-YSZ, Cu-CGO, cerium, crofer, steel, lanthanum chromite, doped lanthanum chromite, ferritic steel, stainless steel, or combinations thereof.

In some embodiments, wherein the particles have a bi-modal particle size distribution such that the average particle size in the first mode is at least 5 times the average particle size in the second mode. In some embodiments, D10 is in the range of from 5 nm to 50 nm or from 5 nm to 100 nm or from 5 nm to 200 nm. In some embodiments, D90 is in the range of from 50 nm to 500 nm or from 50 nm to 1000 nm. In some embodiments, D90/D10 is in the range of from 2 to 100 or from 4 to 100 or from 2 to 20 or from 2 to 10 or from 4 to 20 or from 4 to 10.

In some embodiments, the method comprises drying the dispersion after depositing. In some embodiments, drying comprises heating the dispersion before deposition, heating the substrate that is contact with the dispersion, or combination thereof. Drying may take place for a time period in the range of 1 ms to 1 min or 1 s to 30 s or 3 s to 10 s. In some embodiments, the dispersion may be deposited at a temperature in the range of 40° C. to 100° C. or 50° C. to 90° C. or 60° C. to 80° C. or about 70° C.

In some embodiments, treating comprises the use of electromagnetic radiation (EMR), or a furnace, or plasma, or hot fluid, or a heating element, or combinations thereof. In some embodiments, the EMR comprises UV light, near ultraviolet light, near infrared light, infrared light, visible light, laser, electron beam or microwave or a combination thereof. In an embodiment, the EMR consists of one exposure. In other embodiments, the EMR has an exposure frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V.

Fuel Cell

A fuel cell is an electrochemical apparatus that converts the chemical energy from a fuel into electricity through an electrochemical reaction. As mentioned above, there are many types of fuel cells, e.g., proton-exchange membrane fuel cells (PEMFCs), solid oxide fuel cells (SOFCs). A fuel cell typically comprises an anode, a cathode, an electrolyte, an interconnect, optionally a barrier layer and/or optionally a catalyst. Both the anode and the cathode are electrodes. The listings of material for the electrodes, the electrolyte, and the interconnect in a fuel cell are applicable in some cases to the EC gas producer and the EC compressor. These listings are only examples and not limiting. Furthermore, the designations of anode material and cathode material are also not limiting because the function of the material during operation (e.g., whether it is oxidizing or reducing) determines whether the material is used as an anode or a cathode.

FIGS. 1-5 illustrate various embodiments of the components in a fuel cell or a fuel cell stack. In these embodiments, the anode, cathode, electrolyte, and interconnect are cuboids or rectangular prisms.

FIG. 1 illustrates a fuel cell component comprising an anode, an electrolyte and a cathode. The top layer in Fig. is an anode layer 101, the top layer is the cathode 102 and the middle layer is an electrolyte 103.

Figure 2:
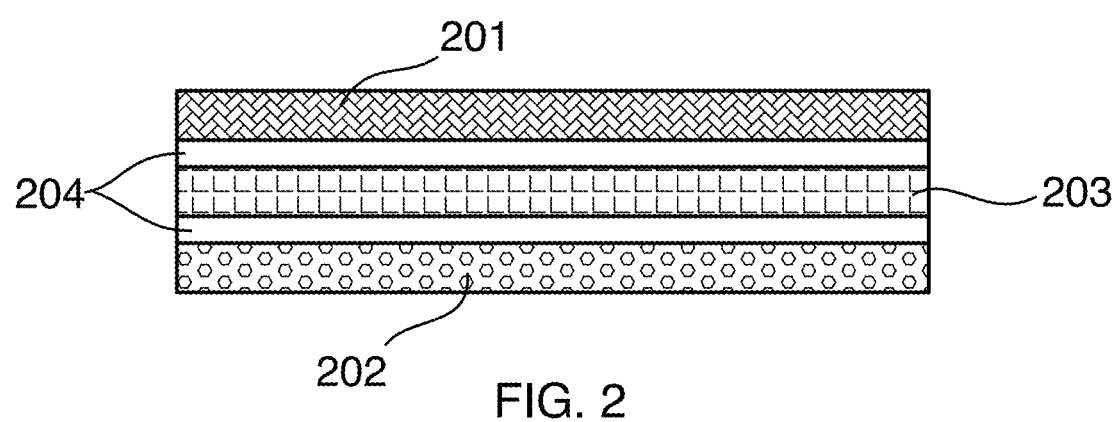
FIG. 2 illustrates a fuel cell component comprising an anode, an electrolyte, a barrier layer and a cathode.

FIG. 2 illustrates a fuel cell component comprising an anode, an electrolyte, a barrier layer and a cathode. The top layer is an anode 201, bottom layer 202 is a cathode, layer 203 is the electrolyte and layers 204 are barrier layers.

Figure 3:
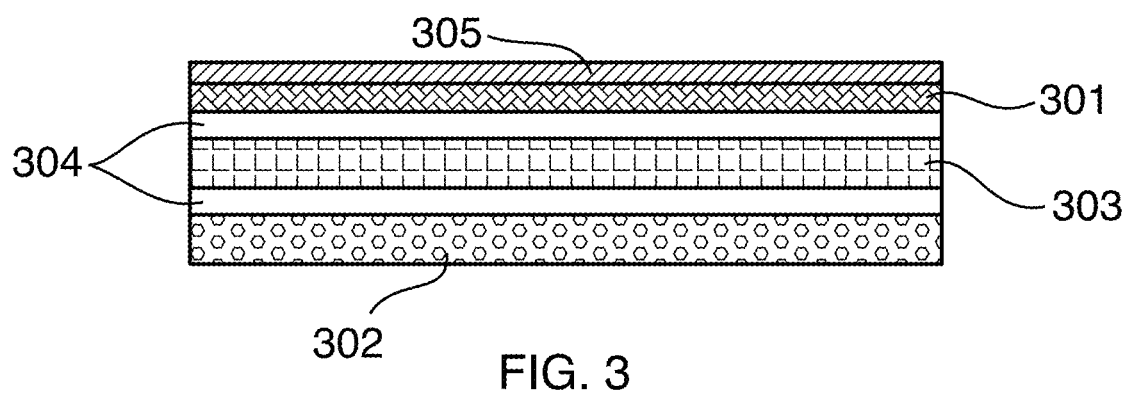
FIG. 3 illustrates a fuel cell component comprising an anode, a catalyst, an electrolyte, a barrier layer and a cathode.

FIG. 3 illustrates a fuel cell component comprising an anode, a catalyst, an electrolyte, a barrier layer and a cathode. Layer 301 schematically illustrates the anode, layer 302 is the cathode, layer 303 is an electrolyte, layers 304 are barrier layers and layer 305 is a catalyst.

Figure 4:
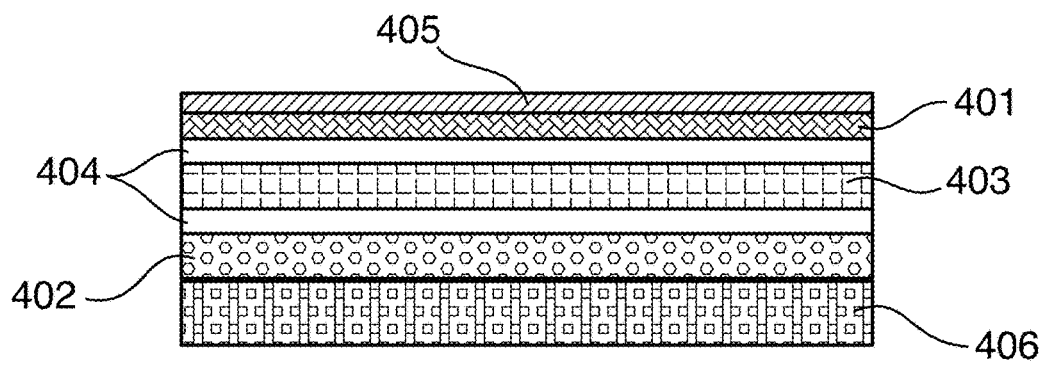
FIG. 4 illustrates a fuel cell component comprising an anode, a catalyst, an electrolyte, a barrier layer, a cathode and an interconnect.

FIG. 4 illustrates a fuel cell component comprising an anode, a catalyst, an electrolyte, a barrier layer, a cathode and an interconnect. Layer 401 schematically illustrates an anode, layer 402 represents a cathode, layer 403 represents an electrolyte, layers 404 represents barrier layers layer 405 represents a catalyst and layer 406 represents an interconnect.

Figure 5:
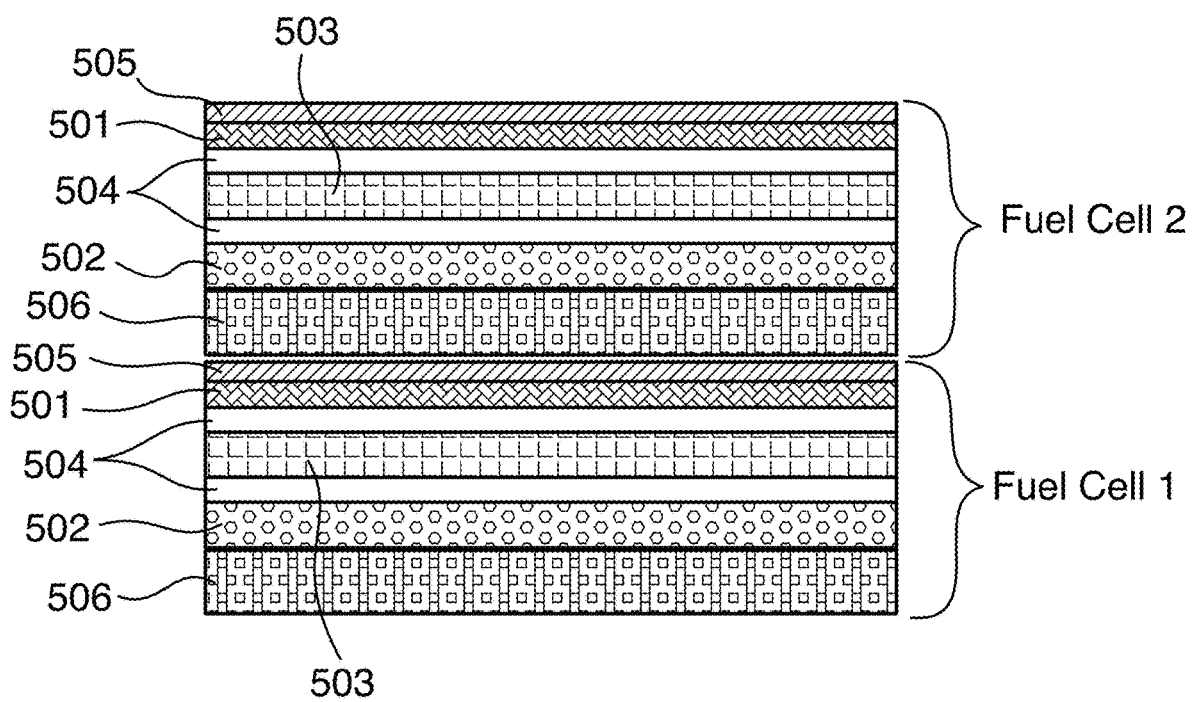
FIG. 5 schematically illustrates two fuel cells in a fuel cell stack.

FIG. 5 schematically illustrates two fuel cells in a fuel cell stack. The two fuel cells are denoted "Fuel Cell 1" and "Fuel Cell 2". Each fuel cell in FIG. 5 comprises an anode layer 501, cathode layer 502, electrolyte layer 503, barrier layers 504, catalyst layer 505 and interconnect layer 506. Two fuel cell repeat units or two fuel cells form a stack as illustrated. As is seen, on one side interconnect 506 is in contact with the largest surface of cathode 502 of fuel cell 2 (or fuel cell repeat unit) and on the opposite side interconnect 506 is in contact with the largest surface of catalyst 505 (optional) or the anode 501 of bottom fuel cell 2 (or fuel cell repeat unit). These repeat units or fuel cells are connected in parallel by being stacked atop one another and sharing an interconnect in between via direct contact with the interconnect rather than via electrical wiring. This kind of configuration illustrated in FIG. 5 contrasts with segmented-in-series (SIS) type fuel cells.

Cathode

In some embodiments, the cathode comprises perovskites, such as LSC, LSCF or LSM. In some embodiments, the cathode comprises one or more of lanthanum, cobalt, strontium or manganite. In an embodiment, the cathode is porous. In some embodiments, the cathode comprises one or more of YSZ, nitrogen, nitrogen boron doped graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In some embodiments, the cathode comprises LSCo, LCo, LSF, LSCoF, or a combination thereof. In some embodiments, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature fuel cell operation.

In some embodiments, the cathode comprises a material selected from the group consisting of lanthanum strontium manganite, lanthanum strontium ferrite, and lanthanum strontium cobalt ferrite. In preferred embodiments, the cathode comprises lanthanum strontium manganite.

Anode

In some embodiments, the anode comprises copper, nickel-oxide, nickel-oxide-YSZ, NiO-GDC, NiO-SDC, aluminum doped zinc oxide, molybdenum oxide, lanthanum, strontium, chromite, ceria, perovskites (such as, LSCF [La{1-x}Sr{x}Co{1-y}Fe{y}O₃] or LSM [La{1-x}Sr{x}MnO₃], where x is usually in the range of 0.15-0.2 and y is in the range of 0.7 to 0.8). In some embodiments, the anode comprises SDC or BZCYYb coating or barrier layer to reduce coking and sulfur poisoning. In an embodiment, the anode is porous. In some embodiments, the anode comprises a combination of electrolyte material and electrochemically active material or a combination of electrolyte material and electrically conductive material.

In a preferred embodiment, the anode comprises nickel and yttria stabilized zirconia. In a preferred embodiment, the anode is formed by reduction of a material comprising nickel oxide and yttria stabilized zirconia. In a preferred embodiment, the anode comprises nickel and gadolinium stabilized ceria. In a preferred embodiment, the anode is formed by reduction of a material comprising nickel oxide and gadolinium stabilized ceria.

Electrolyte

In an embodiment, the electrolyte in a fuel cell comprises stabilized zirconia (e.g., YSZ, YSZ-8, $Y_{0.16}Zr_{0.84}O_2$). In an embodiment, the electrolyte comprises doped LaGaO3, (e.g., LSGM, $La_{0.9}Sr_{0.1}Ga_{0.8}Mg0.2O_3$). In an embodiment, the electrolyte comprises doped ceria, (e.g., GDC, $Gd_{0.2}Ce_{0.8}O_2$). In an embodiment, the electrolyte comprises stabilized bismuth oxide (e.g., BVCO, $Bi_2V_{0.9}Cu_{0.1}O_{5.35}$).

In some embodiments, the electrolyte comprises zirconium oxide, yttria stabilized zirconium oxide (also known as YSZ, YSZ8 (8 mole % YSZ)), ceria, gadolinia, scandia, magnesia or calcia or a combination thereof. In an embodiment, the electrolyte is sufficiently impermeable to prevent significant gas transport and prevent significant electrical conduction; and allow ion conductivity. In some embodiments, the electrolyte comprises doped oxide such as cerium oxide, yttrium oxide, bismuth oxide, lead oxide, lanthanum oxide. In some embodiments, the electrolyte comprises perovskite, such as, LaCoFeO3 or LaCoO3 or $Ce_{0.9}Gd_{0.1}O_2$ (GDC) or $Ce_{0.9}Sm_{0.1}O_2$(SDC, samaria doped ceria) or scandia stabilized zirconia or a combination thereof.

In some embodiments, the electrolyte comprises a material selected from the group consisting of zirconia, ceria, and gallia. In some embodiments, the material is stabilized with a stabilizing material selected from the group consisting of scandium, samarium, gadolinium, and yttrium. In an embodiment, the material comprises yttria stabilized zirconia.

Interconnect

In some embodiments, the interconnect comprises silver, gold, platinum, AlSl441, ferritic stainless steel, stainless steel, lanthanum, chromium, chromium oxide, chromite, cobalt, cesium, $Cr_2O_3$, or a combination thereof. In some embodiments, the anode comprises a $LaCrO_3$ coating on $Cr_2O_3$ or $NiCo_2O_4$ or $MnCo_2O_4$ coatings. In some embodiments, the interconnect surface is coated with Cobalt and/or Cesium. In some embodiments, the interconnect comprises ceramics. In some embodiment, the interconnect comprises lanthanum chromite or doped lanthanum chromite. In an embodiment, the interconnect comprises a material further comprising metal, stainless steel, ferritic steel, crofer, lanthanum chromite, silver, metal alloys, nickel, nickel oxide, ceramics, or graphene or a combination thereof.

Catalyst

In various embodiments, the fuel cell comprises a catalyst, such as, platinum, palladium, scandia, chromium, cobalt, cesium, $CeO_2$, nickel, nickel oxide, zinc, copper, titania, ruthenium, rhodium, MoS2, molybdenum, rhenium, vandia, manganese, magnesium or iron or a combination thereof. In various embodiments, the catalyst promotes methane reforming reactions to generate hydrogen and carbon monoxide such that they may be oxidized in the fuel cell. Very often, the catalyst is part of the anode, especially nickel anode which has inherent methane reforming properties. In an embodiment, the catalyst is between 1%-5%, or 0.1% to 10% by mass. In an embodiment, the catalyst is used on the anode surface or in the anode. In various embodiments, such anode catalysts reduce harmful coking reactions and carbon deposits. In various embodiments, simple oxide versions of catalysts or perovskite may be used as catalysts. For example, about 2% mass $CeO_2$ catalyst is used for methane-powered fuel cells. In various embodiments, the catalyst may be dipped or coated on the anode. In various embodiments, the catalyst is made by an additive manufacturing machine (AMM) and incorporated into the fuel cell using the AMM.

The unique manufacturing methods discussed herein have described the assembly of ultra-thin fuel cells and fuel cell stacks. Conventionally, to achieve structural integrity, the fuel cell has at least one thick layer per repeat unit. This may be the anode (such as an anode-supported fuel cell) or the interconnect (such as an interconnect-supported fuel cell). As discussed above, pressing or compression steps are typically necessary to assemble the fuel cell components to achieve gas tightness and/or proper electrical contact in traditional manufacturing processes. As such, the thick layers are necessary not only because traditional methods (like tape casting) cannot produce ultra-thin layers but also because the layers must be thick to endure the pressing or compression steps. The preferred manufacturing methods of this disclosure have eliminated the need for pressing or compression. The preferred manufacturing methods of this disclosure have also enabled the making of ultra-thin layers. The multiplicity of the layers in a fuel cell or a fuel cell stack provides sufficient structural integrity for proper operation when they are made according to this disclosure.

Herein disclosed is a fuel cell comprising an anode no greater than 1 mm or 500 microns or 300 microns or 100 microns or 50 microns or no greater than 25 microns in thickness. The cathode no greater than 1 mm or 500 microns or 300 microns or 100 microns or 50 microns or no greater than 25 microns in thickness. The electrolyte no greater than 1 mm or 500 microns or 300 microns or 100 microns or 50 microns or 30 microns in thickness. In an embodiment, the fuel cell comprises an interconnect having a thickness of no less than 50 microns. In some cases, a fuel cell comprises an anode no greater than 25 microns in thickness, a cathode no greater than 25 microns in thickness, and an electrolyte no greater than 10 microns or 5 microns in thickness. In an embodiment, the fuel cell comprises an interconnect having a thickness of no less than 50 microns. In an embodiment, the interconnect has a thickness in the range of 50 microns to 5 cm.

In a preferred embodiment, a fuel cell comprises an anode no greater than 100 microns in thickness, a cathode no greater than 100 microns in thickness, an electrolyte no greater than 20 microns in thickness, and an interconnect no greater than 30 microns in thickness. In a more preferred embodiment, a fuel cell comprises an anode no greater than 50 microns in thickness, a cathode no greater than 50 microns in thickness, an electrolyte no greater than 10 microns in thickness, and an interconnect no greater than 25 microns in thickness. In an embodiment, the interconnect has a thickness in the range of 1 micron to 20 microns.

In a preferred embodiment, the fuel cell comprises a barrier layer between the anode and the electrolyte, or a barrier layer between the cathode and the electrolyte, or both barrier layers. In some cases, the barrier layers are the interconnects. In such cases, the reactants are directly injected into the anode and the cathode.

In an embodiment, the cathode has a thickness of no greater than 15 microns, or no greater than 10 microns, or no greater than 5 microns. In an embodiment, the anode has a thickness no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, the interconnect is made of a material comprising metal, stainless steel, silver, metal alloys, nickel, nickel oxide, ceramics, or graphene. In an embodiment, the fuel cell has a total thickness of no less than 1 micron.

Also discussed herein is a fuel cell stack comprising a multiplicity of fuel cells, wherein each fuel cell comprises an anode no greater than 25 microns in thickness, a cathode no greater than 25 microns in thickness, an electrolyte no greater than 10 microns in thickness, and an interconnect having a thickness in the range from 100 nm to 100 microns. In an embodiment, each fuel cell comprises a barrier layer between the anode and the electrolyte, or a barrier layer between the cathode and the electrolyte, or both barrier layers. In an embodiment, the barrier layers are the interconnects. For example, the interconnect is made of silver. For example, the interconnect has a thickness in the range from 500 nm to 1000 nm. In an embodiment, the interconnect is made of a material comprising metal, stainless steel, silver, metal alloys, nickel, nickel oxide, ceramics, or graphene.

In an embodiment, the cathode has a thickness of no greater than 15 microns, or no greater than 10 microns, or no greater than 5 microns. In an embodiment, the anode has a thickness of no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, each fuel cell has a total thickness of no less than 1 micron.

Further discussed herein is a method of making a fuel cell comprising (a) forming an anode no greater than 25 microns in thickness, (b) forming a cathode no greater than 25 microns in thickness, and (c) forming an electrolyte no greater than 10 microns in thickness. In an embodiment, steps (a)-(c) are performed using additive manufacturing. In various embodiments, said additive manufacturing employs one or more of extrusion, photopolymerization, powder bed fusion, material jetting, binder jetting, directed energy deposition or lamination.

In an embodiment, the method comprises assembling the anode, the cathode, and the electrolyte using additive manufacturing. In an embodiment, the method comprises forming an interconnect and assembling the interconnect with the anode, the cathode, and the electrolyte.

In preferred embodiments, the method comprises making at least one barrier layer. In preferred embodiments, the at least one barrier layer is used between the electrolyte and the cathode or between the electrolyte and the anode, or both. In an embodiment, the at least one barrier layer also acts as an interconnect.

In preferred embodiments, the method comprises heating the fuel cell such that shrinkage rates of the anode, the cathode, and the electrolyte are matched. In some embodiments, such heating takes place for no greater than 30 minutes, preferably no greater than 30 seconds, and most preferably no greater than 30 milliseconds. In this disclosure, matching shrinkage rates during heating is discussed in detail below (Matching SRTs). When a fuel cell comprises a first composition and a second composition, wherein the first composition has a first shrinkage rate and the second composition has a second shrinkage rate, the heating described in this disclosure preferably takes place such that the difference between the first shrinkage rate and the second shrinkage rate is no greater than 75% of the first shrinkage rate.

In a preferred embodiment, the heating employs electromagnetic radiation (EMR). In various embodiments, EMR comprises UV light, near ultraviolet light, near infrared light, infrared light, visible light, laser, electron beam. Preferably, heating is performed in situ.

Also disclosed herein is a method of making a fuel cell stack comprising a multiplicity of fuel cells, the method comprising: (a) forming an anode no greater than 25 microns in thickness in each fuel cell, (b) forming a cathode no greater than 25 microns in thickness in each fuel cell, (c) forming an electrolyte no greater than 10 microns in thickness in each fuel cell, and (d) producing an interconnect having a thickness of from 100 nm to 100 microns in each fuel cell.

In an embodiment, steps (a)-(d) are performed using AM. In various embodiments, AM employs one or more of processes of extrusion, photopolymerization, powder bed fusion, material jetting, binder jetting, directed energy deposition or lamination.

In an embodiment, the method of making a fuel cell stack comprises assembling the anode, the cathode, the electrolyte, and the interconnect using AM. In an embodiment, the method comprises making at least one barrier layer in each fuel cell. In an embodiment, the at least one barrier layer is used between the electrolyte and the cathode or between the electrolyte and the anode or both. In an embodiment, the at least one barrier layer also acts as the interconnect.

In an embodiment, the method of making a fuel cell stack comprises heating each fuel cell such that shrinkage rates of the anode, the cathode, and the electrolyte are matched. In an embodiment, such heating takes place for no greater than 30 minutes, or no greater than 30 seconds, or no greater than 30 milliseconds. In a preferred embodiment, said heating comprises one or more of electromagnetic radiation (EMR). In various embodiments, EMR comprises UV light, near ultraviolet light, near infrared light, infrared light, visible light, laser, electron beam. In an embodiment, heating is performed in situ.

In an embodiment, the method comprises heating the entire fuel cell stack such that shrinkage rates of the anode, the cathode, and the electrolyte are matched. In some embodiments, such heating takes place for no greater than 30 minutes, or no greater than 30 seconds, or no greater than 30 milliseconds.

Herein discussed is a method of making an electrolyte comprising (a) formulating a colloidal suspension, wherein the colloidal suspension comprises an additive, particles having a range of diameters and a size distribution, and a solvent; (b) forming an electrolyte comprising the colloidal suspension; and (c) heating at least a portion of the electrolyte; wherein formulating the colloidal suspension is preferably optimized by controlling the pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof.

Figure 9:
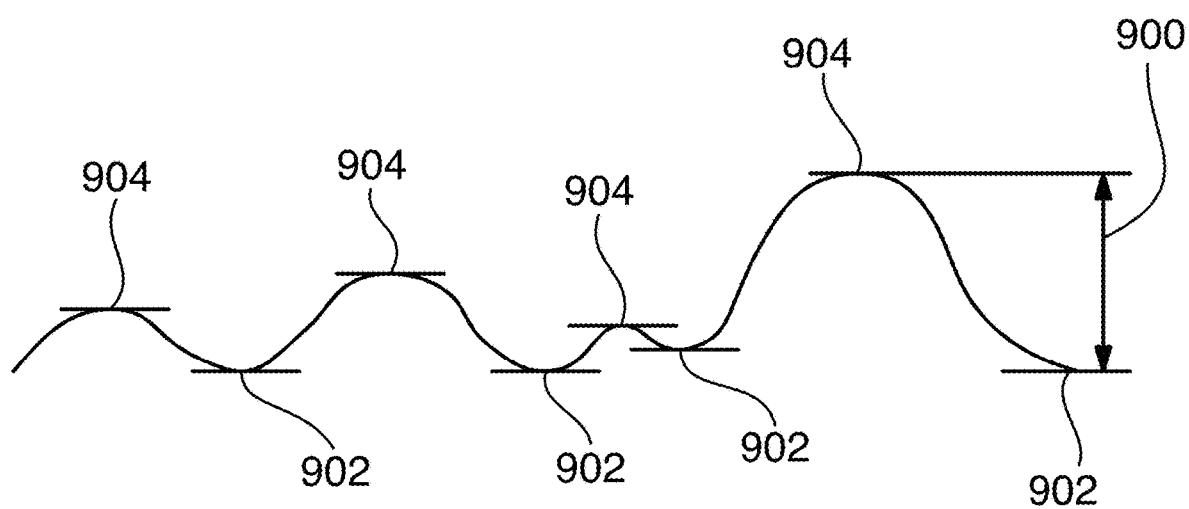
FIG. 9 illustrates maximum height profile roughness of an anode or cathode surface.

Herein discussed is a method of making a fuel cell comprising (a) obtaining a cathode and an anode; (b) modifying the cathode surface and the anode surface; (c) formulating a colloidal suspension, wherein the colloidal suspension comprises an additive, particles having a range of diameters and a size distribution, and a solvent; (d) forming an electrolyte comprising the colloidal suspension between the modified anode surface and the modified cathode surface; and (e) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the modified anode surface and the modified cathode surface have a maximum height profile roughness that is less than the average diameter of the particles in the colloidal suspension. The maximum height profile roughness 900 refers to the maximum distance between any trough 902 and an adjacent peak 904 of an anode surface or a cathode surface as illustrated in FIG. 9. In various embodiments, the anode surface and the cathode surface are modified via any suitable means.

Further disclosed herein is a method of making a fuel cell comprising (a) obtaining a cathode and an anode; (b) formulating a colloidal suspension, wherein the colloidal suspension comprises an additive, particles having a range of diameters and a size distribution, and a solvent; (c) forming an electrolyte comprising the colloidal suspension between the anode and the cathode; and (d) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the anode surface in contact with the electrolyte and the cathode surface in contact with the electrolyte have a maximum height profile roughness that is less than the average diameter of the particles in the colloidal suspension.

In a preferred embodiment, the solvent comprises water. In a preferred embodiment, the solvent comprises an organic component. The solvent may comprise ethanol, butanol, alcohol, terpineol, diethyl ether 1,2-dimethoxyethane (DME (ethylene glycol dimethyl ether), 1-propanol (n-propanol, n-propyl alcohol), or butyl alcohol or a combination thereof. In some embodiments, the solvent surface tension is less than half of water's surface tension in air. In an embodiment, the solvent surface tension is less than 30 mN/m at atmospheric conditions.

In some embodiments, the electrolyte is formed adjacent to a first substrate or the electrolyte is formed between a first substrate and a second substrate. In some embodiments, the first substrate has a maximum height profile roughness that is less than the average diameter of the particles. In some embodiments, the particles have a packing density greater than 40%, or greater than 50%, or greater than 60%. In an embodiment, the particles have a packing density close to the random close packing (RCP) density.

Random close packing (RCP) is an empirical parameter used to characterize the maximum volume fraction of solid objects obtained when they are packed randomly. A container is randomly filled with objects, and then the container is shaken or tapped until the objects do not compact any further, at this point the packing state is RCP. The packing fraction is the volume taken by a number of particles in a given space of volume. The packing fraction determines the packing density. For example, when a solid container is filled with grain, shaking the container will reduce the volume taken up by the objects, thus allowing more grain to be added to the container. Shaking increases the density of packed objects. When shaking no longer increases the packing density, a limit is reached and if this limit is reached without obvious packing into a regular crystal lattice, this is the empirical random close-packed density.

In some embodiments, the median particle diameter is between 50 nm and 1000 nm, or between 100 nm and 500 nm, or approximately 200 nm. In some embodiments, the first substrate comprises particles having a median particle diameter, wherein the median particle diameter of the electrolyte may be no greater than 10 times and no less than 1/10 of the median particle diameter of the first substrate. In some embodiments, the first substrate comprises a particle size distribution that is bimodal having a first mode and a second mode, each having a median particle diameter. In some embodiments, the median particle diameter in the first mode of the first substrate is greater than 2 times, or greater than 5 times, or greater than 10 times that of the second mode. The particle size distribution of the first substrate may be adjusted to change the behavior of the first substrate during heating. In some embodiments, the first substrate has a shrinkage that is a function of heating temperature. In some embodiments, the particles in the colloidal suspension may have a maximum particle diameter and a minimum particle diameter, wherein the maximum particle diameter is less than 2 times, or less than 3 times, or less than 5 times, or less than 10 times the minimum particle diameter. In some embodiments, the minimum dimension of the electrolyte is less than 10 microns, or less than 2 microns, or less than 1 micron, or less than 500 nm.

In some embodiments, the electrolyte has a gas permeability of no greater than 1 millidarcy, preferably no greater than 100 microdarcy, and most preferably no greater than 1 microdarcy. Preferably, the electrolyte has no cracks penetrating through the minimum dimension of the electrolyte. In some embodiments, the boiling point of the solvent is no less than 200° C., or no less than 100° C., or no less than 75° C. In some embodiments, the boiling point of the solvent is no greater than 125° C., or no greater than 100° C., or no greater than 85° C., no greater than 70° C. In some embodiments, the pH of the colloidal suspension is no less than 7, or no less than 9, or no less than 10.

In some embodiments, the additive comprises polyethylene glycol (PEG), ethyl cellulose, polyvinylpyrrolidone (PVP), polyvinyl butyral (PVB), butyl benzyl phthalate (BBP), polyalkalyne glycol (PAG) or a combination thereof. In an embodiment, the additive concentration is no greater than 100 mg/cm3, or no greater than 50 mg/cm3, or no greater than 30 mg/cm3, or no greater than 25 mg/cm3.

In an embodiment, the colloidal suspension is milled. In an embodiment, the colloidal suspension is milled using a rotational mill wherein the rotational mill is operated at no less than 20 rpm, or no less than 50 rpm, or no less than 100 rpm, or no less than 150 rpm. In an embodiment, the colloidal suspension is milled using zirconia milling balls or tungsten carbide balls wherein the colloidal suspension is milled for no less than 2 hours, or no less than 4 hours, or no less than 1 day, or no less than 10 days.

In some embodiments, the particle concentration in the colloidal suspension is no greater than 30 wt %, or no greater than 20 wt %, or no greater than 10 wt %. In other embodiments, the particle concentration in the colloidal suspension is no less than 2 wt %. In some embodiments, the particle concentration in the colloidal suspension is no greater than 10 vol %, or no greater than 5 vol %, or no greater than 3 vol %, or no greater than 1 vol %. In an embodiment, the particle concentration in the colloidal suspension is no less than 0.1 vol %.

In a preferred embodiment, the electrolyte is formed using an additive manufacturing machine (AMM). In a preferred embodiment, the first substrate is formed using an AMM. In a preferred embodiment, the heating comprises the use of electromagnetic radiation (EMR) wherein the EMR comprises one or more of UV light, near ultraviolet light, near infrared light, infrared light, visible light or laser. In a preferred embodiment, the first substrate and the electrolyte are heated to cause co-sintering. In a preferred embodiment, the first substrate, the second substrate, and the electrolyte are heated to cause co-sintering. In an embodiment, the EMR is controlled to preferentially sinter the first substrate over the electrolyte.

In an embodiment, the electrolyte is compresses after heating. In an embodiment, the first substrate and the second substrate apply compressive stress to the electrolyte after heating. In an embodiment, the first substrate and the second substrate that are applying compressive stress are the anode and cathode of a fuel cell. In some embodiments, the minimum dimension of the electrolyte is between 500 nm and 5 microns or between 1 micron and 2 microns.

The detailed discussion described herein users the production of solid oxide fuel cells (SOFCs) as an illustrative example. As one in the art recognizes, the methodology and the manufacturing process described herein are applicable to all fuel cell types. As such, the production of all fuel cell types is within the scope of this disclosure.

Fuel Cell Cartridge

Figure 11A:
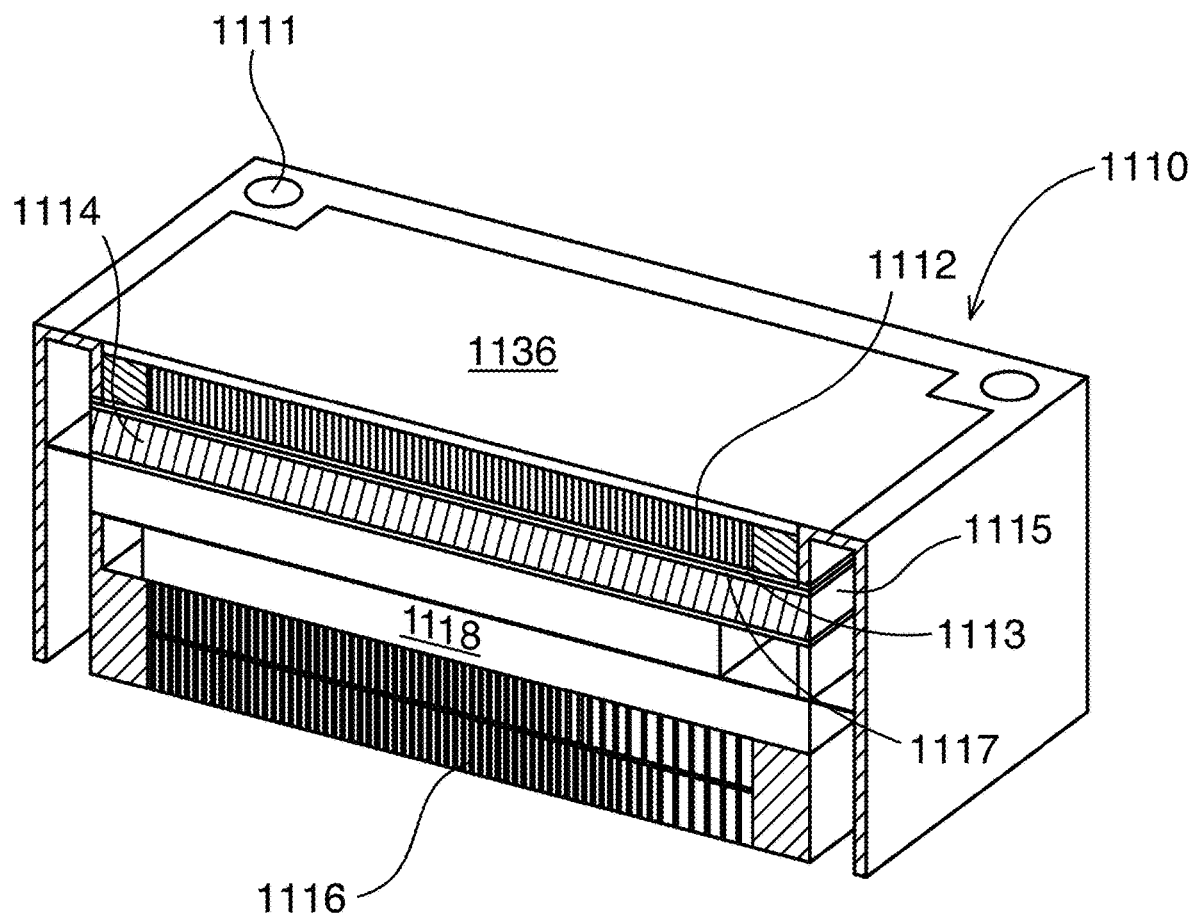
FIG. 11A illustrates a perspective view of a fuel cell cartridge (FCC)

In various embodiments, the fuel cell stack is configured to be made into a cartridge form, such as an easily detachable flanged fuel cell cartridge (FCC) design. FIG. 11A illustrates a perspective view of a fuel cell cartridge (FCC). FCC 1110 comprises holes for bolts 1111, cathode layer 1112, barrier layer 1113, anode layer 1114, gas channels 1115 in the electrodes (anode and cathode), electrolyte layer 1117, an air heat exchanger 1116, fuel heat exchanger 1118 and top interconnect 1136. Air heat exchanger 1116 and fuel heat exchanger 1118 combined form an integrated multi-fluid heat exchanger. In some embodiments, there is no barrier layer between the cathode and the electrolyte.

Figure 11B:
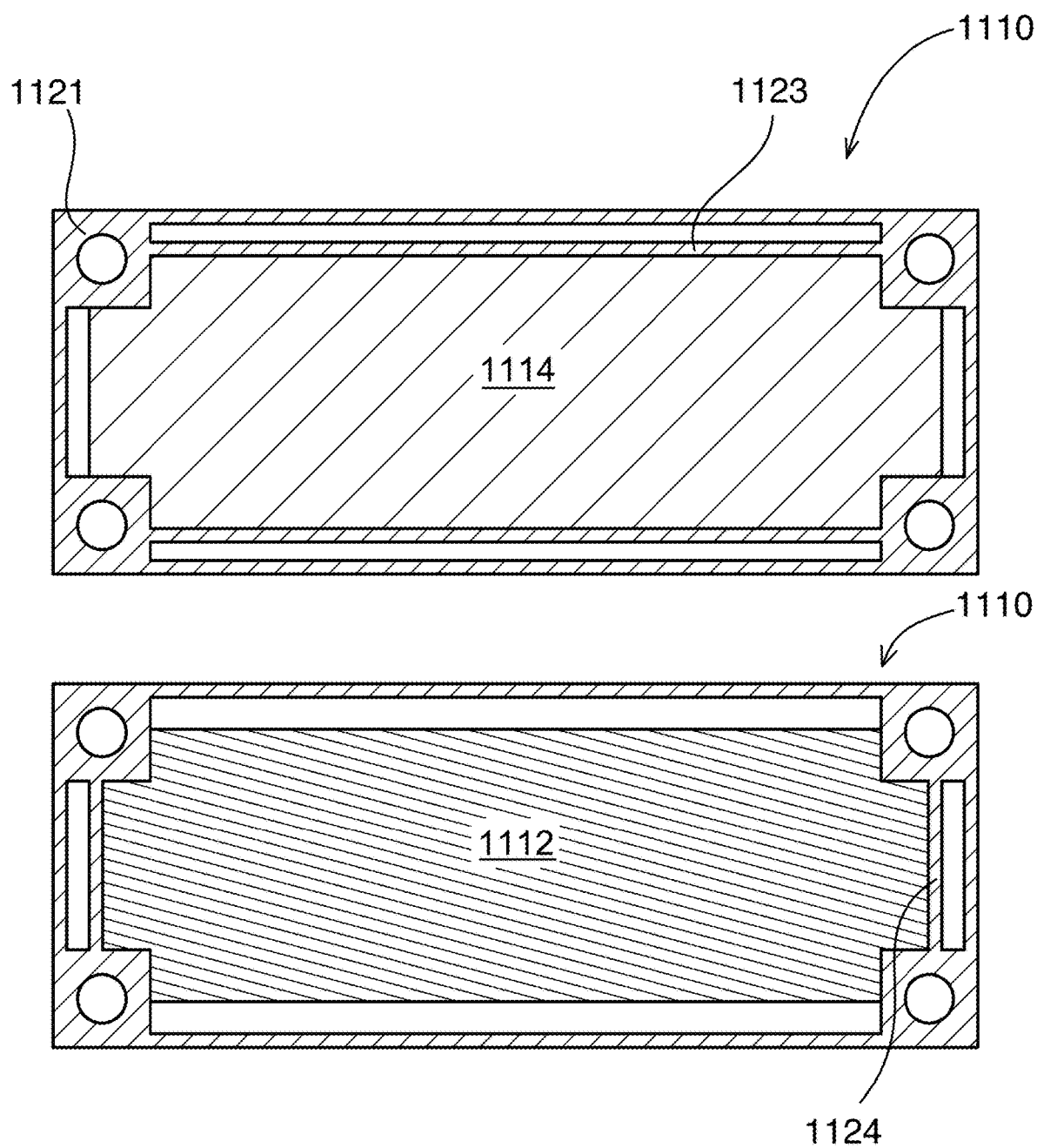
FIG. 11B illustrates cross-sectional views of a fuel cell cartridge (FCC)
Figure 11C:
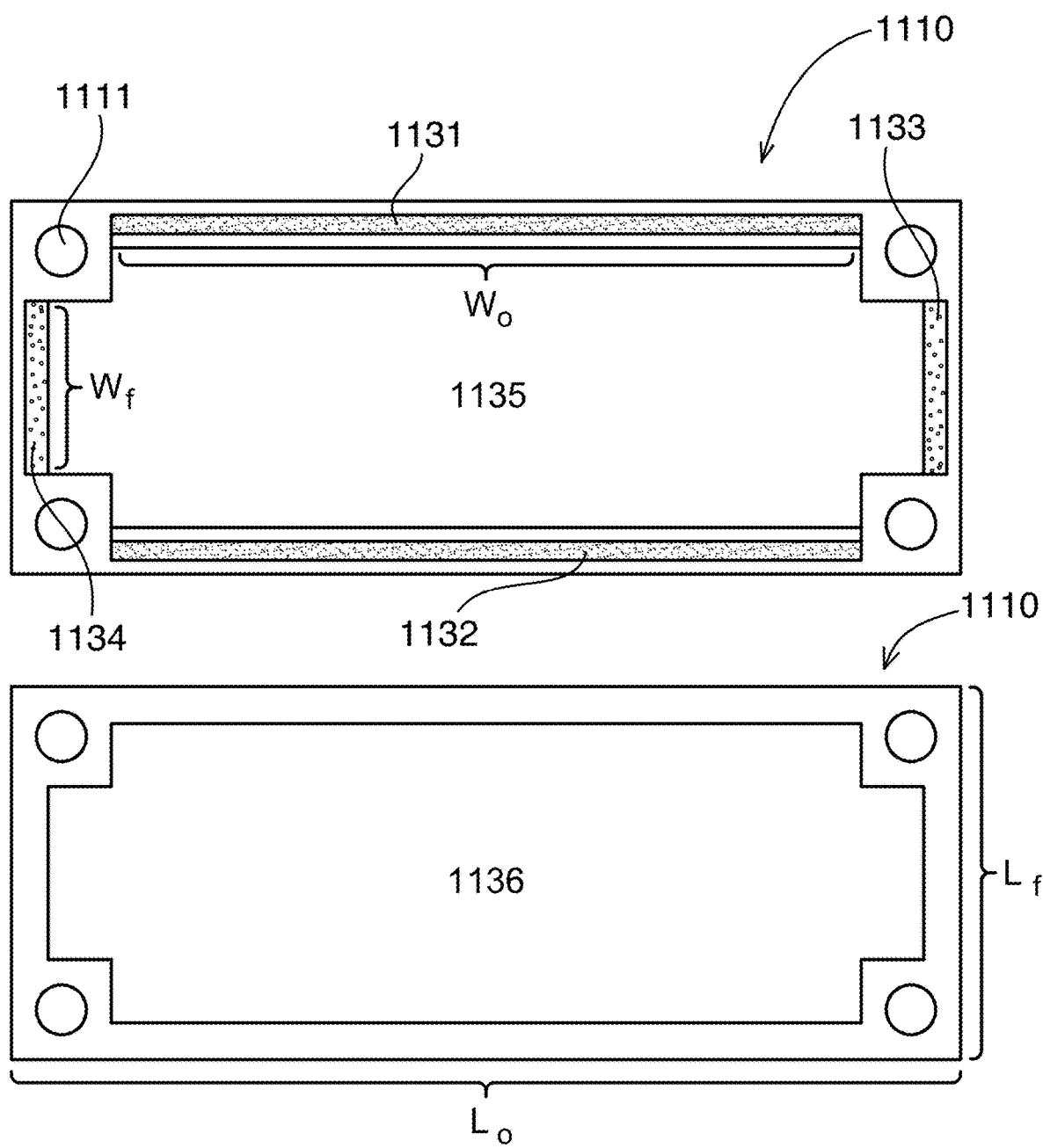
FIG. 11C illustrates top view and bottom view of a fuel cell cartridge (FCC)

FIG. 11C illustrates top view and bottom view of a fuel cell cartridge (FCC). FCC 1110 comprises holes for bolts 1111, air inlet 1131, air outlet 1132, fuel inlet 1133, fuel outlet 1134, bottom 1135 and top interconnect 1136 of FCC 1110. FIG. 11C further illustrates the top view and bottom view of an embodiment of FCC 1110, in which the length of the oxidant side of FCC 1110 is shown $L_o$, the length of the fuel side of FCC 1110 is shown $L_f$, the width of the oxidant (air inlet 1131) entrance is shown $W_o$, and the width of the fuel inlet 1133 is shown $W_f$. In FIG. 11C, two fluid exits are shown (air outlet 1132 and fuel outlet 1134). In some embodiments, the anode exhaust and the cathode exhaust may be mixed and extracted through one fluid exit. In some cases, bottom 1135 is an interconnect and 1131, 1132, 1133, 1134 are openings for fluid passage, e.g., in the direction perpendicular to the lateral direction.

FIG. 11B illustrates cross-sectional views of a fuel cell cartridge (FCC). FCC 1110 in FIG. 11B comprises electrical bolt isolation 1121, anode 1114, seal 1123 that seals anode 1114 from air flow, cathode 1112 and seal 1124 that seals cathode 1112 from fuel flow. The bolts may be isolated electrically with a seal as well. In various embodiments, the seals may be dual functional seal (DFS) comprising YSZ (yttria-stabilized zirconia) or a mixture of 3YSZ (3 mol % $Y_2O_3$ in $ZrO_2$) and 8YSZ (8 mol % $Y_2O_3$ in $ZrO_2$). In some embodiments, the DFS is impermeable to non-ionic substances and electrically insulating. In some embodiments, the mass ratio of 3YSZ/8YSZ is in the range of from 10/90 to 90/10. In some embodiments, the mass ratio of 3YSZ/8YSZ is about 50/50. In some embodiments, the mass ratio of 3YSZ/8YSZ is 100/0 or 0/100.

Disclosed herein is a fuel cell cartridge (FCC) comprising an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0.

In some embodiments, the air and fuel entrances and exits are on one surface of the FCC wherein the FCC comprises no protruding fluid passages on said surface. In some embodiments, the surface is smooth with a maximum elevation change of no greater than 1 mm, or no greater than 100 microns, or no greater than 10 microns.

In some embodiments, an FCC comprises a barrier layer between the electrolyte and the cathode, or between the electrolyte and the anode, or both. In an embodiment, the FCC comprises a dual functional seal (DFS) that is impermeable to non-ionic substances and electrically insulating. In some embodiments, the DFS comprises YSZ (yttria-stabilized zirconia) or a mixture of 3YSZ (3 mol % $Y_2O_3$ in $ZrO_2$) and 8YSZ (8 mol % $Y_2O_3$ in $ZrO_2$).

In some embodiments, the interconnect comprises no fluid dispersing element and said anode and cathode comprise fluid dispersing components. In some embodiments, the interconnect comprises no fluid dispersing element while the anode and cathode comprise fluid channels.

In some embodiments, the FCC is detachably fixed to a mating surface and not soldered nor welded to the mating surface. The FCC may be bolted to or pressed to the mating surface. In some embodiments, the mating surface comprises a matching fuel entrance, matching oxidant entrance, and at least one matching fluid exit.

Also discussed herein is a fuel cell cartridge (FCC) comprising an anode, a cathode, an electrolyte, an interconnect, a fuel entrance, an oxidant entrance, at least one fluid exit, wherein said entrances and exit are on one surface of the FCC and said FCC comprises no protruding fluid passage on the surface. In some embodiments, the surface may be smooth with a maximum elevation change of no greater than 1 mm, or no greater than 100 microns, or no greater than 10 microns.

In some embodiments, the FCC comprises a DFS that is impermeable to non-ionic substances and electrically insulating. In an embodiment, said interconnect comprises no fluid dispersing element and said anode and cathode comprise fluid dispersing components. In an embodiment, said interconnect comprises no fluid dispersing element and said anode and cathode comprise fluid channels.

In an embodiment, the FCC is detachably fixed to a mating surface and not soldered nor welded to said mating surface. In an embodiment, the FCC is bolted to or pressed to the mating surface. The mating surface comprises matching fuel entrance, matching oxidant entrance, and at least one matching fluid exit.

Further disclosed herein is an assembly comprising a fuel cell cartridge (FCC) and a mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0, wherein the FCC is detachably fixed to the mating surface.

In some embodiments, the FCC is not soldered nor welded to said mating surface. In some embodiments, the FCC is bolted to or pressed to said mating surface. In other embodiments, said mating surface comprises matching fuel entrance, matching oxidant entrance, and at least one matching fluid exit.

In some embodiments, said entrances and exits are on one surface of the FCC and wherein the FCC comprises no protruding fluid passage on said surface. The surface may be smooth with a maximum elevation change of no greater than 1 mm, or no greater than 100 microns, or no greater than 10 microns.

In an embodiment, said interconnect comprises no fluid dispersing element and said anode and cathode comprise fluid dispersing components. In an embodiment, said interconnect comprises no fluid dispersing element and said anode and cathode comprise fluid channels.

Discussed herein is a method comprising pressing or bolting together a fuel cell cartridge (FCC) and a mating surface. The method excludes welding or soldering together the FCC and the mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0, wherein the FCC and the mating surface are detachable.

In an embodiment, said entrances and exit are on one surface of the FCC wherein the FCC comprises no protruding fluid passage on said surface. The surface is smooth with a maximum elevation change of no greater than 1 mm, or no greater than 100 microns, or no greater than 10 microns. In an embodiment, said interconnect comprises no fluid dispersing element and said anode and cathode comprise fluid dispersing components. In an embodiment, said interconnect comprises no fluid dispersing element and said anode and cathode comprise fluid channels.

Herein disclosed is a fuel cell cartridge (FCC) comprising a fuel cell and a fuel cell casing, wherein the fuel cell comprises an anode, a cathode and an electrolyte, wherein at least a portion of the fuel cell casing is made of the same material as the electrolyte. In an embodiment, the electrolyte is in contact with the portion of the fuel cell casing made of the same material. In an embodiment, the electrolyte and the portion of the fuel cell casing are made of a DFS, wherein the DFS comprises 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, said fuel cell casing comprises a fuel entrance and fuel passage for the anode, an oxidant entrance and oxidant passage for the cathode, and at least one fluid exit. In an embodiment, said entrances and at least one exit are on one surface of the FCC wherein the FCC comprises no protruding fluid passage on said surface. In an embodiment, the fuel cell casing is in contact with at least a portion of the anode.

In an embodiment, the FCC comprises a barrier layer between the electrolyte and the cathode and between the fuel cell casing and the cathode. In an embodiment, the FCC comprises an interconnect, wherein the interconnect comprises no fluid dispersing element and said anode and cathode comprise fluid dispersing components. In an embodiment, the FCC comprises an interconnect, wherein the interconnect comprises no fluid dispersing element and said anode and cathode comprise fluid channels.

In an embodiment, the FCC is detachably fixed to a mating surface and not soldered nor welded to said mating surface. In an embodiment, said mating surface comprises matching fuel entrance, matching oxidant entrance, and at least one matching fluid exit.

Also discussed herein is a DFS comprising 3YSZ (3 mol % $Y_2O_3$ in ZrO2) and 8YSZ (8 mol % $Y_2O_3$ in $ZrO_2$), wherein the mass ratio of 3YSZ/8YSZ is in the range of from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20. In an embodiment, the DFS is used as an electrolyte in a fuel cell or as a portion of a fuel cell casing, or both.

Further disclosed herein is a method comprising providing a DFS in a fuel cell system, wherein the DFS comprises 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, the DFS is used as electrolyte or a portion of a fuel cell casing or both in the fuel cell system. The portion of a fuel cell casing may be the entire fuel cell casing. The portion of a fuel cell casing is a coating on the fuel cell casing. The electrolyte and said portion of a fuel cell casing are in contact.

Disclosed herein is a fuel cell system comprising an anode having six surfaces, a cathode having six surfaces, an electrolyte, and an anode surround in contact with at least three surfaces of the anode, wherein the electrolyte is part of the anode surround and said anode surround is made of the same material as the electrolyte. In an embodiment, said same material is a DFS comprising 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20. In an embodiment, the anode surround is in contact with five surfaces of the anode.

In an embodiment, the fuel cell system comprises a barrier layer between the cathode and a cathode surround, wherein the barrier layer is in contact with at least three surfaces of the cathode, wherein the electrolyte is part of the cathode surround and said cathode surround is made of the same material as the electrolyte.

In an embodiment, the fuel cell system comprises fuel passage and oxidant passage in the anode surround and the cathode surround. In an embodiment, the fuel cell system comprises an interconnect, wherein the interconnect comprises no fluid dispersing element and said anode and cathode comprise fluid dispersing components. In an embodiment, the fuel cell system comprises an interconnect, wherein the interconnect comprises no fluid dispersing element and said anode and cathode comprise fluid channels.

Electrochemical (EC) Gas Producer

Figure 10A:
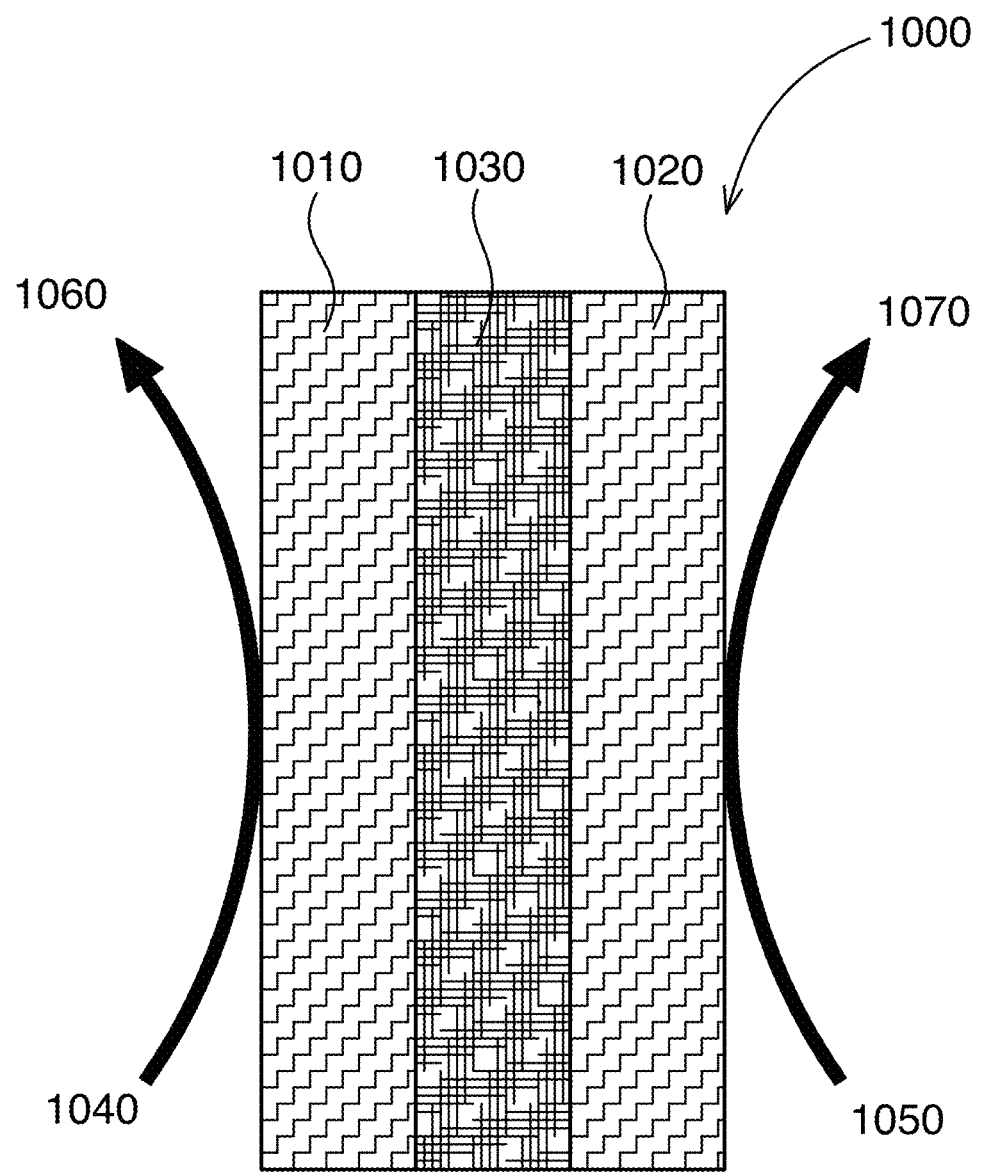
FIG. 10A illustrates an electrochemical (EC) gas producer.
Figure 10B:
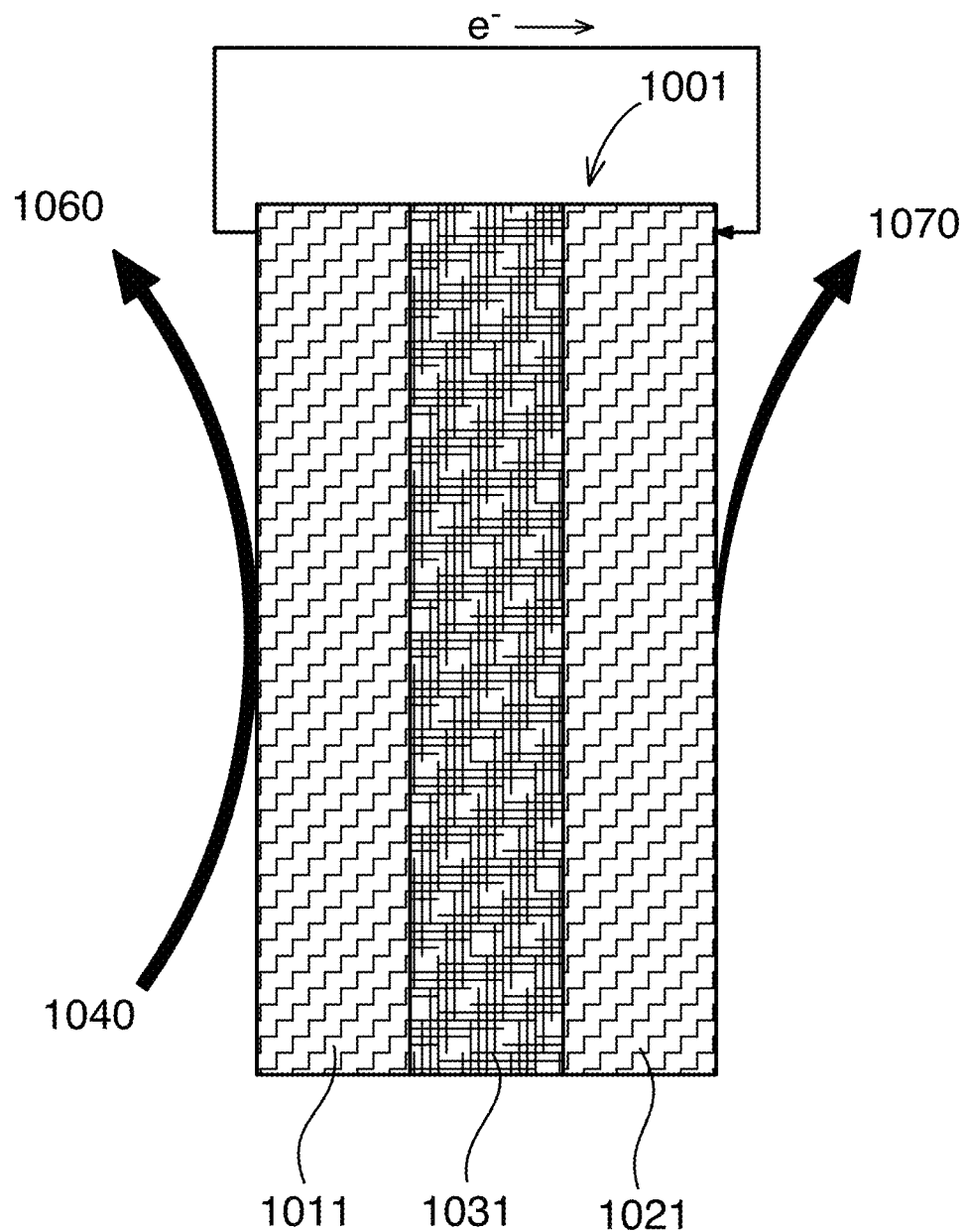
FIG. 10B illustrates an EC gas producer.

FIG. 10A illustrates an electrochemical (EC) gas producer. EC gas producer device 1000 comprises first electrode 1010, electrolyte 1030 a second electrode 1020. First electrode 1010 is configured to receive a fuel and no oxygen 1040. Second electrode 1020 is configured to receive water or nothing as denoted by arrow 1050. Device 1000 is configured to simultaneously produce hydrogen 1070 from second electrode 1020 and syngas 1060 from first electrode 1010. In an embodiment, 1040 represents methane and water or methane and carbon dioxide entering device 1000. In other embodiments, 1030 represents an oxide ion conducting membrane. In an embodiment, first electrode 1010 and second electrode 1020 may comprise Ni-YSZ or NiO-YSZ. Arrow 1040 represents an influx of hydrocarbon and water or hydrocarbon and carbon dioxide. Arrow 1050 represents an influx of water or water and hydrogen. In some embodiments, electrode 1010 comprises Cu-CGO further optionally comprising CuO or $Cu_2O$ or combinations thereof. Electrode 1020 comprises Ni-YSZ or NiO-YSZ. Arrow 1040 represents an influx of hydrocarbon with little to no water, with no carbon dioxide, and with no oxygen, and 1050 represents an influx of water or water and hydrogen.

FIG. 10E3 illustrates an EC gas producer. EC gas producer device 1001 comprises first electrode 1011, second electrode 1021, and electrolyte 1031 between the electrodes. The first electrode 1011 is configured to receive a fuel and no oxygen 1040, wherein second electrode 021 is configured to receive water or nothing. In some embodiments, 1031 represents a proton conducting membrane, 1011 and 1021 represent Ni-barium zirconate electrodes.

In this disclosure, no oxygen means there is no oxygen present at first electrode 1010, 1011 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 1020, 1021 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 1010, 1011 is configured to receive methane and water or methane and carbon dioxide. In an embodiment, said fuel comprises a hydrocarbon having a carbon number in the range of 1-12, 1-10 or 1-8. Most preferably, the fuel is methane or natural gas, which is predominantly methane. In an embodiment, the device does not generate electricity. In an embodiment, the device comprises a mixer configured to receive at least a portion of the first electrode product and at least a portion of the second electrode product. In an embodiment, said mixer is configured to generate a gas stream in which the hydrogen to carbon oxides ratio is no less than 2, or no less than 3 or between 2 and 3.

In an embodiment, first electrode 1010, 1011 or second electrode 1020, 1021, or both comprise a catalyst and a substrate, wherein the mass ratio between the catalyst and the substrate is no less than 1/100, or no less than 1/10, or no less than 1/5, or no less than 1/3, or no less than 1/1. In an embodiment, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, platinum, or combinations thereof. In an embodiment, the substrate comprises gadolinium, $CeO_2$, $ZrO_2$, $SiO_2$, $TiO_2$, steel, cordierite ($2MgO-2Al_2O_3-5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In some embodiments, first electrode 1010, 1011 or second electrode 1020, 1021, or both, comprise a promoter wherein the promoter comprises Mo, W, Ba, K, Mg, Fe, or combinations thereof.

In some embodiments, the electrodes and electrolyte form a repeat unit. A device may comprise two or more repeat units separated by interconnects. In a preferred embodiment, the interconnects comprise no fluid dispersing element. In an embodiment, first electrode 1010, 1011 or second electrode 1020, 1021, or both, comprise fluid channels. Alternatively, the first electrode or second electrode, or both, comprise fluid dispersing components.

Also discussed herein is a assembly method comprising forming a first electrode, forming a second electrode, and forming an electrolyte between the electrodes, wherein the electrodes and electrolyte are assembled as they are formed. Forming comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. The electrodes and electrolyte may form a repeat unit. The method may further comprise forming two or more repeat units and forming interconnects between the two or more repeat units. The assembly method may further comprise forming fluid channels or fluid dispersing components in the first electrode or the second electrode, or both. The forming method comprises heating in situ. In a preferred embodiment, the heating comprise EMR. EMR comprises one or more of UV light, near ultraviolet light, near infrared light, infrared light, visible light, laser or electron beam.

The first electrode is configured to receive a fuel and no oxygen, wherein the second electrode is configured to receive water only or nothing, wherein the device is configured to simultaneously produce hydrogen from the second electrode and syngas from the first electrode.

Further discussed herein is a method comprising providing a device comprising a first electrode, a second electrode, and an electrolyte between the electrodes, introducing a fuel without oxygen to the first electrode, introducing water only or nothing to the second electrode to generate hydrogen, extracting hydrogen from the second electrode, and extracting syngas from the first electrode. In preferred embodiments, the fuel comprises methane and water or methane and carbon dioxide. In preferred embodiments, the fuel comprises a hydrocarbon having a carbon number in the range of 1-12 or 1-10 or 1-8.

In an embodiment, the method comprises feeding at least a portion of the extracted syngas to a Fischer-Tropsch reactor. In an embodiment, the method comprises feeding at least a portion of the extracted hydrogen to the Fischer-Tropsch reactor. In an embodiment, the at least portion of the extracted syngas and the at least portion of the extracted hydrogen are adjusted such that the hydrogen to carbon oxides ratio is no less than 2, or no less than 3, or between 2 and 3.

In an embodiment, the fuel is directly introduced into the first electrode or water is directly introduced into the second electrode, or both. In an embodiment, the first electrode or second electrode, or both, comprise a catalyst and a substrate, wherein the mass ratio between the catalyst and the substrate is in no less than 1/100, or no less than 1/10, or no less than 1/5, or no less than 1/3, or no less than 1/1. In preferred embodiments, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, platinum, or combinations thereof. In preferred embodiments, the substrate comprises gadolinium, $CeO_2$, $ZrO_2$, $SiO_2$, $TiO_2$, steel, cordierite ($2MgO-2Al_2O_3-5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof.

In an embodiment, the method comprises applying a potential difference between the electrodes. In an embodiment, the method comprises using the extracted hydrogen in one of the following reactions, or combinations thereof: Fischer-Tropsch (FT) reaction, dry reforming reactions, Sabatier reaction catalyzed by nickel, Bosch reaction, reverse water gas shift reaction, electrochemical reaction to produce electricity, production of ammonia and/or fertilizer, electrochemical compressor for hydrogen storage or fueling hydrogen vehicles, or hydrogenation reactions.

The gas producer is not a fuel cell and does not generate electricity, in various embodiments. Electricity may be applied to the gas producer at the anode and cathode in some cases. In other cases, electricity is not needed.

Electrodes

Both the cathode and the anode are electrodes in the EC gas producer. Examples of anode and cathode materials are discussed below. In an operating device, the actual anode and cathode designation depends on where reduction and oxidation reactions take place. In certain embodiments, a material acts as an anode with a set of operating conditions and/or feedstocks and the same material also acts as a cathode but with a different set of operating conditions and/or feedstocks. As such, the listing of materials for anode or cathode is not limiting. Furthermore, the listings of anode/cathode materials apply to the first electrode and second electrode as discussed above.

In some embodiments, the cathode comprises perovskites, such as LSC, LSCF, LSM. In some embodiments, the cathode comprises lanthanum, cobalt, strontium or manganite or combinations thereof. In an embodiment, the cathode is porous. In an embodiment, the cathode comprises one or more of YSZ, nitrogen, nitrogen boron doped Graphene, $La_{0.6}Sr_{0.4}Co_{0.2}Fe_{0.8}O_3$, $SrCo_{0.5}Sc_{0.5}O_3$, $BaFe_{0.75}Ta_{0.25}O_3$, $BaFe_{0.875}Re_{0.125}O_3$, $Ba_{0.5}La_{0.125}Zn_{0.375}NiO_3$, $Ba_{0.75}Sr_{0.25}Fe_{0.875}Ga_{0.125}O_3$ or $BaFe_{0.125}Co_{0.125}$, $Zr_{0.75}O_3$. In an embodiment, the cathode comprises LSCo, LCo, LSF, LSCoF. In an embodiment, the cathode comprises perovskites $LaCoO_3$, $LaFeO_3$, $LaMnO_3$, $(La,Sr)MnO_3$, LSM-GDC, LSCF-GDC, LSC-GDC. Cathodes containing LSCF are suitable for intermediate-temperature electrochemical gas producer operation. In preferred embodiments, the cathode comprises Cu-CGO, CuO-CGO, $Cu_2O$-CGO, or combinations thereof. In preferred embodiments, the cathode comprises a material selected from the group consisting of lanthanum strontium manganite, lanthanum strontium ferrite, and lanthanum strontium cobalt ferrite. In a preferred embodiment, the cathode comprises lanthanum strontium manganite.

In some embodiment, the cathode comprises $Ba(Ce_{0.4}Pr_{0.4}Y_{0.2})O_3$; $PrBaCuFeO_5$; $BaCe_{0.5}Bi_{0.5}O_3$; $SmBaCo_2O_5$; $BaCe_{0.5}Fe_{0.5}O_3$; $GdBaCo_2O_5$; $SmBa_{0.5}Sr_{0.5}Co_2O_5$; $PrBaCo_2O_5$; or combinations thereof. In a preferred embodiment, the cathode is a composite comprising $Ba_{0.5}Sr_{0.5}Co_{0.5}Fe_{0.5}O_3$ and BZCY (for example in a weight ratio of 3:2), wherein BZCY is $BaZr_{0.1}Ce_{0.2}Y_{0.2}O_3$. In a preferred embodiment, the cathode is a composite comprising $Sm_{0.5}Sr_{0.5}CoO_3$ and $Ce_{0.8}Sm_{0.2}O_2$ (for example in a weight ratio of 6:4). In a preferred embodiment, the cathode is a composite comprising $Sm_{0.5}Sr_{0.5}CoO_3$ and BZCY (for example in a weight ratio of 7:3).

In some embodiments, the anode comprises nickel-oxide, nickel-oxide-YSZ, NiO-GDC, NiO-SDC, aluminum doped zinc oxide, molybdenum oxide, lanthanum, strontium, chromite, ceria, perovskites (such as, LSCF [La{1-x}Sr{x}Co{1-y}Fe{y}O3] or LSM [La{1-x}Sr{x}MnO3], where x is usually 0.15-0.2 and y is 0.7 to 0.8). In other embodiments, the anode comprises SDC or BZCYYb coating or barrier layer to reduce coking and sulfur poisoning. In an embodiment, the anode is porous. In an embodiment, the anode comprises a combination of electrolyte and electrochemically active material, or a combination of electrolyte and electrically conductive material.

In a preferred embodiment, the anode comprises nickel and yttria stabilized zirconia. In a preferred embodiment, the anode is formed by reduction of a material comprising nickel oxide and yttria stabilized zirconia. In a preferred embodiment, the anode comprises nickel and gadolinium stabilized ceria. In another preferred embodiment, the anode is formed by reduction of a material comprising nickel oxide and gadolinium stabilized ceria.

In some embodiments, the anode comprises NiO or NiO-BZCY (1:1) and a pore former, NiO-BZCY (6:4) and corn starch, NiO-BZCY (6:4) and starch/NiO-BZCY (6:4), NiO-BZCY (6:4) NiO-BZCY or NiO-BZCY (6:4) and starch/NiO-BZCY (1:1). In other embodiments, the anode comprises Cu-CGO, CuO-CGO, $Cu_2O$-CGO, or combinations thereof.

Electrochemical (EC) Compressor

Disclosed herein is an EC compressor comprising an anode, a cathode, an electrolyte between the anode and the cathode, a porous bipolar plate (PBP), an integrated support, a fluid distributor at a first end of the compressor, and a fluid collector at a second end of the compressor, wherein the support is impermeable to non-ionic substances and electrically insulating. The PBP is electrically conductive and permeable to gases (such as $H_2$, $O_2$).

Figure 10C:
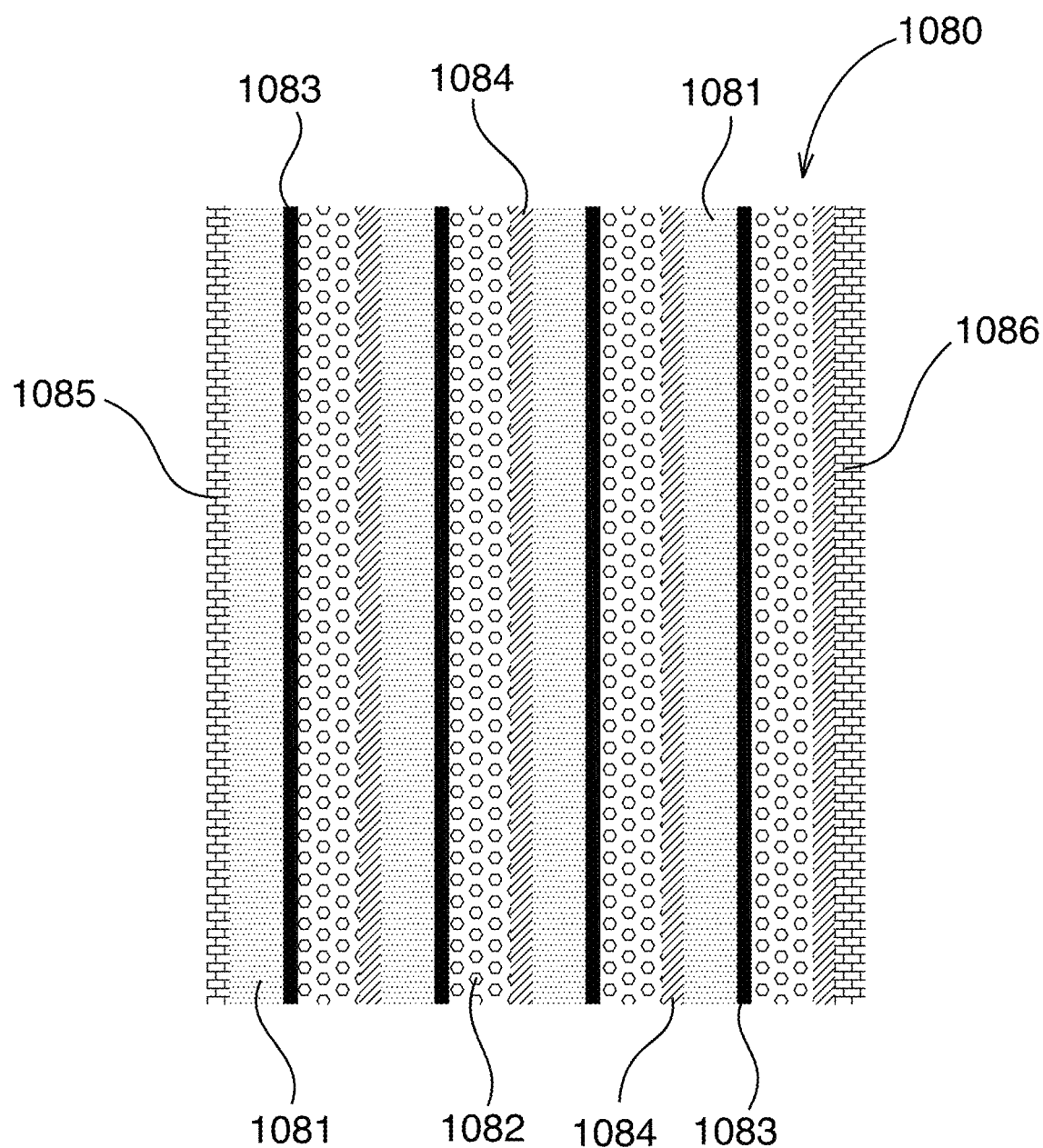
FIG. 10C illustrates an electrochemical compressor comprising anodes, electrolytes, cathodes, porous bipolar plates, a fluid distributor on one end and a fluid collector on the opposing end.

FIG. 10C illustrates an electrochemical compressor. EC compressor 1080 comprises anode 1081, cathode 1082, electrolyte 1083, and PBP 1084 to form a repeat unit. In various embodiments, an electrochemical compressor comprises a two or more repeat units to form a multiplicity of repeat units between the fluid distributor 1085 and the fluid collector 1086.

In some embodiments, the EC compressor is configured to provide between the first end and the second end of the compressor a fluid pressure differential no less than 4000 psi, or no less than 5000 psi, or no less than 6000 psi, or no less than 7000 psi, or no less than 8000 psi, or no less than 9000 psi, or no less than 10000 psi. In an embodiment, said support is part of the electrolyte, or the anode, or the cathode, or the PBP, or combinations thereof. In an embodiment, the support has a lattice structure that is regular or irregular. In some embodiments, the anode or cathode, or both the anode and cathode comprise fluid channels. Alternatively, the anode, or cathode, or both the anode and cathode comprise fluid dispersing components.

Also discussed herein is a method of making an EC compressor comprising depositing an anode, a cathode, an electrolyte between the anode and the cathode, and a porous bipolar plate (PBP) to form the EC compressor. In an embodiment, the method comprises providing a fluid distributor at a first end of the compressor and a fluid collector at a second end of the compressor. The deposition comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof.

In some embodiments, the deposition method comprises co-sintering the anode, the cathode, the electrolyte, and the PBP. In a preferred embodiment, the deposition method comprises heating in situ. In a preferred embodiment, the heating comprises EMR. The EMR comprises one or more of UV light, near ultraviolet light, near infrared light, infrared light, visible light, laser, electron beam. The method may further comprise depositing an integrated support, wherein the support is impermeable to non-ionic substances and electrically insulating. The support may have a lattice structure that is regular or irregular. In an embodiment, said support is part of the electrolyte, or the anode, or the cathode, or the PBP, or combinations thereof. In an embodiment, the method comprises forming fluid dispersing components or fluid channels in the anode, or cathode, or both the anode and cathode.

Further discussed herein is a method of using an EC compressor that comprises an anode, a cathode, an electrolyte between the anode and the cathode, a porous bipolar plate (PBP), an integrated support, a fluid distributor at a first end of the compressor, and a fluid collector at a second end of the compressor, wherein the support is impermeable to non-ionic substances and electrically insulating.

In an embodiment, the EC compressor provides between the first end and the second end of the compressor a fluid pressure differential no less than 4000 psi, or no less than 5000 psi, or no less than 6000 psi, or no less than 7000 psi, or no less than 8000 psi, or no less than 9000 psi, or no less than 10000 psi. In an embodiment, the EC compressor increases the pressure of hydrogen or oxygen from the first end to the second end.

In a preferred embodiment, the method of using the EC compressor comprises using the compressor for hydrogen storage. In a preferred embodiment, the method comprises using the compressor for fueling vehicles. In a preferred embodiment, the method comprises using the compressor in pressurized hydrogen refrigeration systems.

All layers of an EC compressor, which is illustrated in FIG. 10C, may be formed and assembled via printing. The material for making the anode, the cathode, the electrolyte, the PBP, and the integrated support, respectively, is made into an ink form comprising a solvent and particles (e.g., nanoparticles). The ink optionally comprises a dispersant, a binder, a plasticizer, a surfactant, a co-solvent, or combinations thereof. For the anode and the cathode, NiO and YSZ particles are mixed with a solvent, wherein the solvent is water (e.g., de-ionized water) or an alcohol (e.g., butanol) or a mixture of alcohols. Organic solvents other than alcohols may also be used. For the electrolyte and the support, YSZ particles were mixed with a solvent, wherein the solvent is water (e.g., de-ionized water) or an alcohol (e.g., butanol) or a mixture of alcohols. Organic solvents other than alcohols may also be used to form the electrolyte and support. For the PBP, metallic particles (such as, silver nanoparticles) are dissolved in a solvent, wherein the solvent may include water (e.g., de-ionized water), organic solvents (e.g. mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone, propylene carbonate), and combinations thereof. For an oxygen compressor, the electronically conducting phase in both electrodes preferably comprises LSCF(-CGO) or LSM(-YSZ).

Fischer Tropsch

The method and system of this disclosure are suitable for making a catalyst or a catalyst composite, such as a Fischer-Tropsch (FT) catalyst or catalyst composite. Disclosed herein is a Fischer-Tropsch (FT) catalyst composite comprising a catalyst and a substrate, wherein the mass ratio between the catalyst and the substrate is in no less than 1/100, or no less than 1/10, or no less than 1/5, or no less than 1/3, or no less than 1/1. In an embodiment, the catalyst comprises Fe, Co, Ni, or Ru. The substrate comprises $Al_2O_3$, $ZrO_2$, $SiO_2$, $TiO_2$, $CeO_2$, modified $Al_2O_3$, modified $ZrO_2$, modified $SiO_2$, modified $TiO_2$, modified $CeO_2$, gadolinium, steel, cordierite ($2MgO-2Al_2O_3-5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter wherein the promoter comprises noble metals, metal cations, or combinations thereof. The promoter may comprise B, La, Zr, K, Cu, or combinations thereof. In an embodiment, the catalyst composite comprises fluid channels or alternatively fluid dispersing components.

The FT reactor/system of this disclosure is much smaller than traditional FT reactors/systems (e.g., 3-100 times smaller or 100+ times smaller for the same FT product generation rate). The high catalyst to substrate ratio is not achievable by traditional methods to make FT catalysts. As such, in some embodiments, the FT reactor/system is miniaturized compared to traditional FT reactors/systems.

Also discussed herein is a method comprising depositing a FT catalyst to a substrate to form a FT catalyst composite, wherein said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the mass ratio between the catalyst and the substrate is in no less than 1/100, or no less than 1/10, or no less than 1/5, or no less than 1/3, or no less than 1/1. In preferred embodiments, the deposition method comprises forming fluid channels or alternatively fluid dispersing components in the catalyst composite.

Further discussed herein is a system comprising a Fischer-Tropsch (FT) reactor containing a FT catalyst composite comprising a catalyst and a substrate, wherein the mass ratio between the catalyst and the substrate is in no less than 1/100, or no less than 1/10, or no less than 1/5, or no less than 1/3, or no less than 1/1. In an embodiment, the catalyst comprises Fe, Co, Ni, or Ru. In an embodiment, the substrate comprises $Al_2O_3$, $ZrO_2$, $SiO_2$, $TiO_2$, $CeO_2$, modified $Al_2O_3$, modified $ZrO_2$, modified $SiO_2$, modified $TiO_2$, modified $CeO_2$, gadolinium, steel, cordierite ($2MgO-2Al_2O_3-5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter.

As an example, a FT catalyst composite is formed via printing. The catalyst and the substrate/support are made into an ink form comprising a solvent and particles (e.g., nanoparticles). The ink optionally comprises a dispersant, a binder, a plasticizer, a surfactant, a co-solvent, or combinations thereof. The ink may be any kind of suspension. The ink may be treated with a mixing process, such as ultrasonication or high shear mixing. In some cases, an iron ink is in an aqueous environment. In some cases, an iron ink is in an organic environment. The iron ink may also include a promoter. The substrate/support may be a suspension or ink of alumina, in an aqueous environment or an organic environment. The substrate ink may be treated with a mixing process, such as ultrasonication or high shear mixing. In some cases, the substrate ink comprises a promoter. In some cases, the promoter is added as its own ink, in an aqueous environment or an organic environment. In some cases, the various inks are printed separately and sequentially. In some cases, the various inks are printed separately and simultaneously, for example, through different print heads. In some cases, the various inks are printed in combination as a mixture.

As an example, an exhaust from the fuel cell comprises hydrogen, carbon dioxide, water, and optionally carbon monoxide. The exhaust is passed over a FT catalyst (e.g., an iron catalyst) to produce synthetic fuels or lubricants. The FT iron catalyst has the property to promote water gas shift reaction or reverse water gas shift reaction. The FT reactions take place at a temperature in the range of 150-350° C. and a pressure in the range of one to several tens of atmospheres (e.g., 15 atm or 10 atm or 5 atm or 1 atm). Additional hydrogen may be added to the exhaust stream to reach a hydrogen to carbon oxides ratio (carbon dioxide and carbon monoxide) of no less than 2 or no less than 3 or between 2 and 3.

Fluid Dispersing Component

Figure 13A:
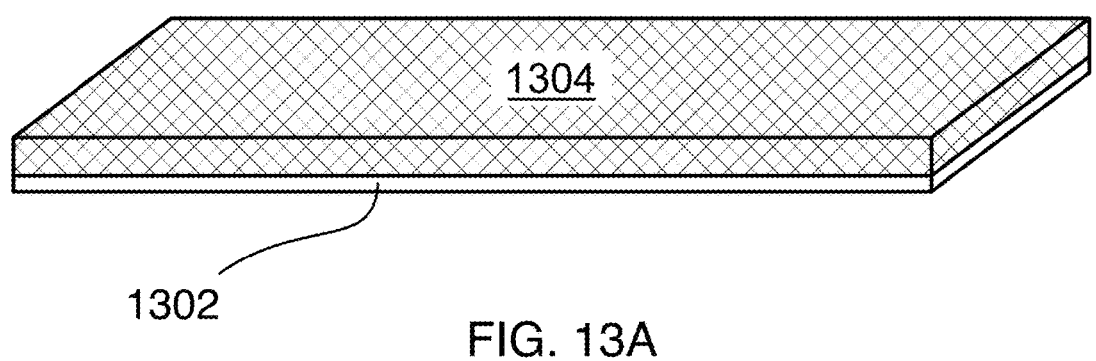
FIG. 13A illustrates an impermeable interconnect 1302 with a fluid dispersing component 1304.
Figure 13B:
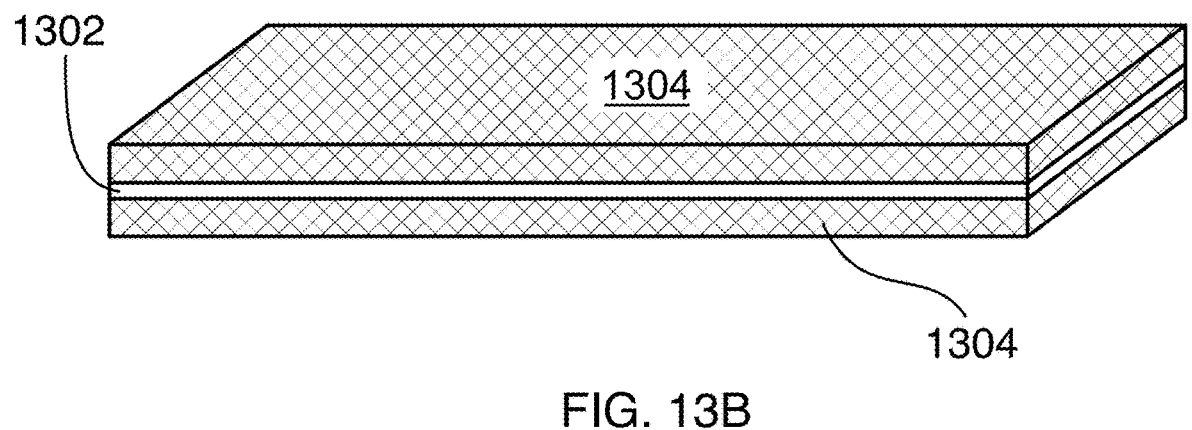
FIG. 13B illustrates an impermeable interconnect 1302 with two fluid dispersing components 1304.
Figure 13C:
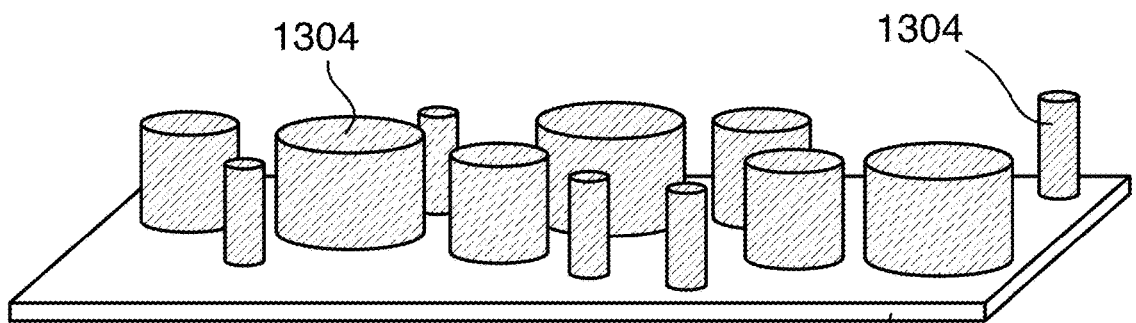
FIG. 13C illustrates segmented fluid dispersing components 1304 of similar shapes but different sizes on an impermeable interconnect 1302.
Figure 13D:
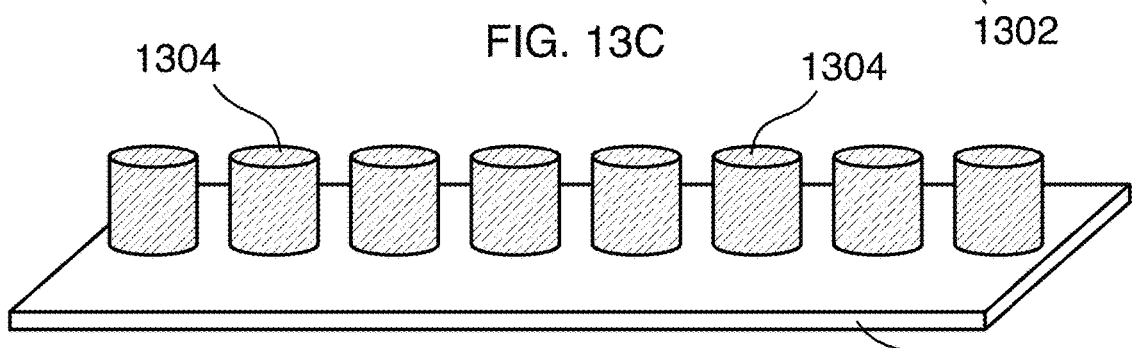
FIG. 13D illustrates segmented fluid dispersing components 1304 of similar shapes and similar sizes on an impermeable interconnect 1302.
Figure 13E:
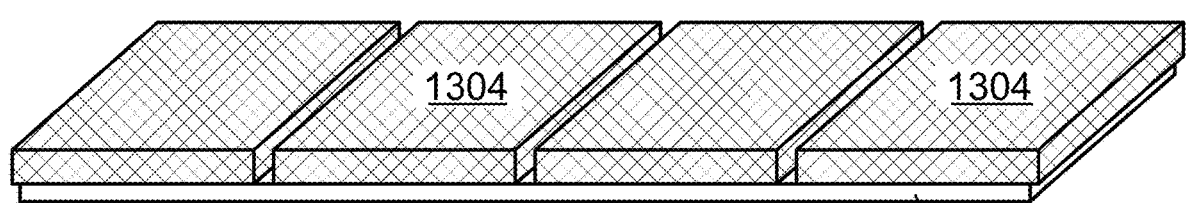
FIG. 13E illustrates segmented fluid dispersing components 1304 of similar shapes and similar sizes but closely packed on an impermeable interconnect 1302.
Figure 13F:
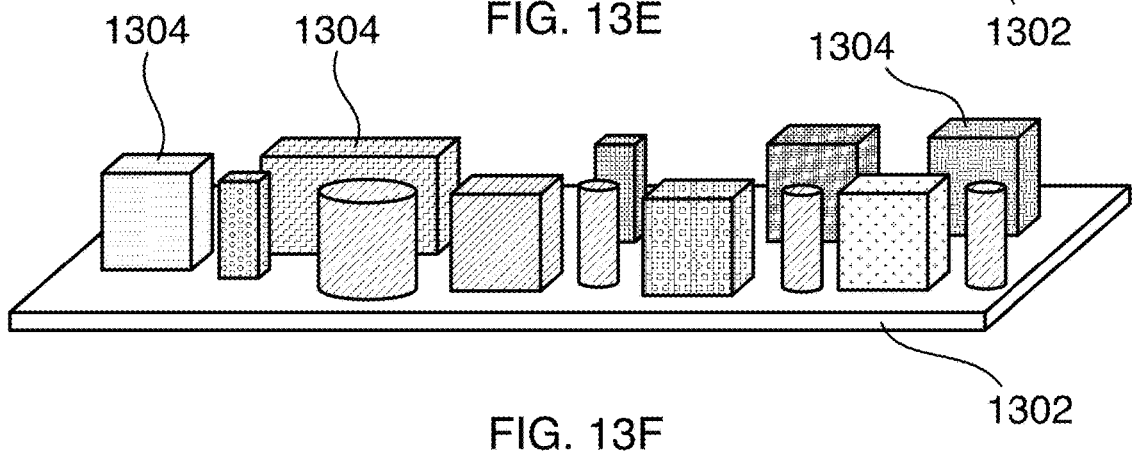
FIG. 13F illustrates segmented fluid dispersing components 1304 of different shapes and different sizes on an impermeable interconnect 1302.

FIG. 13A illustrates an impermeable interconnect 1302 with a fluid dispersing component 1304. FIG. 13B illustrates an impermeable interconnect 1302 with two fluid dispersing components 1304. The fluid dispersing components 1304 are in contact with both sides (major faces) of interconnect 1302. As such, the interconnect is shared between two repeat units in an electrochemical reactor. Fluid dispersing components 1304 function to distribute fluids, e.g., reactive gases (such as methane, hydrogen, carbon monoxide, air, oxygen, etc.), in an electrochemical reactor. As such, traditional interconnects with channels are no longer needed. The design and manufacturing of such traditional interconnects with channels is complex and expensive. According to this disclosure, the interconnects are simply impermeable layers that conduct or collect electrons. FIGS. 13C-F schematically illustrate segmented fluid dispersing components 1304 on top of impermeable interconnect 1302. Such segments may have different compositions, shapes, densities, porosities, pore sizes, pore shapes, permeabilities, or combinations thereof. The segments may be discontinuous. FIG. 13C illustrates segmented fluid dispersing components 1304 of similar shapes but different sizes on an impermeable interconnect 1302. FIG. 13D illustrates segmented fluid dispersing components 1304 of similar shapes and similar sizes on an impermeable interconnect 1302. FIG. 13E illustrates segmented fluid dispersing components 1304 of similar shapes and similar sizes but closely packed on an impermeable interconnect 1302. FIG. 13F illustrates segmented fluid dispersing components 1304 of different shapes and different sizes on an impermeable interconnect 1302. It is also contemplated that these segments have different compositions, densities, porosities, pore sizes, pore shapes, permeabilities, or combinations thereof.

Figure 13G:
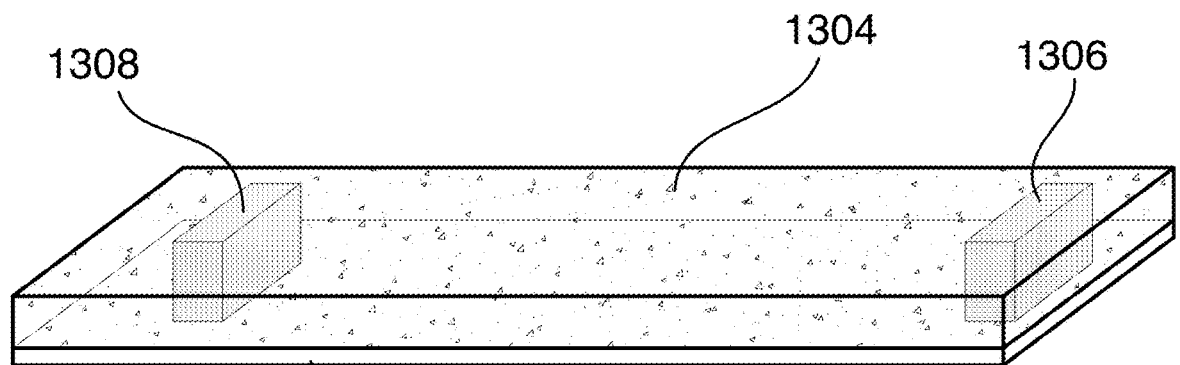
FIG. 13G illustrates an impermeable interconnect 1302 and fluid dispersing component segment 1304.
Figure 13H:
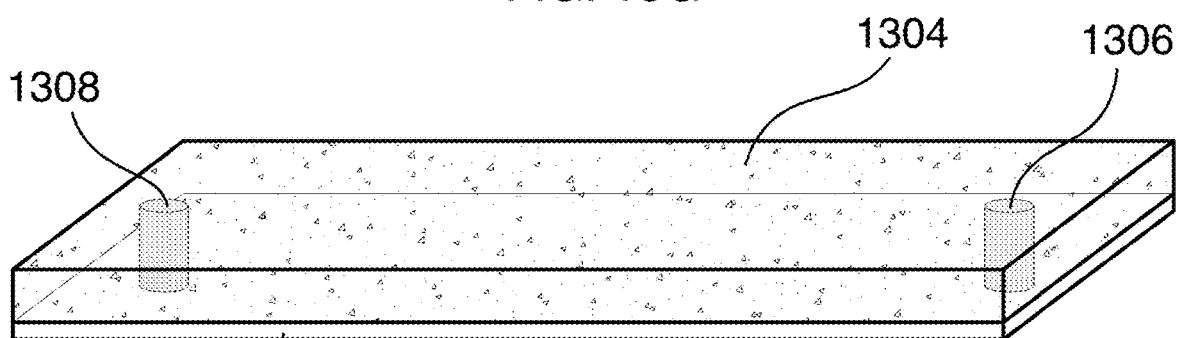
FIG. 13H illustrates an impermeable interconnect 1302 and fluid dispersing component segment 1304.
Figure 13I:
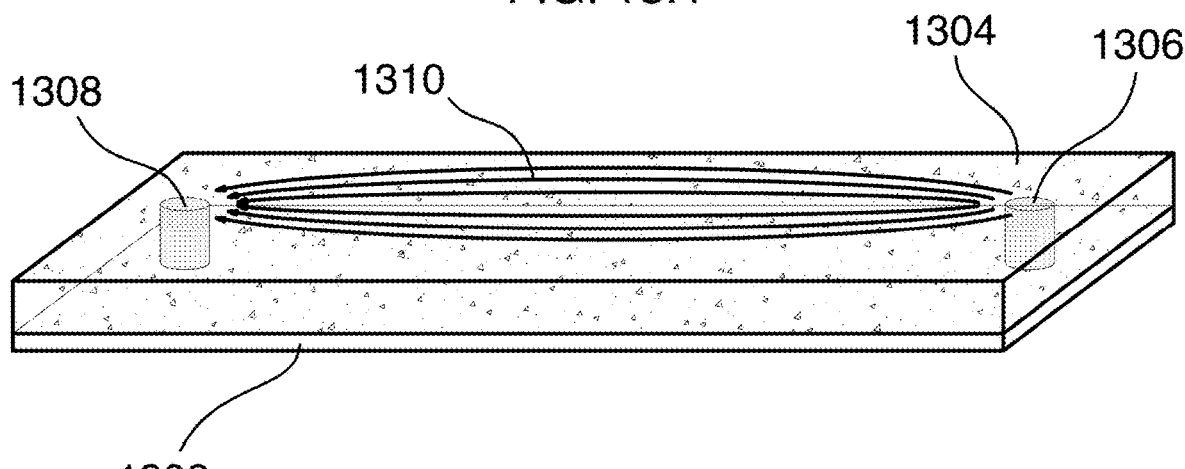
FIG. 13I illustrates an impermeable interconnect 1302 and fluid dispersing component segments 1306, 1308.
Figure 13J:
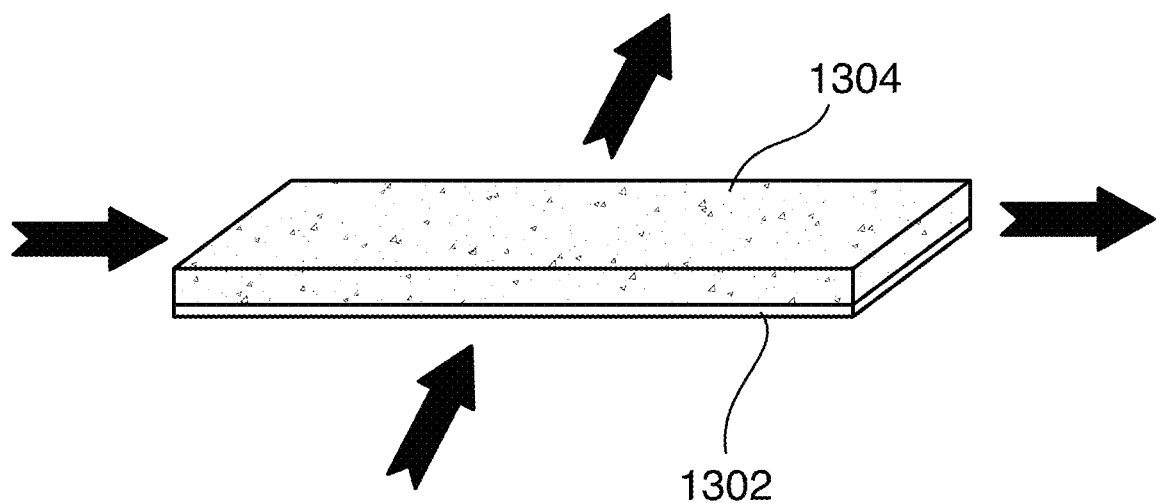
FIG. 13J illustrates an impermeable interconnect 1302 and a fluid dispersing component segment 1304.

FIGS. 13G-1 schematically illustrates an impermeable interconnect 1302 with fluid dispersing component 1304. Further illustrated are different fluid inlet and out designs. The fluid dispersing components may have varying density, porosity, pore size, pore shape, composition, or permeability, or combinations thereof, in different portions (e.g., in the lateral direction or perpendicular to the lateral direction). Such variabilities provide control and adjustability of the fluid flow in the fluid dispersing component. FIG. 13G illustrates an impermeable interconnect 1302 and fluid dispersing component 1304. FIG. 13H illustrates an impermeable interconnect 1302 and fluid dispersing component 1304. FIG. 13I illustrates an impermeable interconnect 1302 and fluid dispersing component 1304. 1306 and 1308 in FIGS. 13G-I represent different inlet and outlet designs. The interconnect 1302 has matching inlet and outlet for each configuration. In FIG. 13I, 1306 represents a fluid inlet and 1308 represents a fluid outlet. The fluid flow is denoted by arrows 1310. FIG. 13J illustrates an impermeable interconnect 1302 and a fluid dispersing component 1304. Further illustrated in FIG. 13J are alternative fluid flow designs as shown by the arrows. For example, the fluid may flow from left to right across the fluid dispersing component; or the fluid may flow from front to back across the fluid dispersing component.

Figure 13K:
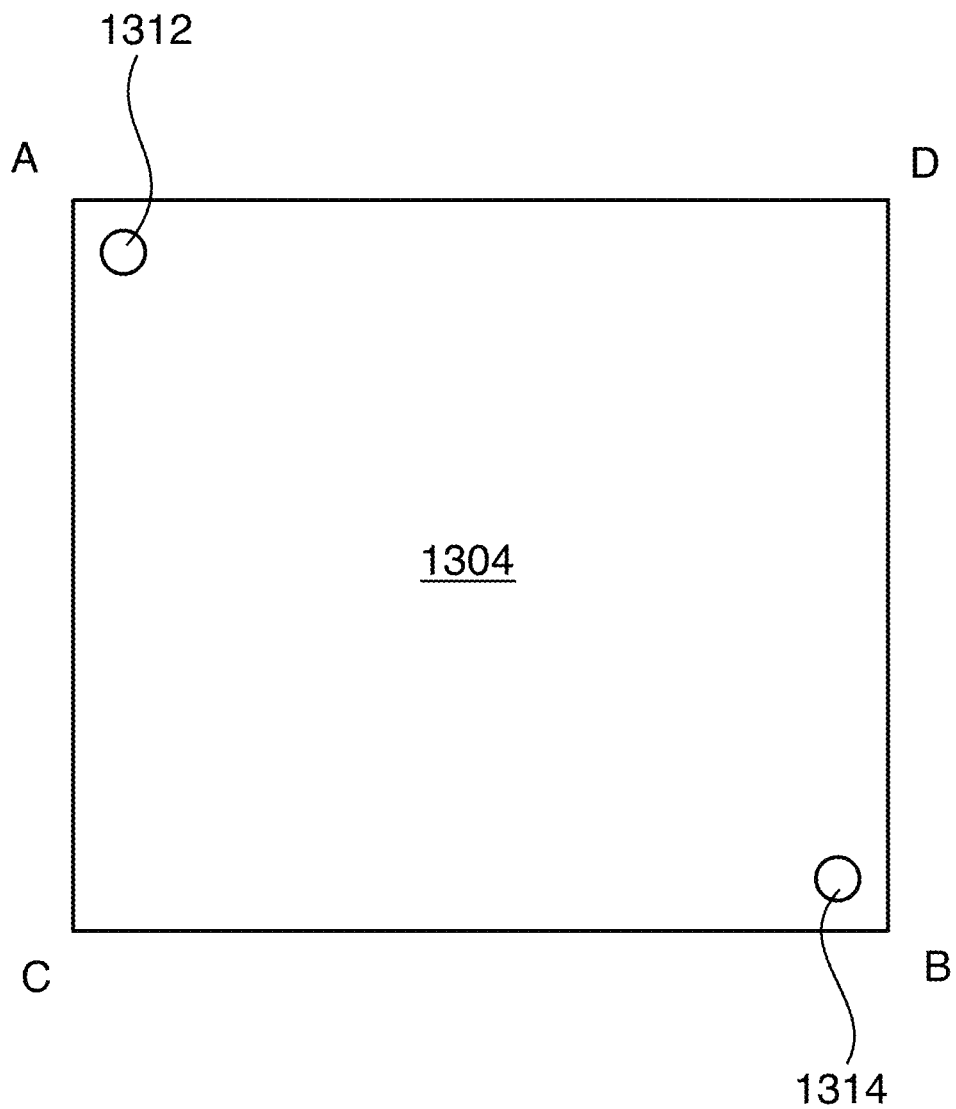
FIG. 13K illustrates a fluid dispersing component 1304.

FIG. 13K illustrates a fluid dispersing component 1304. Fluid dispersing component 1304 design comprises four corners labeled A, B, C, and D. Location A, comprises Fluid flow inlet 1312. Location B comprises fluid flow outlet 1314.

Discussed herein is an electrochemical reactor (e.g., a fuel cell) comprising an impermeable interconnect having no fluid dispersing element, an electrolyte, a fluid dispersing component (FDC) between the interconnect and the electrolyte. In an embodiment, the fuel cell comprises two FDC's. The two FDC's may be symmetrically placed in contact with the interconnect on its opposing side or opposing major faces. As such, the interconnect is shared between the two repeat units in the electrochemical reactor, each repeat unit comprising one of the two FDC's. The FDC may be a foam, open cell foam, or comprises a lattice structure.

In a preferred embodiment, the FDC is segmented wherein the segments have different compositions, materials, shapes, sizes, densities, porosities, pore sizes, pore shapes, permeabilities, or combinations thereof. The shapes of the segments may comprise pillar, hollow cylinder, cube, rectangular cuboid, trigonal trapezohedron, quadrilateral frustum, parallelepiped, triangular bipyramid, tetragonal anti-wedge, pyramid, pentagonal pyramid, prism, or combinations thereof.

In some embodiments, the FDC has varying density, porosity, pore size, pore shape, permeability, or combinations thereof wherein the density, porosity, pore size, pore shape, or permeability or combination thereof is controlled. In some embodiments, the density, porosity, pore size, pore shape, or permeability or combination thereof, is controlled to adjust flow of a fluid through the FDC. In other embodiments, the density, porosity, pore size, pore shape, or permeability or combination thereof is controlled to cause uniform fluid flow from a first point in the FDC to a second point in the FDC. The fluid flow pattern may be adjusted as desired. For example, it does not need to be uniform. The fluid flow may be increased or decreased according to the reactivities of the FDC or reaction rates of the fluid in the various portions of the FDC. Alternatively and/or in combination, the fluid flow may be increased or decreased according to the fluid flow rates to an anode or a cathode in the various portions of the FDC. Alternatively and/or in combination, the fluid flow may be increased or decreased according to the reaction rates in an anode or a cathode related to or in contact with the various portions of the FDC.

In an embodiment, density is higher in the center of the FDC. In an embodiment, density is lower in the center of the FDC. In an embodiment, porosity or permeability or pore throat size is lower toward the center of the FDC. In an embodiment, porosity or permeability or pore throat size is higher toward the center of the FDC.

In an embodiment, at least a portion of the FDC is part of an anode or part of a cathode. In a preferred embodiment, the FDC is an anode or a cathode. In an embodiment, the impermeable interconnect has a thickness of no greater than 10 microns, or no greater than 1 micron, or no greater than 500 nm. In a preferred embodiment, the impermeable interconnect comprises inlets and outlets for fluids. In a preferred embodiment, the fluids comprise reactants for the fuel cell.

Herein also disclosed is a method of making a fuel cell comprising (a) forming an impermeable interconnect having no fluid dispersing element; (b) forming an electrolyte; (c) forming a fluid dispersing component (FDC); and (d) placing the FDC between the interconnect and the electrolyte.

In an embodiment, the FDC is formed by creating a multiplicity of segments and assembling the segments. The segments have different compositions, materials, shapes, sizes, densities, porosities, pore sizes, pore shapes, permeabilities, or combinations thereof wherein the shapes comprise a pillar, hollow cylinder, cube, rectangular cuboid, trigonal trapezohedron, quadrilateral frustum, parallelepiped, triangular bipyramid, tetragonal anti-wedge, pyramid, pentagonal pyramid, prism, or combinations thereof. The FDC may be a foam, open cell foam; or comprises a lattice structure.

In a preferred embodiments, the method of forming the FDC comprises varying density, porosity, pore size, pore shape, permeability, or combinations thereof. In an embodiment, the method comprises controlling the density, porosity, pore size, pore shape, permeability, or combinations thereof of the FDC. The method may comprise controlling density, porosity, pore size, pore shape, permeability, or combinations thereof of the FDC to adjust flow of a fluid through the FDC. The method may comprise controlling density, porosity, pore size, pore shape, permeability, or combinations thereof of the FDC to cause uniform fluid flow from a first point in the FDC to a second point in the FDC. The method may comprise controlling density, porosity, pore size, pore shape, permeability, or combinations thereof of the FDC to cause patterned fluid flow from a first point in the FDC to a second point in the FDC.

The fluid flow pattern may be adjusted as desired. For example, it does not need to be uniform. The fluid flow may be increased or decreased according to the reactivities of the FDC or reaction rates of the fluid in the various portions of the FDC. Alternatively and/or in combination, the fluid flow may be increased or decreased according to the fluid flow rates to an anode or a cathode in the various portions of the FDC. Alternatively and/or in combination, the fluid flow may be increased or decreased according to the reaction rates in an anode or a cathode related to or in contact with the various portions of the FDC.

In an embodiment, step (c) comprises varying composition of material used to form the FDC. In an embodiment, step (c) comprises varying particles size used to form the FDC. In an embodiment, step (c) comprises heating different portions of the FDC to different temperatures. In an embodiment, said heating comprises electromagnetic radiation (EMR). In an embodiment, EMR comprises one or more of UV light, near ultraviolet light, near infrared light, infrared light, visible light, laser or electron beam.

In an embodiment, steps (a)-(d) or steps (b)-(d) are performed using additive manufacturing (AM). In various embodiments, AM comprises extrusion, photopolymerization, powder bed fusion, material jetting, binder jetting, directed energy deposition or lamination or combinations thereof.

In an embodiment, the method of forming the FDCs comprises heating the fuel cell such that shrinkage rates of the FDC and the electrolyte are matched or such that shrinkage rates of the interconnect, the FDC, and the electrolyte are matched. In a preferred embodiment, the heating comprises EMR. In an embodiment, EMR comprises UV light, near ultraviolet light, near infrared light, infrared light, visible light, laser or electron beam or combinations thereof. In a preferred embodiment, heating is performed in situ. In preferred embodiments, heating takes place for no greater than 30 minutes, or no greater than 30 seconds, or no greater than 30 milliseconds.

In a preferred embodiment, at least a portion of the FDC is part of an anode or part of a cathode. In a preferred embodiment, the FDC is an anode or a cathode. In preferred embodiments, the impermeable interconnect has a thickness of no greater than 10 microns, or no greater than 1 micron, or no greater than 500 nm. Preferably, the impermeable interconnect comprises inlets and outlets for fluids. More preferably, the fluids comprise reactants for the fuel cell.

Channeled Electrodes

Figure 14A:
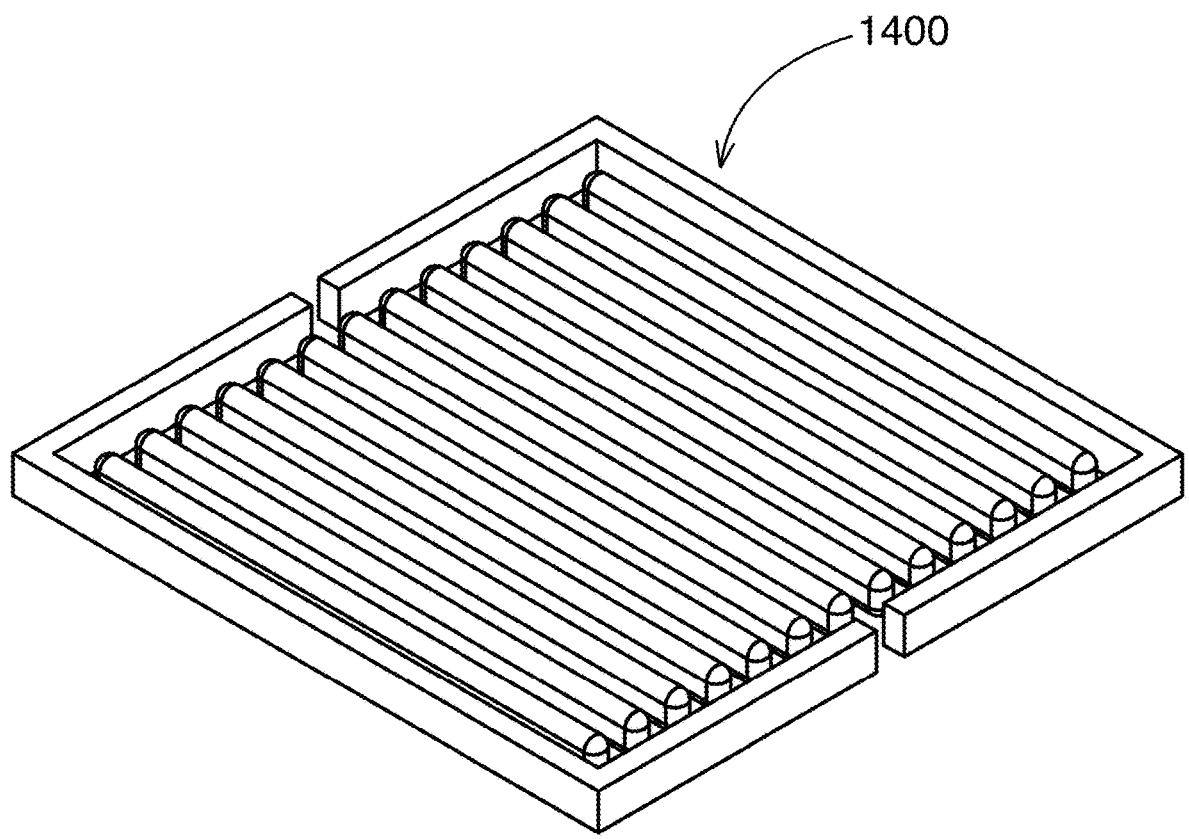
FIG. 14A illustrates a template 1400 for making channeled electrodes.

Disclosed herein is a method comprising providing a template wherein the template is in contact with an electrode material; and removing at least a portion of the template to form channels in the electrode material. FIG. 14A illustrates a template 1400 for making channeled electrodes. Such templates may be removed by oxidation, melting, vaporization, reduction, or any suitable means, either after the electrochemical reactor is made or at the start of the utilization of the reactor.

In an embodiment, the channeled electrode material comprises NiO, YSZ, GDC, LSM, LSCF, or combinations thereof. In an embodiment, providing a template comprises printing the template or precursors that assemble to form the template. Providing a template comprises polymerizing one or more monomers or a photo-initiator, or both. In an embodiment, the method comprises curing monomers and/or oligomers, through internal or external techniques. In various embodiments, internal techniques include polymerization by free radical molecular initiation, and/or initiation by in situ reduction/oxidation. In various embodiments, external techniques include photolysis, exposure to ionizing radiation, (ultra)sonication and thermal decomposition to form the initiator species. In a preferred embodiment, said curing comprises UV curing. In an embodiment, the method comprises adding a polymerizing agent, wherein the polymerizing agent comprises a photo-initiator. In an embodiment, the polymerizing agent is printed on top of the monomer or printed within each slice of the monomer.

In an embodiment, providing a template comprises dispersing metal oxide particles in a monomer ink before printing the template. In an embodiment, the metal oxide comprises NiO, CuO, LSM (lanthanum strontium manganite), LSCF (lanthanum strontium cobalt ferrite), GDC (gadolinium doped ceria), SDC (samaria-doped ceria), or combinations thereof. In an embodiment, said monomer comprises alcohol, aldehyde, carboxylic acid, ester, and/or ether functional groups. In an embodiment, said template comprises NiO, Cu(I)O, Cu(II)O, an organic compound, a photopolymer, or combinations thereof.

In an embodiment, removing at least a portion of the template comprises heating, combustion, solvent treatment, oxidation, reduction, or combinations thereof. In an embodiment, the combustion leaves no deposits and is not explosive. In an embodiment, the reduction takes place in a metal oxide and produces porous template. In an embodiment, the method of providing a template comprises heating in situ.

In an embodiment, the template and electrode material are printed slice by slice and a second slice is printed atop a first slice before the first slice is heated, wherein the heating removes at least a portion of the template. In an embodiment, the heating comprises EMR. In an embodiment, EMR comprises one or more of UV light, near ultraviolet light, near infrared light, infrared light, visible light, laser, electron beam.

In an embodiment, the channels and the electrode material form an electrode layer. In an embodiment, the channels have regular trajectories within the electrode layer. For example, the channels are parallel to one another. The channels may run from one end, edge, or corner of the electrode layer to the opposite end, edge or corner. The channels may run from one end, edge or corner of the electrode, turn 90 degrees to another end, edge or corner. The channels have random trajectories within the electrode layer. For example, the channels may have tortuous trajectories with no regularities. The channels may have more than one entry point and more than one exit point. The more than one entry point and the more than one exit point are distributed across the electrode layer. The entry points and the exits points of the channels in the electrode layer may be on any side of the electrode layer, including the top surface or side and the bottom surface or side.

In some embodiments, the volume fraction of the template in the electrode layer is in the range of 5%-95%, or 10%-90%, or 20%-80%, or 30%-70%, or 40%-60%. The volume fraction of the channels in the electrode layer is in the range of 10%-90%, or 20%-80%, or 30%-70%, or 40%-60%. The total effective porosity of the electrode layer with channels is preferably in the range of 20%-80%, or 30%-70%, or 40%-60%. Such total effective porosity of the electrode layer with channels is no less than the porosity of the electrode material. The tortuosity of the electrode layer with channels is no greater than the native tortuosity of the electrode material.

In preferred embodiments, the gas channels span the height of the electrode layer. The gas channels may occupy a height that is less than that of the electrode layer. As an example, the electrode layer is about 50 microns thick. In an embodiment, the gas channel width is no less than 10 microns. In an embodiment, the gas channel width is no less than 100 microns.

Also discussed herein is a method comprising (a) printing a first template and a first electrode material to form a first electrode layer, wherein the first template is in contact with the first electrode material; (b) printing an electrolyte layer; (c) printing a second template and a second electrode material to form a second electrode layer, wherein the second template is in contact with the second electrode material; and (d) printing an interconnect. In a preferred embodiment, the steps are performed in any sequence. In a preferred embodiment, the method comprises repeating steps (a)-(d) in any sequence to form a stack or a repeat unit of a stack.

In an embodiment, the method comprises (e) removing at least a portion of the first template and of the second template to form channels in the first and second electrode layers. In an embodiment, the removing comprises heating, combustion, solvent treatment, oxidation, reduction, or combinations thereof. In an embodiment, the removing takes place in situ. Removing may take place after a stack or a repeat unit of a stack is printed. Removing may take place when a stack is initiated to operate. In an embodiment, the printing takes place slice by slice and a second slice is printed atop a first slice before the first slice is heated, wherein the heating removes at least a portion of the template. The printing step comprises material jetting, binder jetting, inkjet printing, aerosol jetting, or aerosol jet printing, or combinations thereof.

Further discussed herein is a method comprising (a) printing a first electrode layer; (b) printing an electrolyte layer; (c) printing a second electrode layer; and (d) printing an interconnect. In an embodiment, the printing comprises material jetting, binder jetting, inkjet printing, aerosol jetting, or aerosol jet printing. In a preferred embodiment, the steps are performed in any sequence. In a preferred embodiment, the method comprises repeating steps (a)-(d) in any sequence to form a stack or a repeat unit of a stack. Also disclosed herein is a method comprising aerosol jetting or aerosol jet printing an electrode layer, or an electrolyte layer, or an interconnect, or combinations thereof.

Figure 14C:
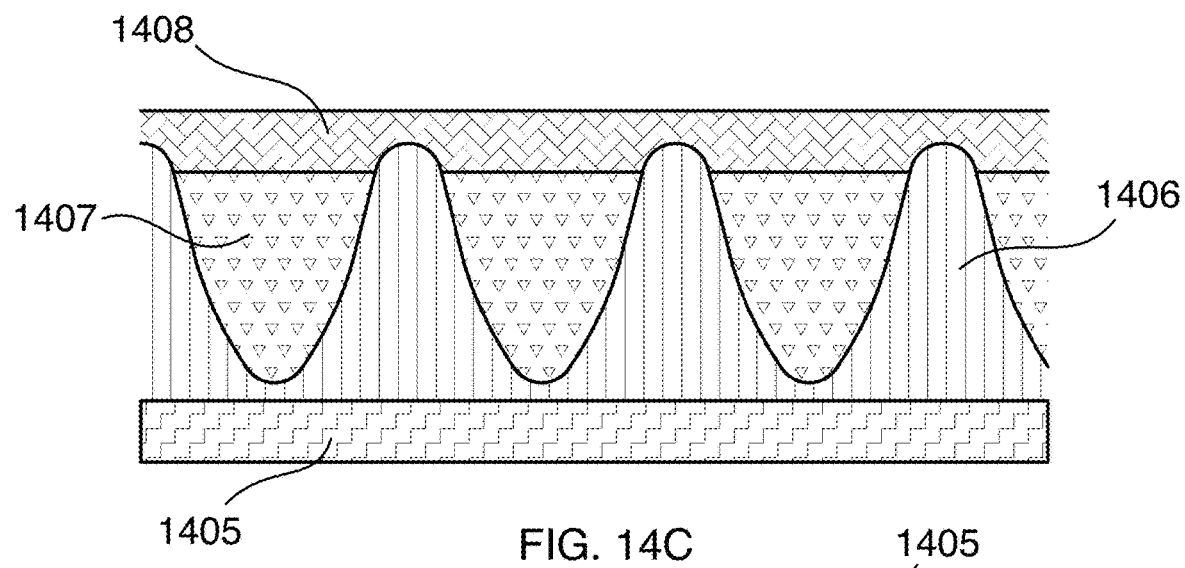
FIG. 14C is a cross-sectional view of a half cell between a second interconnect and an electrolyte.
Figure 14B:
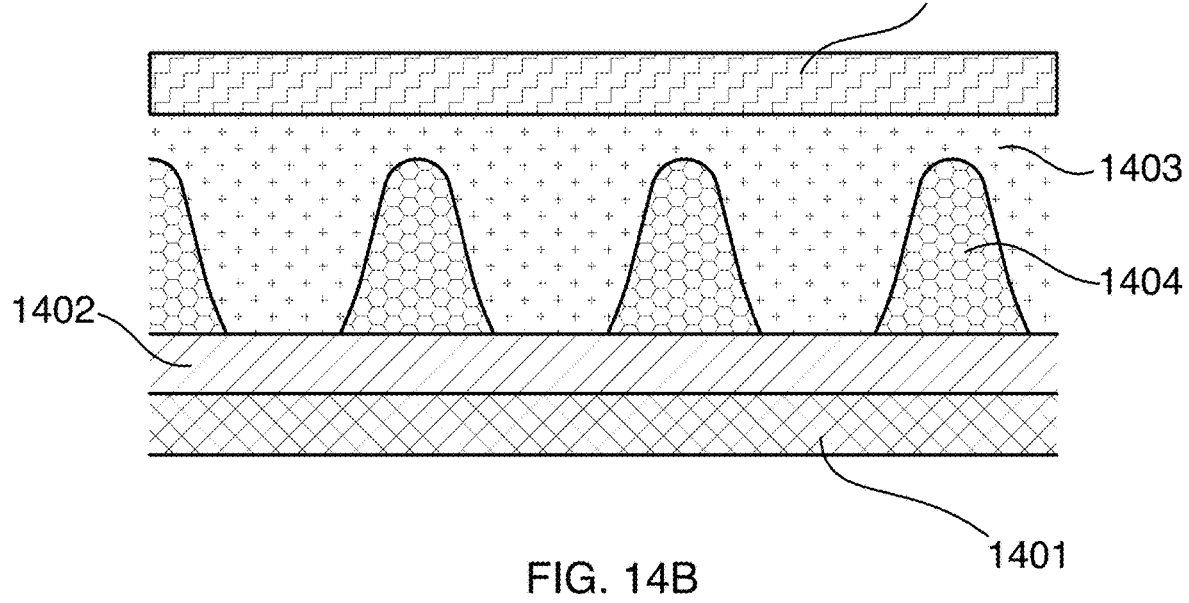
FIG. 14B is a cross-sectional view of a half cell between a first interconnect and an electrolyte.

FIG. 14B is a cross-sectional view of a half cell between a first interconnect and an electrolyte. The stack in FIG. 14B comprises a bottom/first interconnect 1401, an optional layer that contains the bottom interconnect material and first electrode material 1402, first electrode segments 1403, first filler materials that form a first template 1404 and electrolyte 1405.

FIG. 14C is a cross-sectional view of a half cell between a second interconnect and an electrolyte, comprising electrolyte 1405, second electrode segments 1406, filler materials that forms a second template 1407 and a top/second interconnect 1408. The views shown in FIG. 14B and FIG. 14C are perpendicular to one another.

Figures 14D, 14E:
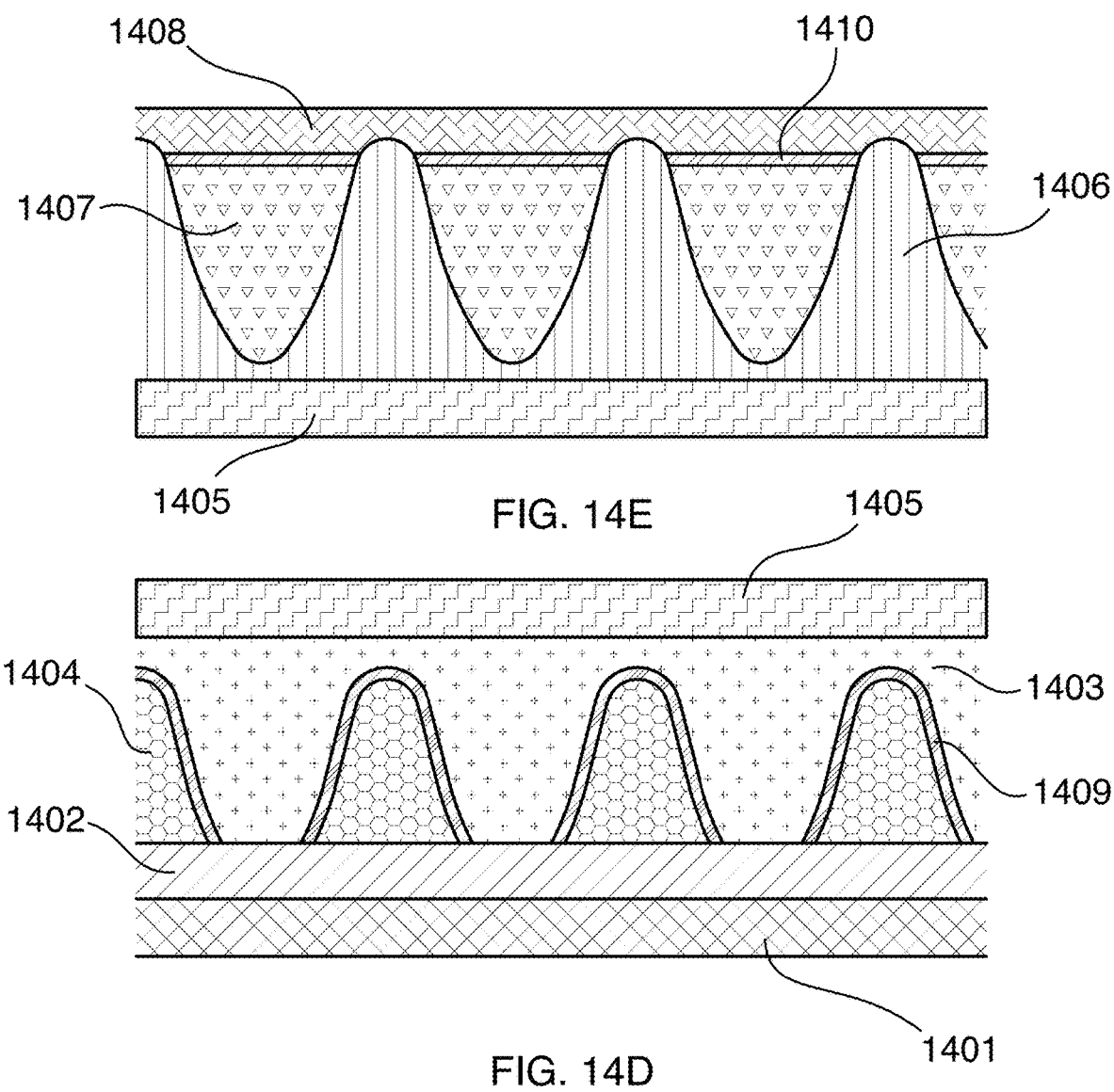
FIG. 14D is a cross-sectional view of a half cell between a first interconnect and an electrolyte.
FIG. 14E is a cross-sectional view of a half cell between a second interconnect and an electrolyte.

FIG. 14D is a cross-sectional view of a half cell between a first interconnect and an electrolyte, comprising bottom interconnect 1401, an optional layer that contains the bottom interconnect material and first electrode material 1402, first electrode segments 1403, first filler materials that forms a first template 1404, electrolyte 1405 and optional shields 1409 for the first filler materials when the first electrode is heated and/or sintered.

FIG. 14E is a cross-sectional view of a half cell between a second interconnect and an electrolyte, comprising electrolyte 1405, second electrode segments 1406, filler materials that forms a second template 1407, top interconnect 1408 and optional shields for the second filler materials when the top interconnect is heated and/or sintered. The views shown in FIG. 14D and FIG. 14E are perpendicular to one another.

In some embodiments, there is a layer between 1407 and 1408 (not shown) that contains the top interconnect material and second electrode material. In some embodiments, 1405 represents an electrolyte with a barrier for the first electrode or for second electrode. 1409 represents optional shields for the first fillers when the first electrode is heated/sintered. 1410 represents optional shields for the second fillers when the top interconnect is heated/sintered. In some instances, electrolyte 1405 or electrolyte-barrier layer is in contact with the first electrode and the second electrode continuously along its opposing major faces. The shapes of the electrode segments and the fillers in these cross-sectional views are only representative and not exact. They may take on any regular or irregular shapes. The fillers and/or templates are removed when the electrochemical reactor is made (e.g., a fuel cell stack or a gas producer), for example, via heating in a furnace. Or alternatively, they are removed when the electrochemical reactor is initiated into operation via hot gas/fluid passing through, using the effects of oxidation, melting, vaporization, gasification, reduction, or combinations thereof. These removed fillers and/or templates become channels in the electrodes. In various embodiments, multiple tiers of channels are present in an electrode. For an illustrative example, an electrode is 25 microns thick with a multiplicity of channels having a height of 20 microns. For another illustrative example, an electrode is 50 microns thick with a multiplicity of channels in 2 tiers, each tier of channels having a height of 20 microns. In various embodiments, the fillers comprise carbon, graphite, graphene, cellulose, metal oxides, polymethyl methacrylate, nano diamonds, or combinations thereof.

In an embodiment, a unit in an electrochemical reactor comprising an interconnect, a first electrode, an electrolyte, and a second electrode is made via this method: providing the interconnect, depositing a first electrode material in segments on the interconnect, sintering the first electrode material, depositing a first filler material between the first electrode material segments, depositing additional first electrode material to cover the filler material, sintering the additional first electrode material and forming the first electrode, depositing an electrolyte material on the first electrode, sintering the electrolyte material to form the electrolyte, depositing a second electrode material on the electrolyte such that a multiplicity of valleys are formed in the second electrode material, sintering the second electrode material to form the second electrode, depositing a second filler material in the valleys of the second electrode, depositing a second interconnect material to cover the second electrode and the second filler material, and sintering the second interconnect material. In various embodiments, deposition is performed using inkjet printing or ultrasonic inkjet printing. In various embodiments, sintering is performed using electromagnetic radiation (EMR). In some cases, the first and second filler materials absorb little to no EMR; the absorption is so minimal that the filler materials have no measurable change. In some cases, shields are deposited to cover the first filler material or the second filler material or both so that the heating and/or sintering process for the layer on top does not cause measurable change in the first filler material or the second filler material or both. In some cases, the shields comprise YSZ, SDC, SSZ, CGO, NiO-YSZ, Cu, CuO, $Cu_2O$, LSM, LSCF, lanthanum chromite, stainless steel, LSGM, or combinations thereof.

Dual Porosity Electrodes

FIGS. 15A-D illustrates various embodiments of electrodes having dual porosities with one, two or three layers shown in detail. FIG. 15A schematically illustrates segments of fluid dispersing components in a first layer. First layer 1500 comprises fluid dispersing component segments 1502. Segments 1502 may have different compositions, shapes, densities, porosities, pore sizes, pore shapes, permeabilities, or combinations thereof. Volume fraction of channels (VFc) relative to layer 1500 containing the channels is also shown. Herein discussed is an electrode in an EC reactor comprising a material and channels, wherein the material and channels form a first layer in the electrode having a first layer porosity. The material has a material porosity. The channels have a volume fraction VFc, which is the ratio between the volume of the channels and the volume of the first layer. The first layer porosity refers to the average porosity of the first layer as a whole. The first layer porosity is at least 5% greater than the material porosity. The VFc is in the range of 0-99%, or 1-30%, or 10-90%, or 5-50%, or 3-30%, or 1-50%. The VFc is no less than 5%, or 10%, or 20%, or 30%, or 40%, or 50%.

FIG. 15B schematically illustrates fluid dispersing components in a first layer along with a second layer in an electrode. Electrode embodiment in FIG. 15B shows a first layer 1504 of fluid dispersing component segments 1505 and a second layer 1506. The segments, as shown in FIG. 15B, may have different compositions, shapes, densities, porosities, pore sizes, pore shapes, permeabilities, or combinations thereof. The electrode comprises a second layer wherein the second layer has a second layer porosity. The second layer porosity refers to the average porosity of the second layer as a whole. In an embodiment, said second layer porosity is no greater than the first layer porosity or the second layer porosity is no less than the first layer porosity. The second layer 1506 may comprise the same material as in the first layer. The second layer 1506 may also comprise variabilities in compositions, shapes, densities, porosities, pore sizes, pore shapes, permeabilities, or combinations thereof in the lateral direction or perpendicular to the lateral direction.

FIG. 15D schematically illustrates fluid dispersing components in a first layer 1508 along with a second layer 1512. The electrode embodiment in FIG. 15D is similar to the embodiment in FIG. 15B. The electrode in FIG. 15D comprises a first layer 1508 further comprising fluid dispersing component segments 1510, wherein segments 1510 may have different compositions, shapes, densities, porosities, pore sizes, pore shapes, permeabilities, or combinations thereof. The second layer 1512 may comprise the same material as in the first layer. The second layer 1512 may also comprise variabilities in compositions, shapes, densities, porosities, pore sizes, pore shapes, permeabilities, or combinations thereof in the lateral direction or perpendicular to the lateral direction.

FIG. 15C schematically illustrates fluid dispersing components in a first layer along with a second and third layer. Electrode embodiment in FIG. 15C comprises a first layer 1514, second layer 1516 and a third layer 1518. In an embodiment, the second layer and the third layer are on two sides of the first layer. In an embodiment, the second layer and the third layer are in continuous contact with two sides of the first layer. First layer 1514 may comprises segments 1520 that have different compositions, shapes, densities, porosities, pore sizes, pore shapes, permeabilities, or combinations thereof. The second layer or the third layer may comprise the same material as in the first layer. The second layer or the third layer may also comprise variabilities in compositions, shapes, densities, porosities, pore sizes, pore shapes, permeabilities, or combinations thereof in the lateral direction or perpendicular to the lateral direction.

In an embodiment, the material porosity of the first, second or third layer is in the range of 20-60%, in the range of 30-50%, in the range of 30-40% or in the range of 25-35%. In an embodiment, the material porosity is no less than 25%, or 35%, or 45%.

In an embodiment, the electrode has a thickness of no greater than 10 cm, or 5 cm, or 1 cm. In an embodiment, the electrode has a thickness of no greater than 8 mm, or 5 mm, or 1 mm. In an embodiment, the electrode has a thickness of no greater than 100 microns, or 80 microns, or 60 microns.

In an embodiment, contribution to the permeability of the first layer from the channels is greater than contribution to the permeability of the first layer from the material. In an embodiment, no less than 50%, or 70%, or 90% of the permeability of the first layer is due to the permeability of the channels. In an embodiment, permeability of the material in the first layer is no greater than 50%, or no greater than 10%, or no greater than 1%, or no greater than 0.001% of the permeability of the channels in the first layer.

Herein disclosed is a method of making an electrically conductive component (ECC) of an electrochemical reactor (e.g., a fuel cell) comprising: (a) depositing on a substrate a first composition comprising a first pore former with a first pore former volume fraction VFp1; (b) depositing on the substrate a second composition comprising a second pore former with a second pore former volume fraction VFp2, wherein said first composition and second composition form a first layer in the ECC; and (c) heating the first layer such that the first pore former and the second pore former become empty spaces. In an embodiment, said VFp1 is in the range of 0-100%, or 10-90%, or 30-70%, or 50-100%, or 90-100%. In an embodiment, the VFp2 is in the range of 0-100%, or 0-70%, or 25-75%, or 30-60%. In an embodiment, the heating comprises reduction reactions or oxidation reactions, or both reduction and oxidation reactions.

Figure 16:
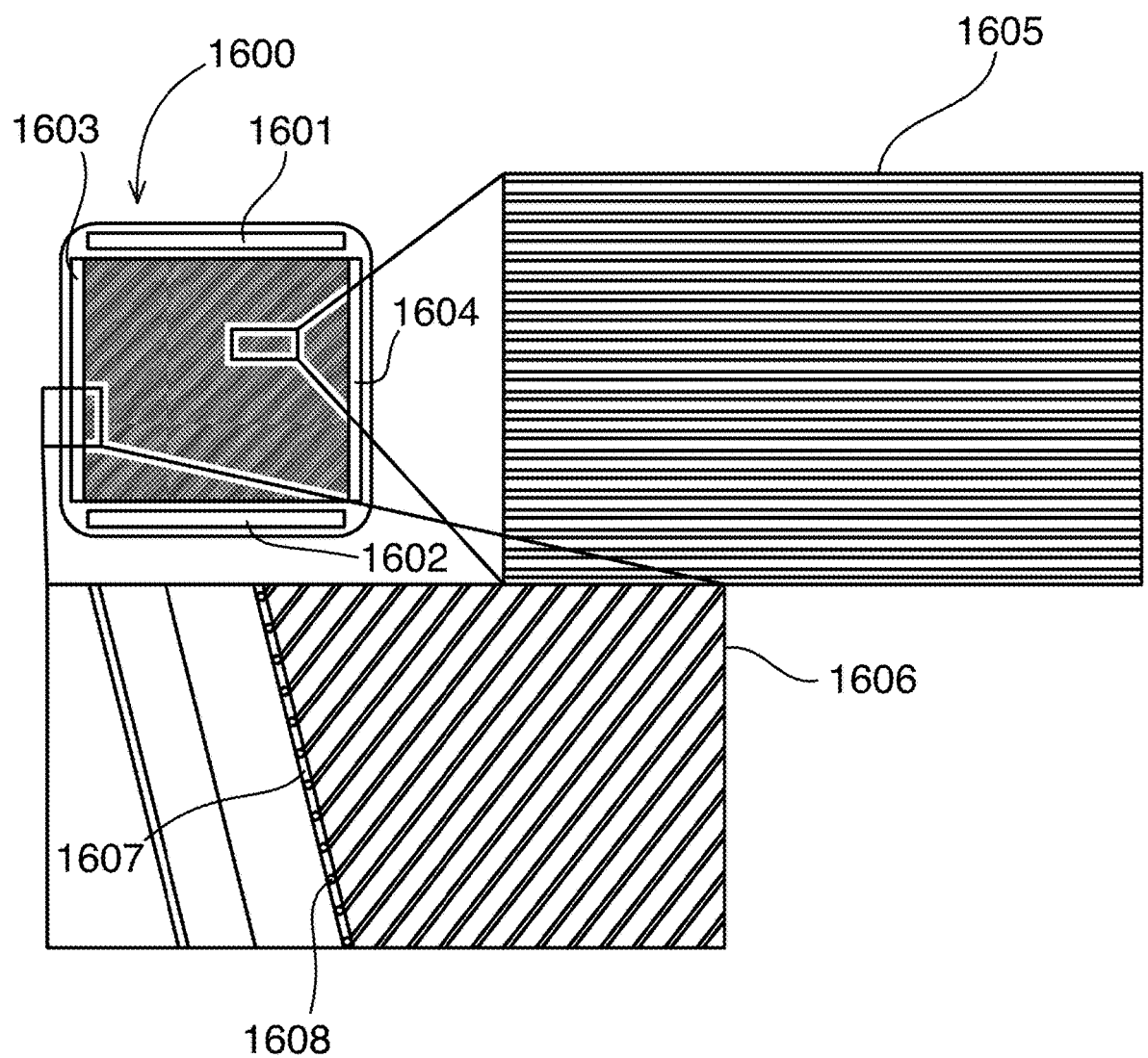
FIG. 16 is an illustrative example of an electrode having dual porosities.

FIG. 16 is an illustrative example of an electrode having dual porosities. FIG. 16 shows EC device 1600 comprising a channeled electrode having dual porosities. Device 1600 comprises an anode gas inlet 1601, an anode gas outlet 1602, a cathode gas inlet 1603, and a cathode gas outlet 1604. Exploded view 1605 is a view of a portion of a cathode layer. View 1606 is a closer view of the cathode wherein view 1606 represents a slice through the cathode layer that is composed of cathode 1607. Cathode 1607 is a porous cathode that is formed using micro pore formers. Channels 1608 represents channels formed from macro pore formers.

In an embodiment, (a) and (b) are accomplished via printing, or via extrusion, or via additive manufacturing (AM), or via tape casting, or via spraying, or via deposition, or via sputtering, or via screen printing. In an embodiment, said additive manufacturing comprises extrusion, photopolymerization, powder bed fusion, material jetting, binder jetting, directed energy deposition, lamination.

In an embodiment, the first pore former and the second pore former are the same. In an embodiment, the first pore former and the second pore former are different. In an embodiment, said first pore former or second pore former has an average diameter in the range of 10 nm to 1 mm or 100 nm to 100 microns or 500 nanometers to 50 microns. In an embodiment, said first pore former or second pore former has a size distribution. In an embodiment, said first pore former or second pore former comprises carbon, graphite, polymethyl methacrylate (PMMA), cellulose, metal oxides, or combinations thereof.

In an embodiment, the method comprises repeating (a) and (b) to form a second layer in the ECC; and heating the second layer. In an embodiment, heating the second layer takes places at the same time as heating the first layer. In an embodiment, heating the second layer takes places at a different time as heating the first layer. In an embodiment, heating the second layer and heating the first layer have at least a portion of overlapping time period. In an embodiment, the method comprises repeating (a) and (b) to form a third layer in the ECC; and heating the third layer. In an embodiment, the second layer and the third layer are on two sides of the first layer. In an embodiment, heating the first, second, and third layers is simultaneous. Alternatively, the first, second, and third layers are heated at different times. In an embodiment, heating of the first, second, and third layers has overlapping time periods. In an embodiment, the first, second, or third layer is heated more than once.

In an embodiment, at least a portion of the empty spaces caused by the second pore former or the first pore former or both become channels in the first layer. In an embodiment, the channels have a volume fraction VFc, which is the ratio between the volume of the channels and the volume of the first layer. In an embodiment, said VFc is in the range of 0-99% or 1-30% or 10-90% or 5-50% or 3-30% or 1-50%. In an embodiment, said VFc is no less than 5% or 10% or 20% or 30% or 40% or 50%.

In an embodiment, VFp1 is different from VFp2. In an embodiment, said first layer has dual porosities, a material porosity and a layer porosity. In an embodiment, the material porosity is in the range of 20-60%, or 30-50%, or 30-40%, or 25-35%. In an embodiment, the material porosity is no less than 25% or 35% or 45%.

In an embodiment, the ECC has a thickness of no greater than 10 cm or 5 cm or 1 cm. In an embodiment, the ECC a thickness of no greater than 8 mm or 5 mm or 1 mm. In an embodiment, the ECC has a thickness of no greater than 100 microns or 80 microns or 60 microns.

In an embodiment, the first layer comprises channels and material after (c), wherein contribution to the permeability of the first layer from the channels is greater than contribution to the permeability of the first layer from the material. In an embodiment, no less than 50% or 70% or 90% of the permeability of the first layer is due to the permeability of the channels. In an embodiment, permeability of the material in the first layer is no greater than 50% or no greater than 10% or no greater than 1% or no greater than 0.001% of the permeability of the channels in the first layer.

Herein discussed is a method comprising: (a) providing a first material to an additive manufacturing machine (AMM); (b) providing a second material to the AMM; (c) mixing the first material and the second material into a mixture; and (d) forming said mixture into a part. In an embodiment, said first material or second material is a gas, or liquid, or solid, or gel.

In an embodiment, said additive manufacturing comprises extrusion, photopolymerization, powder bed fusion, material jetting, binder jetting, directed energy deposition, lamination. In an embodiment, said AM comprises direct metal laser sintering (DMLS), selective laser sintering (SLS), selective laser melting (SLM), directed energy deposition (DED), laser metal deposition (LMD), electron beam (EBAM), or metal binder jetting. In an embodiment, steps (c) and (d) take place continuously.

In an embodiment, step (c) comprises varying the ratio of the first material and the second material in the mixture. In an embodiment, the ratio of the first material and the second material in the mixture is varied in situ. In an embodiment, the ratio of the first material and the second material in the mixture is varied in real time. In an embodiment, the ratio of the first material and the second material in the mixture is varied continuously. In an embodiment, the ratio of the first material and the second material in the mixture is varied according to a composition profile. In an embodiment, the ratio of the first material and the second material in the mixture is varied according to a manual algorithm, a computational algorithm, or a combination thereof. In an embodiment, the ratio of the first material and the second material in the mixture is varied by controlling material flow rates or pumping rates.

In an embodiment, step (d) comprises placing said mixture in a pattern on a substrate. In an embodiment, step (d) comprises placing said mixture according to pre-defined specifications.

In an embodiment, the formed part has varying properties. In an embodiment, the properties comprise strength, weight, density, electrical performance, electrochemical performance, or combinations thereof. In various embodiments, he formed part possesses superior properties, such as strength, density, weight, electrical performance, or electrochemical performance, or combinations thereof, when compared with a similar part formed by a different process.

In an embodiment, step (d) comprises depositing said mixture on a substrate. In an embodiment, mixing takes place prior to deposition, during deposition, or after deposition. In an embodiment, mixing takes place in the AMM or in the air or on the substrate. In an embodiment, mixing takes place via advection, dispersion, diffusion, melting, fusion, pumping, stirring, heating, or combinations thereof.

Herein disclosed is an additive manufacturing machine (AMM) comprising: (a) a first material source; (b) a second material source; and (c) a mixer configured to mix the first material and the second material into a mixture; wherein said AMM is configured to form said mixture into a part. In an embodiment, said first material or second material is a gas, or liquid, or solid, or gel.

In an embodiment, said AMM is configured to perform extrusion, photopolymerization, powder bed fusion, material jetting, binder jetting, directed energy deposition, or lamination. In an embodiment, said AMM is configured to perform direct metal laser sintering (DMLS), selective laser sintering (SLS), selective laser melting (SLM), directed energy deposition (DED), laser metal deposition (LMD), electron beam (EBAM), or metal binder jetting.

In an embodiment, said mixer is configured to mix the first material and the second material continuously while the AMM forms said mixture into a part. In an embodiment, said mixer is configured to vary the ratio of the first material and the second material in the mixture. In an embodiment, said mixer is configured to vary the ratio of the first material and the second material in the mixture in situ. The mixer may be configured to vary the ratio of the first material and the second material in the mixture in real time. In an embodiment, the mixer can be configured to vary the ratio of the first material and the second material in the mixture continuously. In an embodiment, the mixer is configured to vary the ratio of the first material and the second material in the mixture according to a composition profile. In an embodiment, the mixer is configured to vary the ratio of the first material and the second material in the mixture according to a manual algorithm, a computational algorithm, or a combination thereof. In an embodiment, said mixer is configured to vary the ratio of the first material and the second material in the mixture by controlling material flow rates or pumping rates.

In an embodiment, said AMM is configured to place said mixture in a pattern on a substrate. In an embodiment, said AMM is configured to place said mixture according to pre-defined specifications.

In an embodiment, the formed part has varying properties. In an embodiment, the properties comprise strength, weight, density, electrical performance, electrochemical performance, or combinations thereof. In various embodiments, he formed part possesses superior properties, such as strength, density, weight, electrical performance, or electrochemical performance, or combinations thereof, when compared with a similar part formed using a different apparatus.

In an embodiment, the AMM is configured to deposit said mixture on a substrate. In an embodiment, mixing takes place prior to deposition, during deposition, or after deposition. In an embodiment, mixing takes place in the AMM or in the air or on the substrate. In an embodiment, mixing takes place via advection, dispersion, diffusion, melting, fusion, pumping, stirring, heating, or combinations thereof.

Matching SRTs

In this disclosure, SRT refers to a component of the strain rate tensor. Matching SRTs is contemplated in both heating and cooling processes. In a fuel cell or an EC gas producer or an EC compressor or a FT catalyst, multiple materials or compositions exist. These different materials or compositions often have different thermal expansion coefficients. As such, the heating or cooling process often causes strain or even cracks in the material. We have unexpectedly discovered a treating process (heating or cooling) to match the SRTs of different materials/compositions to reduce, minimize, or even eliminate undesirable effects.

Figure 7:
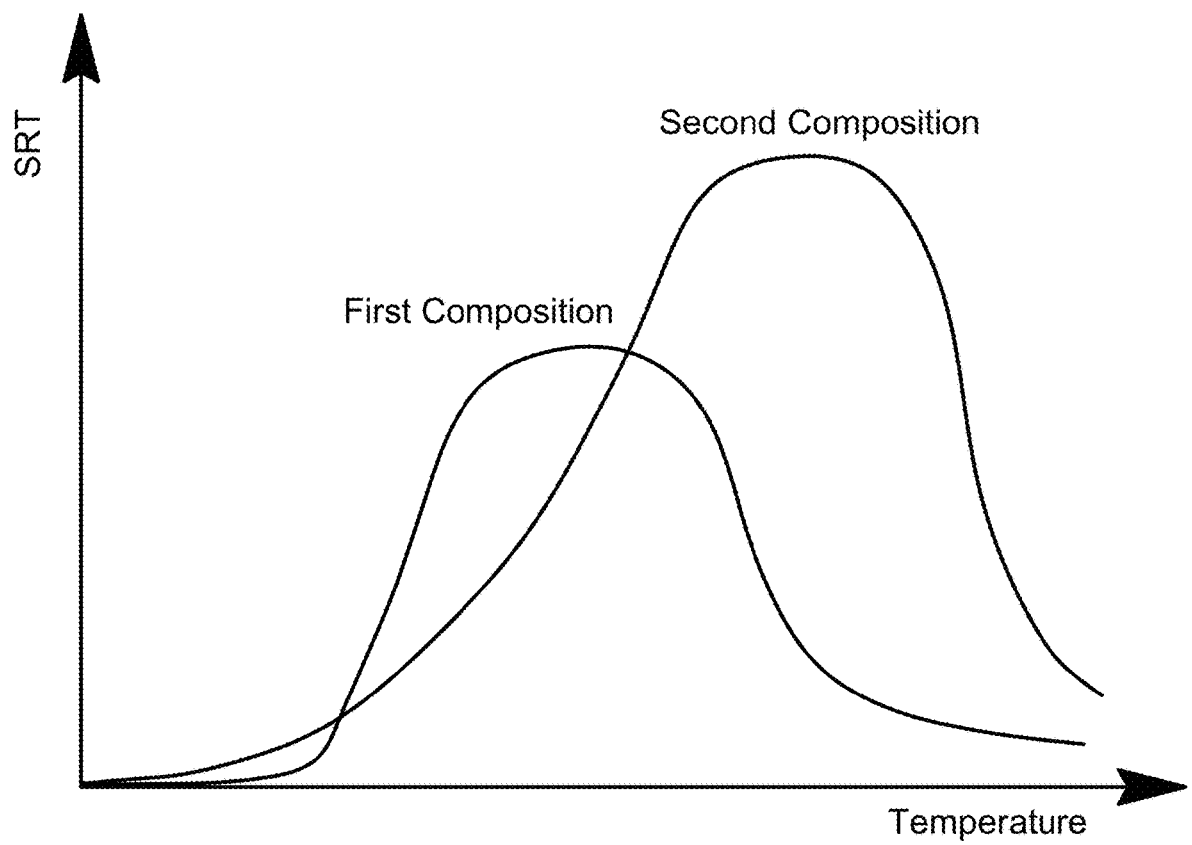
FIG. 7 graphically illustrates strain rate tensors (SRTs) of a first composition and a second composition as a function of temperature.

Herein discussed is a method of making a fuel cell, wherein the fuel cell comprises a first composition and a second composition, the method comprising heating the first and second compositions, wherein the first composition has a first SRT and the second composition has a second SRT, such that the difference between the first SRT and the second SRT is no greater than 75% of the first SRT. FIG. 7 graphically illustrates strain rate tensors (SRTs) of a first composition and a second composition as a function of temperature.

In an embodiment, wherein the SRTs are measured in mm/min, the difference between the first SRT and the second SRT is no greater than 50%, or 30%, or 20% of the first SRT. In an embodiment, heating is achieved via at least one of the following: conduction, convection or radiation. In an embodiment, heating comprises electromagnetic radiation (EMR). In an embodiment, EMR comprises one or more of UV light, near ultraviolet light, near infrared light, infrared light, visible light, laser or electron beam.

In an embodiment, the first composition and the second composition are heated at the same time. In an embodiment, the first composition and the second composition are heated at different times. In an embodiment, the first composition is heated for a first period of time, the second composition is heated for a second period of time, wherein at least a portion of the first period of time overlaps with the second period of time.

In an embodiment, heating takes places more than once for the first composition, or for the second composition, or for both. In an embodiment, the first composition and the second composition are heated at different temperatures. In an embodiment, the first composition and the second composition are heated using different means. In an embodiment, the first composition and the second composition are heated for different periods of time. In an embodiment, heating the first composition causes at least partial heating of the second composition, for example, via conduction. In an embodiment, heating causes densification of the first composition, or the second composition, or both.

In an embodiment, the first composition is heated to achieve partial densification resulting in a modified first SRT; and then the first and second compositions are heated such that the difference between the modified first SRT and the second SRT is no greater than 75% of the first modified SRT. In an embodiment, the first composition is heated to achieve partial densification resulting in a modified first SRT, the second composition is heated to achieve partial densification resulting in a modified second SRT; and then the first and second compositions are heated such that the difference between the modified first SRT and the second modified SRT is no greater than 75% of the first modified SRT.

In an embodiment, the fuel cell comprises a third composition having a third SRT. In an embodiment, the third composition is heated such that the difference between the first SRT and the third SRT is no greater than 75% of the first SRT. In an embodiment, the third composition is heated to achieve partial densification resulting in a modified third SRT; and then the first and second and third compositions are heated such that the difference between the first SRT and the modified third SRT is no greater than 75% of the first SRT. In an embodiment, the first and second and third compositions are heated to achieve partial densification resulting in a modified first SRT, a modified second SRT, and a modified third SRT; and then the first and second and third compositions are heated such that the difference between the modified first SRT and the modified second SRT is no greater than 75% of the modified first SRT and the difference between the modified first SRT and the modified third SRT is no greater than 75% of the modified first SRT.

In various embodiments, the method produces a crack free electrolyte in the fuel cell. In various embodiments, heating is performed in situ. In various embodiments, heating causes sintering or co-sintering or both. In various embodiments, heating takes place for no greater than 30 minutes, or no greater than 30 seconds, or no greater than 30 milliseconds.

Figure 8:
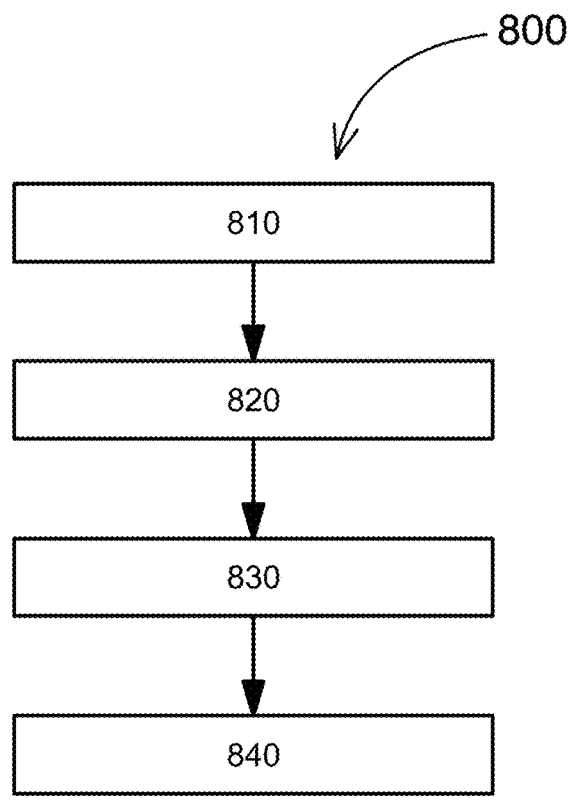
FIG. 8 illustrates a process flow for forming and heating at least a portion of a fuel cell.

FIG. 8 illustrates a process flow for forming and heating at least a portion of an object. Process flow 800 comprises forming composition 1 810, heating composition 1 at temperature T1 for time t1, forming composition 2 830, then heating composition 1 and composition 2 simultaneously at temperature T2 for time t2 840, wherein at T2, the difference between SRT of composition 1 and SRT of composition 2 is no greater than 75% of SRT of composition 1. Alternatively, 840 represents heating composition 1 and composition 2 simultaneously at temperature T2 and T2' (for example, using different heating mechanisms) for time t2, wherein at T2 and T2', the difference between SRT of composition 1 and SRT of composition 2 is no greater than 75% of SRT of composition 1.

Examples

The following examples are provided as part of the disclosure of various embodiments of the present invention. As such, none of the information provided below is to be taken as limiting the scope of the invention.

Example 1. Making a Fuel Cell Stack

Example 1 is illustrative of the preferred method of making a fuel cell stack. The method uses an AMM model no. 0012323 from Ceradrop and an EMR model no. 092309423 from Xenon Corp. An interconnect substrate is put down to start the print.

As a first step, an anode layer is made by the AMM. This layer is deposited by the AMM as a slurry A, having the composition as shown in the table below. This layer is allowed to dry by applying heat via an infrared lamp. This anode layer is sintered by irradiating it with an electromagnetic pulse from a xenon flash tube for 1 second.

An electrolyte layer is formed on top of the anode layer by the AMM depositing a slurry B, having the composition shown in the table below. This layer is allowed to dry by applying heat via an infrared lamp. This electrolyte layer is sintered by irradiating it with an electromagnetic pulse from a xenon flash tube for 60 seconds.

Next a cathode layer is formed on top of the electrolyte layer by the AMM depositing a slurry C, having the composition shown in the table below. This layer is allowed to dry by applying heat via an infrared lamp. This cathode layer is sintered by irradiating it with an electromagnetic pulse from a xenon flash tube for ½ second.

An interconnect layer is formed on top of the cathode layer by the AMM depositing a slurry D, having the composition shown in the table below. This layer is allowed to dry by applying heat via an infrared lamp. This interconnect layer is sintered by irradiating it with an electromagnetic pulse from a xenon flash tube for 30 seconds.

These steps are then repeated 60 times, with the anode layers being formed on top of the interconnects. The result is a fuel cell stack with 61 fuel cells.

| Composition of Slurries | | |
| --- | --- | --- |
| Slurry | Solvents | Particles |
| A | 100% isopropyl alcohol | 10 wt % NiO-8YSZ |
| B | 100% isopropyl alcohol | 10 wt % 8YSZ |
| C | 100% isopropyl alcohol | 10 wt % LSCF |
| D | 100% isopropyl alcohol | 10 wt % lanthanum chromite |

Example 2. LSCF in Ethanol

Mix 200 ml of ethanol with 30 grams of LSCF powder in a beaker. Centrifuge the mixture and obtain an upper dispersion and a lower dispersion. Extract and deposit the upper dispersion using a 3D printer on a substrate and form a LSCF layer. Use a xenon lamp (10 kW) to irradiate the LSCF layer at a voltage of 400V and a burst frequency of 10 Hz for a total exposure duration of 1,000 ms.

Example 3. CGO in Ethanol

Mix 200 ml of ethanol with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 4. CGO in Water

Mix 200 ml of deionized water with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 5. NiO in Water

Mix 200 ml of deionized water with 30 grams of NiO powder in a beaker. Centrifuge the mixture and obtain an upper dispersion and a lower dispersion. Extract and deposit the upper dispersion using a 3D printer on a substrate and form a NiO layer. Use a xenon lamp (10 kW) to irradiate the NiO layer at a voltage of 400V and a burst frequency of 10 Hz for a total exposure duration of 15,000 ms.

Example 6. Sintering Results

Figure 12:
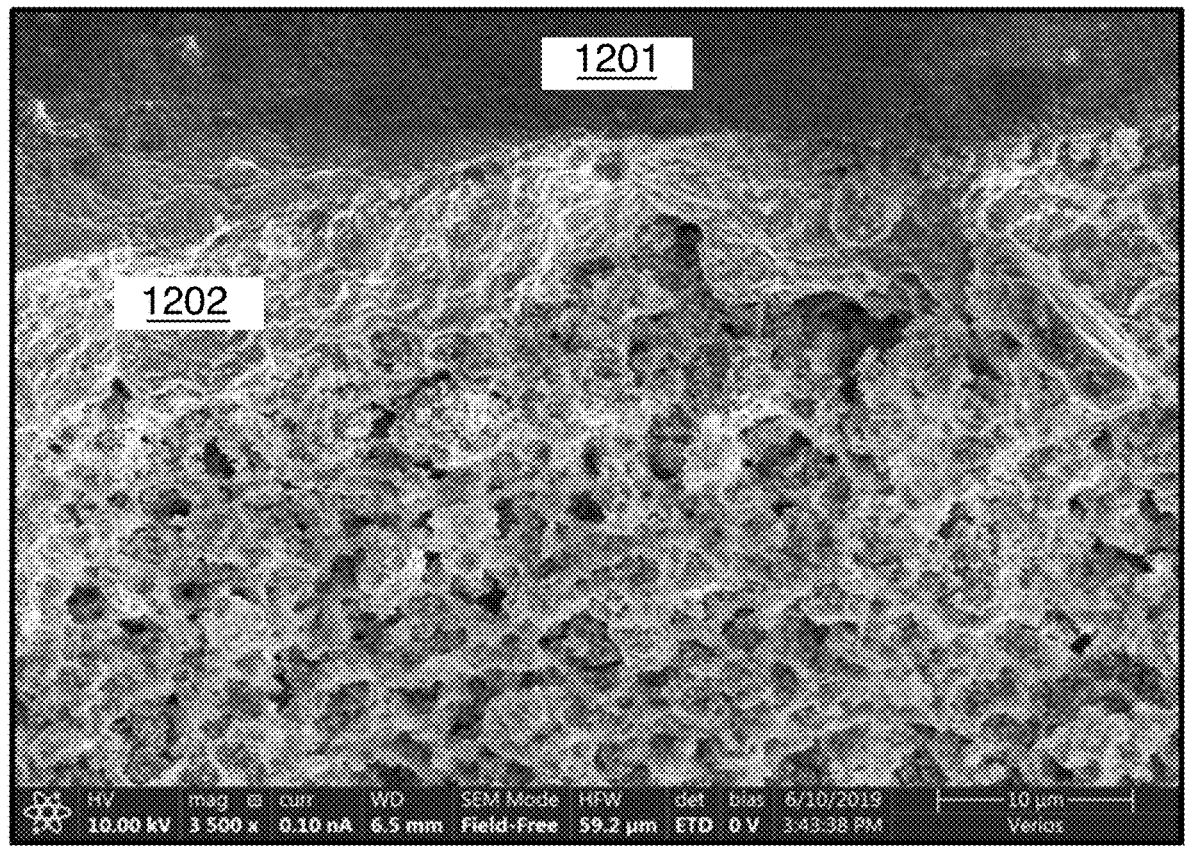
FIG. 12 is a scanning electron microscopy image (side view) illustrating an electrolyte (YSZ) printed and sintered on an electrode (NiO-YSZ)

FIG. 12 is a scanning electron microscopy image (side view) illustrating an electrolyte (YSZ) printed and sintered on an electrode (NiO-YSZ). The scanning electron microscopy image shows the side view of the sintered structures, which demonstrates gas-tight contact between the electrolyte and the electrode, full densification of the electrolyte, and sintered and porous electrode microstructures.

Example 7. Fuel Cell Stack Configurations

A 48-Volt fuel cell stack has 69 cells with about 1000 Watts of power output. The fuel cell in this stack has a dimension of about 4 cm×4 cm in length and width and about 7 cm in height. A 48-Volt fuel cell stack has 69 cells with about 5000 Watts of power output. The fuel cell in this stack has a dimension of about 8.5 cm×8.5 cm in length and width and about 7 cm in height.

Example 8. Channeled Electrodes/Fluid Dispersing Components

Figure 17:
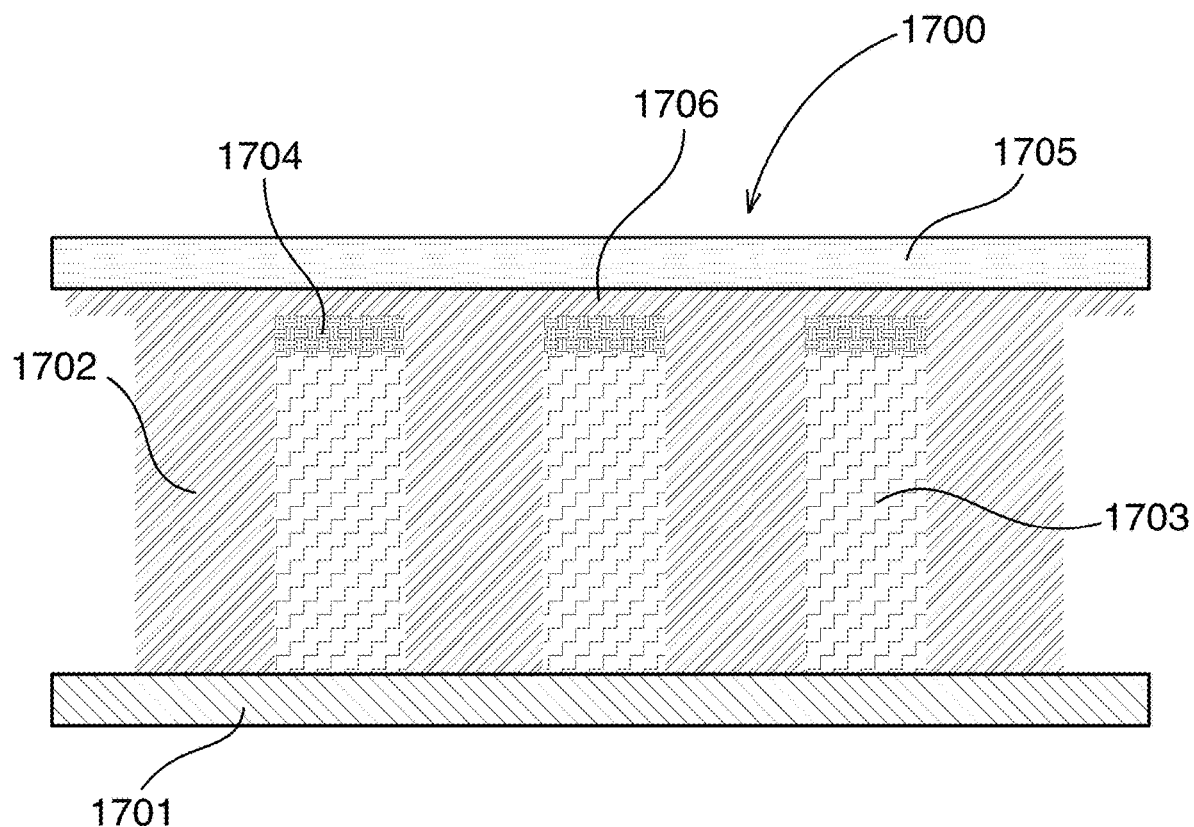
FIG. 17 schematically illustrates an example of a half cell in an EC reactor.

FIG. 17 schematically illustrates an example of a half cell in an EC reactor. As shown in FIG. 17, half cell 1700 comprises interconnect 1701. Interconnect 1701 comprises doped lanthanum chromite. Half cell 1700 comprises anode segments 1702 that are printed on interconnect 1701. The anode segments are composed of NiO-YSZ. Anode segments 1702 are sintered using EMR (see Example 1). Half cell 1700 comprises filler material that is deposited between anode segments 1702. The filler material is polymethyl methacrylate (PMMA). Half cell 1700 includes shields 1704 that are printed on filler materials 1703 that are composed of YSZ. Additional anode material 1706 is printed to cover anode segments 1702 and shields 1704 followed by sintering using EMR. The additional anode material is NiO-YSZ. Electrolyte 1705 is printed on additional anode material 1706 and sintered using EMR. Electrolyte 1705 is YSZ. A barrier layer (not shown) composed of CGO is further printed on the electrolyte and sintered using EMR. A layer of cathode (not shown) composed of LSCF is printed on the CGO barrier and sintered. Cathode segments (not shown) composed of LSCF are printed on this layer and sintered. These segments form valleys and filler PMMA is deposited to fill these valleys (not shown). Shields composed of YSZ are printed on the fillers (not shown). Doped lanthanum chromite is printed to cover the shields and cathode segments and then sintered to form another interconnect (not shown). The fillers are removed by furnace heating and channeled electrodes are produced or fluid dispersing components are formed between electrolyte and interconnect (not shown).

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of making an electrode for an electrochemical reactor comprising:
   providing a template;
   depositing a composition containing an electrode material such that the electrode material is in contact with the template, wherein the electrode material consists of ceramics, metal oxides, or a mixture thereof, and wherein the composition consists of particles suspended in a liquid;
   drying the composition; and
   sintering the electrode material in dry particulate form using a xenon lamp, wherein the electrode material is not a semiconductor; and
   wherein the template is provided in a form that produces channels in the electrode material when at least a portion of the template is removed.

2. The method of claim 1, wherein the electrode material is selected from the group consisting of NiO, YSZ, CGO or GDC, LSM, LSCF, CuO, $Cu_2O$, SDC, SSZ, LSGM, and combinations thereof.

3. The method of claim 1, where the template comprises carbon, graphite, graphene, cellulose, metal oxides, polymethyl methacrylate, nano diamonds, or combinations thereof.

4. The method of claim 1, wherein the template comprises dispersed metal oxide particles.

5. The method of claim 1, wherein providing a template comprises printing the template or printing precursors that combine to form the template.

6. The method of claim 1, wherein the composition is deposited slice by slice.

7. The method of claim 1, wherein the electrode material is sintered slice by slice using the xenon lamp.

8. The method of claim 1, wherein the depositing is performed using inkjet printing.

9. The method of claim 1 comprising removing at least a portion of the template to produce the channels in the electrode material, wherein removing comprises heating, combustion, solvent treatment, oxidation, reduction, gasification, dissolution, vaporization, melting, or combinations thereof.

10. The method of claim 9, wherein the removing takes place after the electrochemical reactor is formed or when the electrochemical reactor is first operated.

\* \* \* \* \*